US011736564B1

(12) United States Patent
Jain et al.

(10) Patent No.: US 11,736,564 B1
(45) Date of Patent: Aug. 22, 2023

(54) PLATFORM TO COMBINE RESEARCH DATA SETS FROM MULTIPLE CLINICAL TRIALS AND ENABLE DATA SHARING

(71) Applicant: Vignet Incorporated, Fairfax, VA (US)

(72) Inventors: Praduman Jain, Fairfax, VA (US); Dave Klein, Oakton, VA (US); Josh Schilling, Salem, OR (US); Addisu Alemu, Springfield, VA (US)

(73) Assignee: VigNet Incorporated, Fairfax, VA (US)

( * ) Notice: Subject to any disclaimer, the term of this patent is extended or adjusted under 35 U.S.C. 154(b) by 0 days.

(21) Appl. No.: 17/355,222

(22) Filed: Jun. 23, 2021

Related U.S. Application Data

(63) Continuation of application No. 17/028,741, filed on Sep. 22, 2020, now Pat. No. 11,082,487.

(51) Int. Cl.
| | |
|---|---|
| *H04L 67/1087* | (2022.01) |
| *H04L 41/0813* | (2022.01) |
| *H04L 9/40* | (2022.01) |
| *H04L 67/01* | (2022.01) |
| *H04L 67/50* | (2022.01) |

(52) U.S. Cl.
CPC ...... *H04L 67/1089* (2013.01); *H04L 41/0813* (2013.01); *H04L 63/102* (2013.01); *H04L 63/105* (2013.01); *H04L 63/20* (2013.01); *H04L 67/01* (2022.05); *H04L 67/535* (2022.05)

(58) Field of Classification Search
CPC ............ H04L 67/1089; H04L 41/0813; H04L 63/102; H04L 63/105; H04L 63/20; H04L 67/01; H04L 67/535
See application file for complete search history.

(56) References Cited

U.S. PATENT DOCUMENTS

| | | | |
|---|---|---|---|
| 7,617,393 B2 | 11/2009 | Betz et al. | |
| 7,805,377 B2 | 9/2010 | Felsher | |
| 8,543,566 B2 * | 9/2013 | Weissman | ........... G06F 16/2462 |
| | | | 707/715 |
| 8,880,487 B1 | 11/2014 | Clinton et al. | |
| 9,215,142 B1 | 12/2015 | Herold | |

(Continued)

OTHER PUBLICATIONS ncbi.nlm.nih.gov [online], "Guiding Principles for Sharing Clinical Trial Data," Apr. 20, 2015, retrieved on Sep. 2, 2022, retrieved from URL<https://www.ncbi.nlm.nih.gov/books/NBK285999/>, 14 pages.

(Continued)

*Primary Examiner* — El Hadji M Sall

(74) *Attorney, Agent, or Firm* — Fish & Richardson P.C.

(57) ABSTRACT

Methods, systems, and apparatus, including computer-readable media, for a hierarchical multi-tenant data access platforms. In some implementations, the a server system stores data collected through a multi-tenant data access platform configured to collect data for each of multiple tenant organizations and to selectively make the collected data available according to policies associated with the respective tenant organizations. The server system receives a request associated with a user, and the server system generates and provides a response according to the organization hierarchy data and policy data for the unit of the organization that has data that would be used in generating the response to the request.

27 Claims, 12 Drawing Sheets

(56) References Cited

U.S. PATENT DOCUMENTS

| | | | |
|---|---|---|---|
| 9,734,169 | B2 | 8/2017 | Redlich et al. |
| 9,753,618 | B1 | 9/2017 | Jain et al. |
| 9,757,065 | B1 | 9/2017 | Suri |
| 9,848,061 | B1 | 12/2017 | Jain et al. |
| 9,858,063 | B2 | 1/2018 | Jain et al. |
| 9,928,230 | B1 | 3/2018 | Jain et al. |
| 9,983,775 | B2 | 5/2018 | Jain et al. |
| 10,069,934 | B2 | 9/2018 | Jain et al. |
| 10,095,688 | B1 | 10/2018 | Jain et al. |
| 10,104,011 | B2 | 10/2018 | Sahoo et al. |
| 10,313,346 | B1 | 6/2019 | O'Neill et al. |
| 10,395,772 | B1* | 8/2019 | Lucas ............... G06V 30/416 |
| 10,521,557 | B2 | 12/2019 | Jain et al. |
| 10,565,894 | B1 | 2/2020 | Jain et al. |
| 10,610,111 | B1* | 4/2020 | Tran ..................... A61B 5/411 |
| 10,756,957 | B2 | 8/2020 | Jain et al. |
| 10,762,990 | B1 | 9/2020 | Jain et al. |
| 10,938,651 | B2 | 3/2021 | Jain et al. |
| 11,056,242 | B1 | 7/2021 | Jain et al. |
| 11,061,798 | B1 | 7/2021 | Jain et al. |
| 11,082,487 | B1 | 8/2021 | Jain et al. |
| 11,102,304 | B1 | 8/2021 | Jain et al. |
| 11,315,041 | B1 | 4/2022 | Jain et al. |
| 2007/0143148 | A1* | 6/2007 | Kol ...................... G06Q 40/08 705/3 |
| 2008/0021287 | A1 | 1/2008 | Woellenstein et al. |
| 2008/0244184 | A1* | 10/2008 | Lewis ............ G06F 16/24552 711/130 |
| 2011/0125527 | A1 | 5/2011 | Nair |
| 2011/0125528 | A1 | 5/2011 | Padate et al. |
| 2012/0231959 | A1* | 9/2012 | Elton ..................... G16H 50/80 435/6.12 |
| 2014/0207918 | A1 | 7/2014 | Kowalski |
| 2014/0278536 | A1 | 9/2014 | Zhang et al. |
| 2015/0199490 | A1 | 7/2015 | Iancu et al. |
| 2015/0331927 | A1 | 11/2015 | Venkatesan |
| 2015/0373098 | A1 | 12/2015 | Mordani et al. |
| 2016/0012182 | A1* | 1/2016 | Golay ................... G16H 40/20 705/3 |
| 2016/0094650 | A1 | 3/2016 | Garcia de Rio |
| 2016/0156671 | A1 | 6/2016 | Cabrera |
| 2016/0210427 | A1* | 7/2016 | Mynhier ............... G16H 10/60 |
| 2016/0314280 | A1* | 10/2016 | Fusari .................. G16H 10/20 |
| 2016/0350481 | A1 | 12/2016 | Wesemann |
| 2017/0039324 | A1 | 2/2017 | Francois et al. |
| 2017/0103167 | A1* | 4/2017 | Shah ................... G06Q 10/101 |
| 2018/0227300 | A1 | 8/2018 | Nakic et al. |
| 2019/0197246 | A1 | 6/2019 | Viswanathan |
| 2019/0273778 | A1 | 9/2019 | Mordani et al. |
| 2019/0286832 | A1 | 9/2019 | Szeto |
| 2020/0028911 | A1 | 1/2020 | Sun et al. |
| 2020/0034685 | A1 | 1/2020 | Kempf |
| 2020/0131581 | A1 | 4/2020 | Jain et al. |
| 2020/0250587 | A1 | 8/2020 | Aerni |
| 2021/0090694 | A1* | 3/2021 | Colley .................. G16B 40/00 |
| 2022/0400986 | A1 | 12/2022 | Khanal et al. |

OTHER PUBLICATIONS ncbi.nlm.nih.gov [online], "The Benefits of Data Sharing," Mar. 29, 2013, retrieved on Sep. 2, 2022, retrieved from URL<https://www.ncbi.nlm.nih.gov/books/NBK137823/>, 5 pages.

Ross, "Clinical research data sharing: what an open science world means for researchers involved in evidence synthesis," Systematic Reviews, 2016, 5:159, 4 pages.

altexsoft.com [online], "Comparing Machine Learning as a Service: Amazon, Microsoft Azure, Google Cloud AI, IBM Watson", published on Sep. 27, 2019, [retrieved on Dec. 10, 2020], retrieved from URL<https://www.altexsoft.com/blog/datascience/comparing-machine-learning-as-a-service-amazon-microsoft-azure-google-cloud-ai-ibm-watson/ >, 23 pages.

cloud.google.com [online], "Multitenancy", published on or before Sep. 21, 2020, [retrieved on Dec. 10, 2020], retrieved from URL<https://cloud.google.com/datastore/docs/concepts/multitenancy>, 4 pages.

customerthink.com [online], "Top 10 Machine Learning-as-a-Service Providers 2020", published on Feb. 12, 2020, [retrieved on Dec. 10, 2020], retrieved from URL<https://customerthink.com/top-10-machine-learning-as-a-service-providers-2020/>, 5 pages.

Datascientistinsights.com [online], published in 2014, [retrieved on Dec. 10, 2020], retrieved from URL<https://datascientistinsights.com/2013/01/29/six-types-of-analyses-every-data-scientist-should-know/>, 6 pages.

docs.microsoft.com [online], "Machine learning tasks in ml.net", published on Dec. 23, 2019, [retrieved on Dec. 10, 2020], retrieved from URL<https://docs.microsoft.com/en-us/dotnet/machine-learning/resources/tasks#:~:text=A%20machine%20learning%20task%20is,groups%20data%20according%20to%20similarity>, 8 pages.

grants.nih.gov [online], "NIH Data Sharing Policy and Implementation Guidance", published on or before Sep. 21, 2020, [retrieved on Dec. 10, 2020], retrieved from URL<https://grants.nih.gov/grants/policy/data_sharing/data_sharing_guidance.htm>, 11 pages.

U.S. Non Final Office Action in U.S. Appl. No. 17/028,799, dated Dec. 3, 2020, 34 pages.

U.S. Notice of Allowance in U.S. Appl. No. 17/028,741, dated Mar. 4, 2021, 9 pages.

whatis.techtarget.com [online], "Multi-tenancy", published on or before Sep. 21, 2020, [retrieved on Dec. 10, 2020] retrieved from URL<https://whatis.techtarget.com/definition/multi-tenancy>, 4 pages.

Wikipedia.org [online], "Data analysis", published on or before Sep. 21, 2020, [retrieved on Dec. 10, 2020], retrieved from URL<https://en.wikipedia.org/wiki/Data_analysis#Modeling_and_algorithms>, 18 pages.

Wikipedia.org [online], "Multitenancy", published on Sep. 17, 2020, [retrieved on Dec. 10, 2020], retrieved from URL<https://en.wikipedia.org/wiki/Multitenancy>, 5 pages.

Final Office Action in U.S. Appl. No. 17/028,799, dated Apr. 15, 2021, 46 pages.

Notice of Allowance in U.S. Appl. No. 17/028,799, dated Jan. 12, 2022, 31 pages.

Cdisc.org [online], "CDISC Standards in the Clinical Research Process", published on Mar. 15, 2016, retrieved on Sep. 13, 2021, retrieved from URL<https://www.cdisc.org/standards>, 3 pages.

Cdisc.org [online], "Data Exchange", published on Mar. 15, 2016, retrieved on Sep. 20, 2021, retrieved from URL<https://www.cdisc.org/standards/data-exchange>, 2 pages.

Datascience.cancer.gov [online], "Cancer Data Aggregator—The Engine that Could . . . Drive Data Aggregation in a Whole New Way", published on May 19, 2020, retrieved on Sep. 20, 2021, retrieved from URL<https://datascience.cancer.gov/news-events/blog/cancer-data-aggregator-engine-could-drive-data-aggregation-whole-new-way>, 6 pages.

Datascience.cancer.gov [online], "Cancer Research Data Commons Repositories", published on Oct. 20, 2020, retrieved on Sep. 20, 2021, retrieved from URL<https://datascience.cancer.gov/data-commons/repositories>, 4 pages.

Datascience.cancer.gov [online], "Center for Cancer Data Harmonization (CCDH)", published on Aug. 20, 2020, retrieved on Sep. 20, 2021, retrieved from URL<https://datascience.cancer.gov/data-commons/center-cancer-data-harmonization-ccdh>, 5 pages.

Datascience.cancer.gov [online], "CRDC", published on May 29, 2020, retrieved on Sep. 20, 2021, retrieved from URL<https://datascience.cancer.gov/sites/default/files/2020-06/CRDCFactSheet-5.29.20.pdf>, 4 pages.

Datascience.cancer.gov [online], "Data Commons Framework", published on Aug. 20, 2020, retrieved on Sep. 20, 2021, retrieved from URL<https://datascience.cancer.gov/data-commons/data-commons-framework>, 3 pages.

Datascience.cancer.gov [online], "Data Sharing and Public Access Policies", published on Nov. 3, 2020, retrieved on Sep. 20, 2021, retrieved from URL<https://datascience.cancer.gov/data-sharing/policies>, 6 pages.

Datascience.cancer.gov [online], "NCI Cancer Research Data Commons", published on Sep. 8, 2017, retrieved on Sep. 20, 2021, retrieved from URL<https://datascience.cancer.gov/data-commons>, 4 pages.

(56) References Cited

OTHER PUBLICATIONS

Datascience.cancer.gov [online], "NCI Cloud Resources", published on Aug. 20, 2020, retrieved on Sep. 20, 2021, retrieved from URL<https://datascience.cancer.gov/data-commons/cloud-resources>, 4 pages.
U.S. Office Action in U.S. Appl. No. 17/340,288, dated Oct. 14, 2022, 18 pages.
Office Action in U.S. Appl. No. 17/980,312, dated Feb. 2, 2023, 14 pages.

\* cited by examiner

PLATFORM TO COMBINE RESEARCH DATA SETS FROM MULTIPLE CLINICAL TRIALS AND ENABLE DATA SHARING

CROSS-REFERENCE TO RELATED APPLICATIONS

This application is a continuation of U.S. application Ser. No. 17/028,741, filed Sep. 22, 2020, now allowed, which is incorporated by reference in its entirety.

FIELD

This specification generally describes technology related to data policy management, and more specifically, to a multi-tenant data access platform that provides differentiated access to collected data based on applying data policies.

BACKGROUND

Software as a service (SaaS) refers to a method of software delivery that allows software and data to be remotely hosted and then accessed from a client device over a network, for example, with an Internet connection and a web browser. In this network-based model, software is centrally hosted and/or maintained on a server system and provisioned to clients, for example, on a subscription basis. SaaS deployments can be configured so that clients often do not require extensive hardware, since software is centrally hosted on a server system that is maintained by a software provider and/or software vendor.

In healthcare, SaaS applications include clinical information systems and non-clinical information systems that replace traditional software usage by reducing the need to own and host hardware. Healthcare SaaS applications can be deployed in hospitals to manage different aspects of healthcare, such as healthcare data collection, de-identification of personally identifiable information, and/or maintaining electronic medical records.

SUMMARY

This disclosure describes systems and techniques for providing a hierarchical multi-tenant data access platform configured to collect data for multiple tenant organizations and selectively make the collected data available according to policies associated with the respective tenant organizations. The platform can be implemented on a server system that stores organization hierarchy data specifying units within a tenant organization, relationships amongst the units, and users associated with respective units. The server system also stores policy data specifying respective levels of data access and respective types of data use permitted for different units of the tenant organization and for one or more other tenant organizations. The organization hierarchy data and policy data enable the server system to facilitate collaboration and data sharing among the units of an organization as well as between different organizations, while enforcing customized policies for data access, authentication, data retention, and so on in the collaborations.

The server system also provides a platform that can perform machine learning tasks and data analysis for users, often allowing analysis to be performed by the system on behalf of users that the data policies would not permit users to perform on their own. For example, data policies may not allow a user from an organization to view or download certain data sets, but the data policies may allow the system to perform a statistical analysis on the data sets or to train or test a machine learning model using the data sets. The analysis results or machine learning models, although determined using on restricted data sets, do not include or reveal the private information that the data policies restricted, and so can be provided to a wide set of recipients. This and other techniques can vastly increase the available set of data that can be used for statistical analysis, machine learning tasks, and other uses.

The server system can use the organization hierarchy data and policy data to dynamically provide different levels of access to individual units of a tenant organization in a manner that is consistent with the data permission requirements of the tenant organization. By maintaining access policies governing access permissions for each individual unit within a tenant organization and a hierarchy model specifying relationships between the individual units, the server system can provide access to data, such as health data, in a consistent but customized fashion. As examples of levels of data access, the server system can set time windows for obtaining access to health data, limit access to subsets of the health data corresponding to a certain data type, or specify permission levels for modifying the health data.

The architecture of the platform disclosed herein provides flexibility to support different aspects of the computing needs of a tenant organization while enabling depths that match the complex structure of the tenant organization. For example, a software deployment for managing a health research study often involves operations related to study participants (e.g., scheduling appointments, collecting patient samples, monitoring physiological data, etc.) and operations related to researchers that conduct the study (e.g., evaluating collected data, obtaining regulatory approvals, etc.). The platform disclosed herein enables an organization to manage various aspects of a research study using a single deployment that allows use of a single hosted platform to coordinate functions performed by participants and researchers without requiring separate hardware configurations.

The platform disclosed herein can use a multi-tenant architecture in advantageous ways to reduce the likelihood of policy conflicts between multiple tenant organizations. As an example, a first tenant organization and a second tenant organization may coordinate a collaborative research study. The first tenant organization may have a data sharing regulation in place that restricts access to personally identifiable information (PII) of participants enrolled the research study to only individuals that are affiliated with the first tenant organization. However, the second tenant organization may provide open access to PII to all individuals (including those not specifically affiliated with the second tenant organization). In this example, the platform can define access policies based on affiliations of individuals that request to access health data. For instance, if the individual accessing the health data is affiliated with the first tenant organization, then this affiliation is used to identify and apply a data policy that provides access to individuals affiliated with the first research organization. In contrast, if the person accessing the health data is affiliated with the second research organization, then this affiliation is instead used to identify a different data policy that only provides de-identified participant data to individuals affiliated with the second research organization. In the second example, even though the second research organization does not have a data sharing regulation in place, the stricter access restrictions of the first tenant organization take precedence to prevent a violation of its data sharing regulation. In this way, the platform generates different sets of data policies based on collective consideration of the requirements of each individual tenant organization and circumstances related to those requirements (e.g., the status of a person requesting access to health data).

In one general aspect, a method performed by one or more computers of a server system comprises: storing, by the server system, data collected through a multi-tenant data access platform configured to collect data for each of multiple tenant organizations and to selectively make the collected data available according to policies associated with the respective tenant organizations, wherein the data is stored in association with organization hierarchy data and policy data for the respective tenant organizations; receiving, by the server system, a data access request associated with a user, the data access request involving data for a first unit of a tenant organization; in response to receiving the data access request, using, by the server system, the organization hierarchy data to determine that the user is associated with a second unit of the tenant organization; accessing, by the server system, a portion of the policy data for the tenant organization that indicates a level of data access with which the second unit of the tenant organization is permitted to access data of the first unit of the tenant organization; identifying, by the server system, a subset of the data of the first unit of the tenant organization, wherein the subset is limited according to the accessed portion of the policy data; and providing, by the server system, a response to the data access request that is based on the identified subset of the data for the first unit of the tenant organization.

In some implementations, the data collected through the multi-tenant data access platform comprises monitoring data generated using sensors of mobile devices and/or wearable devices of users.

In some implementations, the data access request comprises a search query for the data for different units of the multiple tenant organizations.

In some implementations, the level of data access indicated by the portion of the policy data for the tenant organization comprises: a set of time windows for obtaining access to the data; subsets of the data that each correspond to a different data type; and/or permission levels for modifying the data.

In some implementations, the method includes: providing, by the server system, one or more configuration data modules to mobile devices associated with the tenant organization, wherein: different configuration data modules are provided to mobile devices associated with different units of the tenant organization, and the different configuration data modules respectively cause the mobile devices to perform monitoring and reporting of different types of data and/or different types of user actions.

In some implementations, the method includes: in response to receiving the data request associated with the user, selecting to respond to the request using an option selected from among a set of options comprising at least (i) personally identifiable data for a set of users associated with the tenant organization, (ii) de-identified data for the set of users, and (iii) one or more aggregations of the data for the set of users, wherein the selection is made based on the accessed portion of the policy data for the tenant organization.

In some implementations, the data collected through a multi-tenant data access platform comprises monitoring data generated using one or more applications running on user devices associated with the tenant organization; and the applications are configured to collect and report data based on downloadable configuration data modules for the respective tenant organizations, wherein the downloadable configuration data modules for different tenant organizations configure the one or more applications to collect and report different types of data for the different tenant organizations.

In some implementations, the policy data for the tenant organization specifies (i) different levels of access permitted for units of the tenant organization to access collected data for other units of the tenant organization, and (ii) different levels of access permitted for units of one or more other tenant organizations to access collected data for units of the tenant organization.

In another general aspect, a method performed by one or more computers of a server system comprises: providing, by the server system, a multi-tenant data sharing platform configured to selectively use stored data collected for different tenant organizations according to policy data for the respective tenant organizations that indicates permitted use of collected data for an organization by other tenant organizations, the tenant organizations comprising a first tenant organization and a second tenant organization; receiving, by the server system, a request from the first tenant organization to perform a machine learning task involving a data set of the second tenant organization; determining, by the server system and based on stored policy data for the second tenant organization, that a policy of the second tenant organization that is applicable to the data set permits use of the data set by the first tenant organization in the machine learning task; based on the determination, performing, by the server system, the machine learning task requested by the first tenant organization; and providing, by the server system, a result of the machine learning task to the first organization.

In some implementations, the request to perform the machine learning task comprises a request to train a machine learning model based on the data set of the second tenant organization.

In some implementations, the machine learning model comprises a neural network.

In some implementations: determining that the policy of the second tenant organization permits use of the data set by the first tenant organization in the machine learning task comprises determining that the policy of the second tenant organization permits use of the data set by the first tenant organization in training the machine learning model; and performing the machine learning task requested by the first tenant organization comprises training, by the server system, the machine learning model based on the data set of the second tenant organization.

In some implementations: providing the result of the machine learning task comprises providing data indicating a trained machine learning model generated by training the machine learning model based on the data set of the second tenant organization; and the request does not include any portion of the data set of the second tenant organization.

In some implementations, the request to perform the machine learning task comprises a request to apply a machine learning model to one or more records of the data set of the second organization.

In some implementations, performing the machine learning task requested by the first tenant organization comprises: accessing the one or more records of the data set of the second organization; generating an input vector for the machine learning model; and based on generating the input vector, applying the machine learning model to the one or more accessed records of the data set of the second organization; and generating an output of the machine learning model based on applying the machine learning model to the one or more accessed records of the data set of the second organization.

In some implementations, providing the result of the machine learning task to the first organization comprises providing data indicating output of the machine learning model; and the request does not include any portion of the one or more accessed records of the data set of the second organization.

In some implementations, the method includes evaluating, by the server system, the output of the machine learning model based on the request from the first tenant organization to perform the machine learning task.

In some implementations, evaluating the output of the machine learning model comprises assigning a classification label to the output of the machine learning model based on the one or more accessed records of the data set of the second organization.

In some implementations, the request to perform the machine learning task comprises a request to predict an outcome based on the data set of the second organization.

In some implementations, performing the machine learning task requested by the first tenant organization comprises: accessing a machine learning model that is configured to predict the outcome specified in the request; applying the machine learning model to one or more records included in the data set of the second organization; and generating output data corresponding to the outcome predicted by the machine learning model based on applying the machine learning model to the one or more records included in the data set of the second organization.

In some implementations, accessing the machine learning model comprises generating, by the server system, the machine learning model based on receiving the request to predict the outcome based on the data set of the second organization.

In some implementations: the machine learning model was configured by the second tenant organization; and the policy of the second tenant organization permits use of the machine learning model by the first tenant organization in predicting the outcome based on the data set of the second organization.

In some implementations, performing the machine learning task comprises: generating, by the server system, a machine learning model; training, by the server system, the machine learning model using respectively collected for multiple of the different tenant organizations; and wherein providing the result of the machine learning task comprises providing access to the trained machine learning model to one or more of the tenant organizations.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more implementations are set forth in the accompanying drawings and the description below.

Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
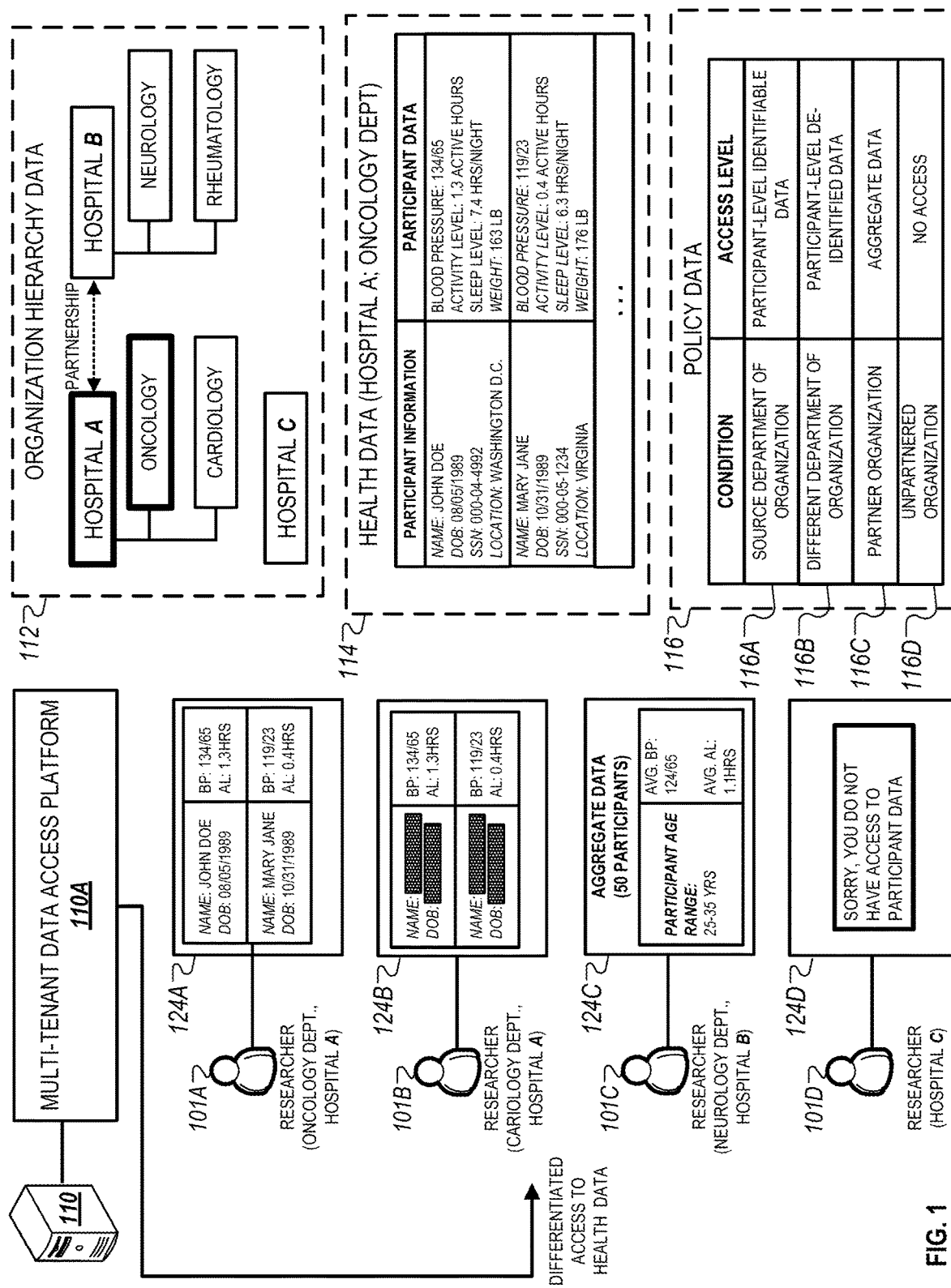
FIG. 1 illustrates an example of a technique for applying policy data to provide different levels of access to participant data to individual units of a tenant organization through a hierarchical multi-tenant data access platform.

In general, this disclosure describes systems and techniques for providing a multi-tenant data access platform configured to collect data for multiple tenant organizations and selectively make the collected data available according to policies associated with the respective tenant organizations. The platform can be implemented on a server system that stores an organization hierarchy data specifying units within a tenant organization, relationships amongst the units, and users associated with respective units. The server system also stores policy data specifying respective levels of data access permitted for different units of the tenant organization and one or more other tenant organizations.

The platform is a multi-tenant system in the sense that it uses a common infrastructure (e.g., hardware, software, data storage, network resources, etc.) to support multiple customers, e.g., different tenant organizations or simply "tenants," each of which have their own different data storage and data access needs. Each tenant can have its own set of users (e.g., researchers, administrators, and others that can use the analysis capabilities of the platform), its own set of data sources for providing data into the platform (e.g., a set of devices or individuals, such as research study participants), its own separate data access and use policies enforced in the platform, and other tenant-specific processes and needs.

The platform may use a single instance of software to provide this multi-tenant support, but it is not required to do so. For example, the platform may avail itself of multiple instances of software or multiple servers that together serve the various tenants of the platform. Each tenant can have its own corresponding group of users and/or software applications that may access the platform. For example, a tenant organization can be a healthcare institution may be deployed an instance of software and a database for managing a research study for collecting data for a set of participants of the research study. In this example, the tenant organization includes multiple units, such as different departments operating within the healthcare institution (e.g., Oncology, Neurology, and Rheumatology departments). Each unit can be specified within an organization hierarchy model for the tenant organization that represents relationships amongst units as they relate to, for example, access to data collected through the software instance.

Each unit can also identified within a set of policies that are applied to provide differentiated levels of access to healthcare data consistent with the requirements set forth within the policies. For example, users of the Oncology department may have greater level of access to healthcare data of a research study involving cancer patients compared to the level of access of users of the Neurology department. Another example of a tenant organization is a pharmaceutical company, which may have different departments, joint ventures, clinical studies, collaborations with universities, and so on, all of which may have their own sets of data and their own requirements about how the data can be used. Even for units within the same company, the platform can enforce limits and condition on data sharing. In addition, the platform also makes it easier for the company to selectively share data from different units with partner companies, universities, clinicians, insurance companies, and regulatory agencies by automatically allowing data access and data use that are governed by the parameters that the company sets in the applicable data policies.

The platform uses data policies to specify the ways that data is permitted to be accessed and used by different parties. A data policy can specify rules of conditions that are applied to configure the access, aggregation, and/or processing of health data and other data collected through a data access platform. For example, a data access policy can be applied to configure differentiated levels of data access among different tenant organizations or different units of a single tenant organization. As another example, a data aggregation policy can be applied to de-identify participant data for a research study in accordance with the data regulations of a tenant organization that manages the research study. Data policies can specify rules and/or conditions associated with each tenant organization and/or different units of a single tenant organization. For example, data policies can specify a set of time windows for obtaining access to data, respective subsets of data that are accessible and inaccessible, permission levels for modifying data, among others. Other types of data policies are discussed in greater detail below.

As described further below, mobile applications can be customized with program modules that change the behavior of the application, e.g., to alter interaction of a mobile application with a user and/or alter data collection by the application. For example, participants in a research study may first download and install an general application, and then receive a program module that is specifically tailored to provide the surveys, sensor data collection, and user interfaces for the research study. The program module can include one or more of content, configuration data, software code, or instructions that define a user experience associated with a mobile application. In some implementations, the program module includes only non-executable configuration data and content. The program module can indicate specific features of an application that an organization selects to provide to the user. When downloaded and stored on a user device, the program module configures an associated mobile application to provide custom content and interactions for a particular user. When the user subsequently runs the application, the application retains the configuration, appearance, and interactivity specified by the previously downloaded program module. Using a customized program module, the mobile application can provide a user with a customized user experience similar to a native mobile application, without the need for the client organization to write code for and register an application with an app store (e.g., the Apple App Store, or Google Play for Android Apps, etc.). The program module can also include or refer to various content items such as media, forms, and user interface parameters that include customized logos and branding for a client organization. In addition, the program module enables the user and the organization to perform specific types of data tracking and reporting according to a user's specific medical needs, or the priorities of the client organization (e.g., to encourage and reward exercise, or to promote quitting smoking, etc.).

Healthcare providers are among the various types of tenants that may make use of the platform. Healthcare providers include individuals, institutions, or organizations that provide healthcare services to users. In some instances, the healthcare provider can be an individual health professional such as a physician, or an entity such as a hospital that provides preventative, curative, or rehabilitative programs for users, or a health insurance provider. Healthcare providers can use a provider portal to interact with the publishing system, both to submit information that is accessed through appropriate modules and to receive information from users of certain modules to use in enhancing treatment. As an example, healthcare providers may submit health-related information such as electronic health records, treatment program information, or promotional material. This information may be general for a group of users (e.g., for all users who have a particular insurance plan) or specific to individual users. In some instances, the information submitted on the provider portal can be compiled into a set of module information that is used to personalize the display and operation of the customized health management modules to the provider.

While many examples herein discuss healthcare and health data, the platform can be used to promote data collection and data sharing in many other contexts. For example, the system can be used in schools and other educational settings to allow limited, selective access to data about students (e.g., their performance, progress, engagement, and so on) among different teachers and departments. As another example, the platform may be used to collect and share data among scientists and researchers in many fields, e.g., engineering, computer science, materials science, chemistry, biology, sociology, psychology, and so on. For example, different companies conducting research in the field of semiconductor process technology may use the platform and its technology to selectively share certain test data about materials and structures to better collaborate with partners, suppliers, vendors, etc.

Various examples below refer to various types of individuals whose data is collected by and stored by the platform. These individuals include, for example, participants in research studies, patients receiving medical care, users of mobile devices that provide monitoring data, and so on.

FIG. 1 illustrates an example of a technique for applying policy data 116 to provide different levels of access to participant data to units of a tenant organization through a multi-tenant data access platform 110A. As discussed further below, a major function of the platform 110A is to provide features that promote efficient sharing of data within organizations and between organizations, while also enforcing the data policies that organizations set. The platform 110A is also referred to a data access platform or a data sharing platform.

In general, the platform 110A represents a set of services, interfaces, and functionality that is provided to tenants. The platform 110A may receive requests and provide responses through, for example, software applications, web pages, web applications, application programming interfaces (APIs), and other functionality. The platform 110A is provided by or supported by the server system 110, which can represent one or more computers, which can be distributed. In some cases, the server system 110 provides or makes use of cloud computing environments to provide the features of the platform 110A. The server system 110 can represent a collection of hardware, such as one or more data centers, one or more databases, one or more application servers, and/or other components, that implement the multi-tenant architecture disclosed herein.

The server system 110 can provide the platform 110A in any of various different manners that support different tenants. The data and processing for the tenants are separated logically in the system, but the infrastructure (e.g., hardware and often most or all software also) is integrated and shared. For example, one technique is to run the platform 110A as a single instance of software for the platform that runs on the server system 110 and serves multiple tenants. In some cases, the hardware and software completely shared among tenant organizations, operations and data are logically isolated between tenants except where the data sharing functionality allows limited access according to the data policies, and with fully centralized services provided by the platform 110A. Another example is to use the server system 110 to optionally run multiple instances of the software but on a shared system, e.g., on the same operating system or hardware. In some implementations, separate virtual machines or separate containerized instances of at least some aspects of the platform 110A may be used for individual tenants, and some aspects of the platform (e.g., a database engine, a web server engine, etc.) may be shared and used to provide service to many tenants.

The platform 110A can be implemented in any suitable configuration supporting multi-tenancy in servers, cloud, or other environments. The platform 110A can be implemented as a multi-tenant public cloud, where the same servers of the server system 110 are used in a hosted environment to host multiple users across different tenant organizations. Each tenant is given a separate and secure (e.g., access controlled, encrypted, or otherwise secured) logical space within those servers to store data.

Various database topologies can be used. One example architecture is to use a single, shared database schema for a multi-tenant database. This technique can use a single application and database instance to host tenants and store data. Another example architecture involves the use of a single database with multiple schemas. This architecture uses a single application instance with individual databases for each tenant. Another example architecture can host data in multiple databases, e.g., separate databases for separate tenants.

For any of the various software and hardware configurations, each tenant has its own dedicated configurations, data, user management, and other properties. Tenants may share some aspects in the platform, such as user interfaces, rules, database schemas, etc., although these may be customized by each tenant also.

The platform 110A can provide one or more data partitions for each tenant organization. The partitions can be used to silo data for each tenant. Each tenant's data is stored in its own data partition(s), which by default are not accessible to other organizations. In some implementations, each tenant has a single data partition. In other implementations, there are separate partitions for each unit of a tenant, such as sub-partitions within a larger tenant-level partition. Each partition can be associated with a globally unique partition identifier (e.g., a tenant identifier in the case of a tenant-level partition, or a unit identifier in the case of a unit-level partition) and partition configuration, and/or partition-specific applications or resources. In some cases the partition identifier can be formed by a combination of elements such as a namespace identifier and another identifier. For example, the namespace identifier can correspond to the tenant, and a further identifier can correspond to the unit, so that partitions for units in the same tenant organization are within the same namespace.

In traditional multi-tenant systems, each tenant's data is isolated from other tenants and remains invisible to and inaccessible by other tenants. This does not allow for efficient sharing and aggregation of data for different tenants, however. The platform 110A provides the capability for each tenant organization to define data policies to selectively share its data in a customized manner within the organization (e.g., for different units and users) as well as with other tenant organizations. For example, a tenant organization can define data policies to share data with one or more other organizations (e.g., specific organizations, categories of organizations, etc.). The data policies can specify different levels of access to provide for different organizations. The data policies allow the data sharing to be made subject to rules, conditions, usage restrictions, and other criteria that are enforced by the server system 110.

The data sharing features allow organizations to seamlessly use aggregate sets of data that cross tenant boundaries, contrary to the design of traditional multi-tenant architectures. For example, when running a search based on a search query, rather than restrict the search to the data partition for a single tenant (e.g., the one of the user that submitted the query), the server system 110 can search across multiple partitions of different tenants. For example, the server system 110 can run a search over a combined data set, e.g., by making a join of data in databases for different tenants. As another example, the search may be performed in parallel for each different data partition, and the server system 110 can combine the results. As another example, the server system 110 may select out the relevant or accessible portions of data from data partitions for different tenants to create a working data set that can be searched. Tenants do not gain automatic or unrestricted access to the data of other tenants, however. Access to each tenant's data is limited based on the data policies of that tenant, which may restrict which portions of data (e.g., which databases, tables, records, columns, fields, files, values, data types, etc.) can be accessed. The server system 110 enforces these limits automatically and seamlessly, so that data that cannot be used for a request is omitted and the data policies are enforced. Yet the data that can be accessed according to the policies can be presented and used in the same manner as though it were part of the tenant's own data partition. This may involve making working copies of data sets or even copying some data from other tenants (e.g., the portions of data accessible to a tenant) into the data partition of a tenant operating on the data.

In this example, platform 110A is configured to collect health data 114 for a research study being conducted by two collaborating tenant organizations, Hospitals A and B. A third tenant organization, Hospital C, is not partnered with either Hospital A or B, or associated with the research study. In some implementations, a single instance of the software for the platform 110A supports all of the tenant organizations, but with the operations and data for different tenant organizations isolated except as permitted according to the data policies. In other implementations, each of the three tenant organizations may have a respective software instance on the server system 110 through the platform 110A. In this optional implementation, the platform 110A enables a multi-tenant architecture in which the server system 110 runs three software instances to support the three tenant organizations. For any of the implementations discussed herein, the platform 110A can be used by researchers to access health data collected through the platform 110A, perform analysis of the data, adjust data collection procedures and so on.

Referring now to the technique shown in FIG. 1 allows the server system 110 to provide differentiated access to health data 114 to each of four researchers 101A, 101B, 110C, and 101D. Access to health data may be provided specifically in response to a data access request submitted by a researcher, or alternatively, once the researcher accesses a user interface enabled by the platform 110A. For example, the platform 110A can provide a research portal through which the researchers 101A-101D can view health data that is collected for a research study.

The server system 110 adjusts the level of access to health data 114 given that each of the researchers 101A-101D are affiliated with different tenant organizations or different units of a tenant organization. For example, researchers 101A and 101B are each affiliated with Hospital A, but researcher 101A is specifically affiliated with the Oncology department of Hospital A whereas researcher 101B is instead affiliated with the Cardiology department of Hospital A. Researcher 101C is associated with the Neurology department of Hospital B and researcher 101D is associated with Hospital C.

Affiliations of the researchers 101A-101D impact a level of access since, for example, the regulations of Hospital A (e.g., the tenant organization that is conducting the research study) may prohibit the sharing of health data with non-partner organizations, such as Hospital C. Different levels of access may also be designated within a single tenant organization for patient confidentiality purposes. For example, while the Cardiology department of Hospital A is within the same hospital network as the Oncology department, the patient privacy guidelines of the research study may limit access to PII to researchers directly involved in conducting the research study (e.g., only researchers of Hospital A within the Oncology department and managing the research study). Similarly, while researchers of Hospital B are affiliated with a different hospital network than Hospital A, they may be granted a certain level of access given that Hospital B is collaborating with Hospital A in conducting the research study.

The server system 110 uses the organization hierarchy data 112 to apply policy data 116 and thereby enable differentiated access to health data 114 in the manner discussed above. The organization hierarchy data 112 specifies relationships between units of a tenant organization. For example, the Oncology department and the Cardiology department are identified as units within Hospital A. Similarly, the Neurology department and the Rheumatology department are identified as units within Hospital B. The organization hierarchy data 112 also identifies a partnership between Hospitals A and B based on a collaboration between the two organizations in conducting the research study. Additionally, while Hospital C is identified within the organization hierarchy data 112, no relationship is specified with either of Hospitals A and B since Hospital C is not involved in the management of the research study. The server system 110 accesses portions of the policy data 116 corresponding to data access policies to determine the level of access to provide to each of the researchers 101A-101D.

Referring to the first example shown in FIG. 1, the server system 110 determines that researcher 101A is affiliated with the Oncology department of Hospital A, which is the source department that manages research study. Based on this, the server system 110 determines that a condition specified by data policy 116A is satisfied and, as a result, provides the researcher 101A with access to participant-level identifiable data through interface 124A. As shown in the figure, participant-level identifiable data includes both participant information (e.g., name, date of birth, social security number, location) and participant data (blood pressure, activity level, sleep level, weight) within the health data 114.

In the second example shown in FIG. 1, the server system 110 determines that researcher 101B is affiliated with the Cardiology department of Hospital A, which is a different department of Hospital A (e.g., a department that is not the source department identified in data policy 116A). Based on this, the server system 110 determines that a condition specified by data policy 116B is satisfied and, as a result, provides the researcher 101B with access to participant-level de-identified data through interface 124B. As shown in the figure, participant-level de-identified data includes participant data (blood pressure, activity level, sleep level, weight) within the health data 114 but excludes patient information. As discussed above, this restriction may be imposed to limit access to patient information to researchers conducting the research study but still provide access to data collected through the research study.

In the third example shown in FIG. 1, the server system 110 determines that researcher 101C is affiliated with the Neurology department of Hospital B, which is a department of Hospital B (e.g., a partner organization of Hospital A). Based on this, the server system 110 determines that a condition specified by data access policy 116C is satisfied and, as a result, provides the researcher 101C with access to aggregate data through interface 124C. As shown in the figure, aggregate data does not include participant-level data, but includes study-level data, such as a participant age range (e.g., 25-35 years old), an average blood pressure (e.g., 124/65 mmHg), or an average daily activity (e.g., exercise or movement) level (e.g., 1.1 hours). In this example, the restriction can be imposed to provide generalized access to research study since Hospital B is collaborating with Hospital A in conducting the research study.

In the fourth example shown in FIG. 1, the server system 110 determines that researcher 101D is affiliated with the Hospital C, which is neither the source organization conducting the research study (e.g., Hospital A) or a partner organization of the source organization (e.g., Hospital B). Based on this, the server system 110 determines that a condition specified by data access policy 116D is satisfied and, as a result, prohibits the researcher 101D from access to any information specified in the health data 114. In this example, the restriction can be imposed to minimize unauthorized access to the health data 114 by researchers that are not affiliated with either the source organization or a partner organization.

In some implementations, the policy data 116 can include data policies with varying degrees of applicability to individual units of a tenant organization. For instance, the policy data 116 can include a data policy for each unit of the tenant organization, as is the case with data policy 116A for the Oncology department of Hospital A. In other instances, the policy data 116 can include a data policy that is applicable to multiple units that are within the same level of the hierarchy model for a tenant organization. For example, the policy data 116 can include a single data policy that is applicable to both the Oncology department and the Cardiology department of Hospital A since each is a hospital department. In some other instances, data policies can be applicable to specific types of units regardless of where they are included in the hierarchy model of the tenant organization. For example, one data policy can be applied for all units that are clinical testing sites of a healthcare organization and another data policy can be applied for all units that are bench laboratories of the healthcare organization. In each of these examples, data policies can be defined to provide different levels of access to health data 114 based on the specific needs of the tenant organization.

In some implementations, the policy data 116 specify conditions for access in addition to, or as an alternative to, providing different levels of access. For example, data policies can be specified based on types of credentials received with a data access request. As another example, data policies can be specified based on terms specified by the tenant organization when providing access in response to a data access request. For instance, a data policy can restrict certain types of use of health data if the use would violate a confidentiality term of the tenant organization.

The platform 110A provides features for organizations to collect and store data remotely in a cloud computing environment provided by the server system 110. The platform 110A enables organizations to then perform various actions with the data sets, for example, to search the data, generate reports from the data, generate visualizations from the data, perform statistical analysis on the data, perform machine learning tasks using the data, download or share the data, and more.

The data sets that the platform 110A hosts for the various organizations can be easily shared according to the data policies of the organizations that own the data (e.g., the organizations that collected the data and have authority to have authority to set the applicable data policies). For example, The platform can provide an interface through a website, web application, software application, application programming interface (API), or other means that allows the user to issue requests with respect to any data set or combination of data sets that the data policies allow the user to access. For example, a user may submit a query to be processed over not only the user's own organization's collected data but also the collected data of various other organizations. The data sharing platform 110A then carries out the request, for example, by combining the data sets and performing the operations requested, or performing the operations separately for the different data sets and combining the results.

As another example, the data sharing platform enables a user to search for or select a combination of data sets from multiple organizations and define the combined data set as a data set to be used for analysis, machine learning, searching, generating reports, or other purposes. The data sharing platform 110A may do this by creating a new stored data set that copies in all of the accessible and relevant records from the other data sets. As another example, the data sharing platform may create a virtual data set that does not duplicate or compile the data, but defines the virtual data set and references the elements included. The system can present the virtual data set (e.g., as an icon, an option among other data sets for selection, etc.) and make it appear as if it were an independent data set available to be acted on as any other. These and other features allow the data sharing platform 110A to seamlessly allow access to data between units of an organization and between different organizations.

This data collection and storage of the platform 110A also operates to manage collection of data from applications on mobile devices for users associated with the organizations. As the mobile devices collect data from users (e.g., user inputs, user interactions, measurements from sensors, data from wirelessly connected devices, etc.) and report collected data to the platform 110A, the server system 110 receives and processes the incoming data streams. The data policies for each organization can specify how the incoming data should be processed and stored. For example, the data policies can specify which elements should be stored in their original or raw form, which elements should be aggregated or summarized into a composite measure, which data elements may be discarded, appropriate ranges or thresholds to assess the quality or validity of incoming data, and so on.

The data stored by the system can hosted in any of various different ways. For example, data can be stored in a database or data repository, e.g., a relational database, a data warehouse, a data lake, a data mart, or an operational data store.

The system provides high levels of customizability for the data policies. Data policies can include permissions that specify whether to permit or restrict different types of access to data and different uses of the data. For example, the data policies customize how data is accessed and used and vary the level of access provided based on factors such as (1) who is requesting use of the data, (2) the nature of the data to be used, (3) the individuals or other subjects associated with the data, (4) the manner in which the data is to be used, and so on.

A data policy can specify differing levels of access and use permitted by different entities, or for different types or groups of entities. For example, different levels of access can be specified for different organizations (e.g., specific hospitals, universities, companies, government agencies, etc.), units within organizations (e.g., a specific department, office, research study, research group, etc.), individuals, roles, locations (e.g., different access for researchers in different countries or cities), and so on, as well as categories, types, or groups of these (e.g., hospitals of a certain type, research studies that meet certain criteria, etc.).

A data policy can specify differing levels of access and use permitted for different types of data. For example, permissions and restrictions can be designated based on various dimensions or aspects of the data, such as: the time the data was collected; the location where the data was collected or where the associated individual that the data describes resides; the general category of the data (e.g., diet data, exercise data, behavior data, physiological data, mood or mental health data, treatment records, diagnosis information, etc.); the topic or subject for the data, such as a health area involved (e.g., whether the data is for cardiology, neurology, etc.); a specific disease or health condition related to the data (e.g., diabetes, cancer, etc.); a specific type of data element (e.g., heart rate measurements, or resting heart rate more particularly, etc.); and so on. Other aspects of the data, such as the source of the data or manner in which the data was collected (e.g., from user input, from sensor data, from a wearable device, from health records such as EMR/EHR, etc.) and whether it includes personally identifying information can also be used differentiate the access between different organizations. For example, the data policies can permit or restrict access based on time, e.g., allowing access to only a limited window of records (e.g., those that are at least 1 year old, those that are no more than 3 years old, etc.), where the range of time may be different for access by different parties or for different uses. The data policies can permit or restrict access based on location, e.g., allowing access to only data associated with certain geographical regions or sites. As another example, a data policy may specify that first organization can access sensor data, user input, and health records collected during a study, but that a second organization can access only the user input data from the study.

A data policy can specify differing levels of access and use permitted for based on the individuals or other subjects that the data describes, was collected from, or who are otherwise associated with the data. The data policies can permit or restrict access based on preferences of the individuals who the data was collected from or about, so that data acquired under different levels of consent or agreement are shared in different ways. For example, a data policy may limit sharing to records for individuals who have consented to having their data shared with other organizations, and not merely being collected and used by the organization that collected it.

A data policy can specify differing permissions or restrictions for different types of access and use of data. The types of access specified by data policies can include the ability to create, read, write, update or alter, delete, view, copy, annotate, or perform other actions to access data. The data policy can authorize or disallow access at any of multiple levels of scope, such as for an organization's entire set of collected data, for the data of a specific unit of an organization, for a particular data set as a whole, for data from particular sources, for data in specific tables, records, or fields, and so on.

Beyond simply specifying whether data can be accessed or not, the data policy can permit or restrict the uses of that data by others. Examples of uses that may be permitted or restricted include searching (e.g., processing queries), filtering, generating reports, generating visualizations (e.g., charts, graphs, maps, etc.), performing machine learning tasks, performing analysis tasks, evaluating individuals for suitability for a research study cohort, and so on. More specific uses can be permitted or restricted, with some types of analysis being permitted and other types of analysis restricted, and so on. As an example of how the use of data can affect the actions of the system, even if a data policy grants access to read or view a data set, the data policy may restrict the data from being used in certain ways, such as to be shared with or distributed within the platform. As another example, even if a data policy does not grant an organization access to read or view a data set, the data policy may permit a user from the organization to use the data set within the data sharing platform, such as to run a statistical analysis, to perform a machine learning task, to access summary or aggregated data for the data set, and so on, even though access to the individual records of the data set are denied. As another example, although a data set may be restricted from access to the specific data elements of individuals, the data policy may allow searching over the data set to find individuals, potentially with anonymized identifiers, that meet certain criteria. For example, the system can use this technique to identify individuals that meet the criteria for a research study cohort, where the system can access data sets and find matching individuals for a user, even if the user does not have the authorization to access the full underlying data directly.

When the data policy restricts access or use of data based on any or all of the factors discussed herein, the system can implement the restriction in any of various ways, which can be specified in the data policies. For example, the data may simply be made inaccessible, so the user requesting access is denied access. In some cases, data that cannot be accessed or used in any way may be omitted so it does not appear in a user interface as an option for a user to select or interact with. The data policies can cause the system to limit access or use in ways that are more nuanced than binary allowance or denial. For example, the data policies can allow access or use but in a manner that limits the manner of use, the duration of use, the precision of data available (e.g., only two significant digits of a measurement as opposed to full precision), and so on. The data policy can specify, for a given combination of factors, whether personally identifying information is provided, whether data about individual people is permitted or whether only aggregated information is allowed, whether individual measurements or aggregated information is permitted, and so on.

The data policy may specify permissions and restrictions through values, such as a text value, number, or binary value about whether a type of access or use is permitted. As another example, the data policies can include rules that specify conditions, contexts, or combinations of data factors for which data access is permitted or disallowed.

The techniques in this document can be used to collect data for—and to host, process, aggregate, and share data from—various types of research studies, including observational studies, prospective cohort studies, case-control studies, randomized controlled trials (RCTs), clinical trials, observational trials, interventional trials, treatment trials, prevention trials, screening trials, and so on. The techniques can additionally be used to support ongoing research studies and to create new research studies. For example, the data collected in the platform 110A can be used by the system to assist researchers to define study parameters and select cohorts for research studies that involve further data collection, in which cohort members provide data for a period of time after the study begins. The techniques can also be used to define study parameters and select cohorts for studies that are based on previously collected or generated data (e.g., a retrospective analysis or meta-analysis across multiple completed and/or ongoing studies). Another aspect of the platform 110A is that it can analyze data sets, from a user's own organization or other organization, to provide automated detection of individuals satisfying inclusion criteria or exclusion criteria for clinical trials, in real-time.

Today, only 5% of the US population participates in clinical research. With the rise of new software tools that make research faster, cheaper, and more accessible and with a forward-looking FDA digital health team, the time is ripe for a clinical trial paradigm shift. The systems described herein provide the ability to assist in software-enabled clinical trials, e.g., clinical trials that involve mobile applications, web interactions, and other software. The systems described herein can be used for remote clinical research, such as when participants in a study are located remotely from the researchers and may be dispersed throughout a country or even across the world. The system provides the scale and precision for clinical grade applications, including use in clinical trials.

The platform 110A and services discussed herein are designed to make clinical trials and registries more accessible and less costly. This can be done by replacing at least some patient visits at investigator sites with technology-enabled interactions at more convenient locations, including patients' homes. Growing numbers of biopharma, life science companies, contract research organizations (CROs), and non-profit researchers need a virtual research platform to capture clinical study data in between clinic visits, as well as during or instead of clinic visits. The platform supports an integrated suite of user-friendly, highly configurable applications that support electronic consent (e.g., "eConsent"), electronic patient-reported outcomes (ePRO)/electronic clinical outcome assessment (eCOA), patient engagement, telehealth virtual visits, site data capture, and medical device and consumer sensor connection. The platform enables researchers to modernize clinical research for customers, participants, and sites, and makes virtual research approaches the standard in studies and registries.

The platform can be used with research studies of various different types, including for pharmaceutical development and testing. For example, the objective of a study may be different for different types of studies. For example, different types or phases of clinical trials can have different objectives, which can affect the types of data to be collected and conditions to be monitored and thus affect the manner in which the platform 110A manages mobile devices and processes the incoming data collected during a research study. For example, a phase 0 trial may be experimental, with the aim to determine how a drug is processed by the body. A phase I trial may be used to evaluate drug safety and dosage, for example, to find the best dose of a drug that has limited side effects, by gradually increasing dosage until side effects become too severe or positive effects are observed. A phase II trial can be used to assess safety as well as effectiveness of a drug, potentially evaluating effects of a drug in combination with other drugs or other factors. A phase III trial may be used to further assess safety and effectiveness of a drug, for example, to compare effectiveness of a drug with a reference, such as a current standard-of-care drug. As different types of trials have different monitoring and reporting needs, the computer system 110 can use these parameters to determine the needed types of data to instruct mobile device applications to collect (e.g., which sensor data, user survey responses, user interactions, health records, and so on) and also how to process, store, and share that data when it is received.

The platform 110A can provide administrators for tenant organizations tools to customize the behavior of the platform. This can include user interfaces to define and change the hierarchy for the organization, to set and change the data policies for different units, set user access for individual users and groups of users, and more. Even further, the platform gives tenant organizations the tools to track, manage, and communicate with individuals (e.g., research study participants) that are contributing data for the organization. This can include tools for customizing and carrying out various features for a research program, including appointment scheduling, participant pairing/association, segment program participants, and user access group to program's organizational structure. Administrators can actively manage their research program participants' association within their program's organizational structure and determine and set the available locations for their participants to interact, e.g., where appointments can be scheduled, where physical or bio-specimen samples are provided, etc.

The platform 110A can provide flexibility in administration that is not typical, including multi-site management support for multi-study operations, the ability to quickly create new hierarchical structures to support new studies, and many site-level custom fields in the organization hierarchy data to define attributes, such as an ability to designate sites as virtual, transient, or permanent physical sites. The platform 110A can be used for researchers in the fields of human subject research (HSR) and clinical studies, but more generally can provide a multi-tenant system for users of all types and in all industries. The system allows tenants to manage their program's organizational structure, its data policies, and interactions with associated individuals (e.g., for scheduling, location management, electronic communication, data collection, configuration of remote devices and software, etc.).

Some of the features provide by the platform 110A include a user-configurable hierarchy data model, which can be determined for each tenant and included in the organization hierarchy data discussed here. This can include data specifying the configuration of the platform for the tenant, as well as data storage, access, and exchange between units, organizations, users, and data sources. The platform 110A can permit a hierarchy data taxonomy at different levels of granularity or scope, such as for each tenant, each research program, each individual study or sub-study, and so on. The taxonomy can be used, among other things to track which data elements are stored and how they are labeled and formatted. The data elements can include participant attributes (e.g., demographic classifications such as study participants' race, gender, and age), physiological data, health outcome data, health records, and many other types of data.

The platform 110A can specify customized permission levels and access rules, in order to enforce limited access to content, to properly associate study participants and researchers with their corresponding portions of their organization's hierarchy, and set appropriate limits for data sharing. The platform 110A can use geofencing or other location-based data tagging to automatically associate participants to the correct locations given their association in a program's organizational structure. For example, based on a study participant's geographic location and the allowed locations specified in the organization hierarchy data, the system can automatically schedule participants to visit the proper locations for their study. The platform 110A further provides resource scheduling and tracking, such as to define for users (e.g., researchers or administrators engaging with the platform 110A) and participants (e.g., individuals contributing data in research studies) their associated sub-studies to specific scheduling locations or organizations within the program's organizational structure. The platform 110A supports the use of cohort classifiers of participants in longitudinal research programs for studies and sub-studies, allowing tagging and tracking of participants across multiple studies and over long periods of time. The platform 110A can provide information and content related to an organization's structure, from the tenant's hierarchy data, to ensure that participants have accurate and up-to-date information. The platform 110A enables various other operations and insights, such as tracking and notifying participant program milestone activities and providing data collected using the platform 110A for presentation in analytics dashboards, reports, and so on.

The platform 110A can be accessed by researchers and administrators through a self-service tool, such as a web page, web application, installed software application, etc. The user interface can allow an administrator to initially configure a program's organizational structure and generate a hierarchy model indicating the different units in the organization and the relationships among them. The user interface can also allow tenant admins and program managers to make real-time updates to their organizational structure, as well as related information such as locations, contact information, participant lists for studies, data collection configurations for studies, and more. User interfaces to add and edit data policies are also provided for administrators. The platform 110A can publish this information to the participant portal and use it in managing data exchange among organizations. The platform 110A can improve operational aspects of managing a large and complex organizational structure by providing scalability, reliability, data validation, quality control, version tracking, user access control, and traceability.

In some applications, the platform 110A is accessed through an application or web interface that provides a self-service tool for a tenant's users to manage their program's organizational structure and scheduling locations. This can include making changes to a tenant's hierarchy model. A hierarchy model may optionally have strict single-parent-level to single-child-level relationships between each of its level elements, and may supports many different levels, e.g., 5, 10, or 20 levels of depth. Each hierarchy level has, at minimum, attributes of a level identifier and a name and can have any number of custom attribute fields, which may be defined by a tenant administrator or an administrator for the platform 110a. a few examples of custom field types for any given hierarchy level include: freeform text, number only, date, phone number, Boolean, email, URL input field, a HTML compatible text editor input field, address input field with address verification capabilities, single select (radio button) and multi-select (checkbox) input fields. Each of these field types may support field validations such as required input, maximum number of characters, allowed character types, etc.

Once the hierarchy model configuration is complete, the hierarchy model can be published to give access to tenant administrators or program managers to populate their program's organizational structure and scheduling locations data using hierarchy management user interface pages or view. In some implementations, each of the program's hierarchy model levels are represented as tabs, and the organizations and scheduling locations are represented as rows within their respective level's tab in hierarchy management UI pages.

Tenant administrators or program managers can add new, update, or delete records for their organization and scheduling location records in the platform 110A using web forms that are dynamically generated based on their respective level's attributes defined in the hierarchy's model. Each new level record added in hierarchy management UI can be saved in draft form or be published. The platform 110A also includes version tracking and maintain audit logs with capabilities to compare versions of each record updates.

Published organization and scheduling location records will be made available within the platform 110A as entities of the program's organizational structure. A participant portal can consume and use these records to set participants' association to the program and also present participants with available scheduling locations and available times to schedule appointments. Additionally, the published organization and scheduling location records are used in the system to allow tenant users to: establish group access levels for their program's study staff, setup scheduling locations and configure appointment scheduling settings and capacity management, segment and send campaign communications to specific subset of participants based on their association to the program's organizational structure, and view subsets of participants' survey and program milestone activities based on their association to the program's organizational structure in an analytics dashboard.

Data can be used in different ways within the platform depending on the role of the user. For example, the users with an author or contributor role can manager an organization structure within the platform 110A. Program administrators can make access group assignments to study staff based on the organization structure, e.g., assigning individual researchers to specific units in the organization and assigning their access levels and roles. Study staff can manage appointment scheduling for locations defined in organization structure. Study staff can segment a subset of participants to send campaign communications based on participant's affiliation to the program's organization structure. In other words, the platform 110A provides functionality to selectively communicate with study participants, providing different messages based on the study, unit, or participant associations in the organization hierarchy. The platform 110A can also provide features for study staff to upload prospective participant information for recruitment into a study, and the platform 110A can send the messages to invite, obtain consent from, and enroll new participants, as well as to remotely configure the applications for new participants to collect data in the manner specified for their study.

The platform 110A can include a participant portal, accessible through a web page or application. The portal can be associated within the program's organizational structure and participants can view the available locations for them to schedule appointments for bio-sample donations.

Figure 2:
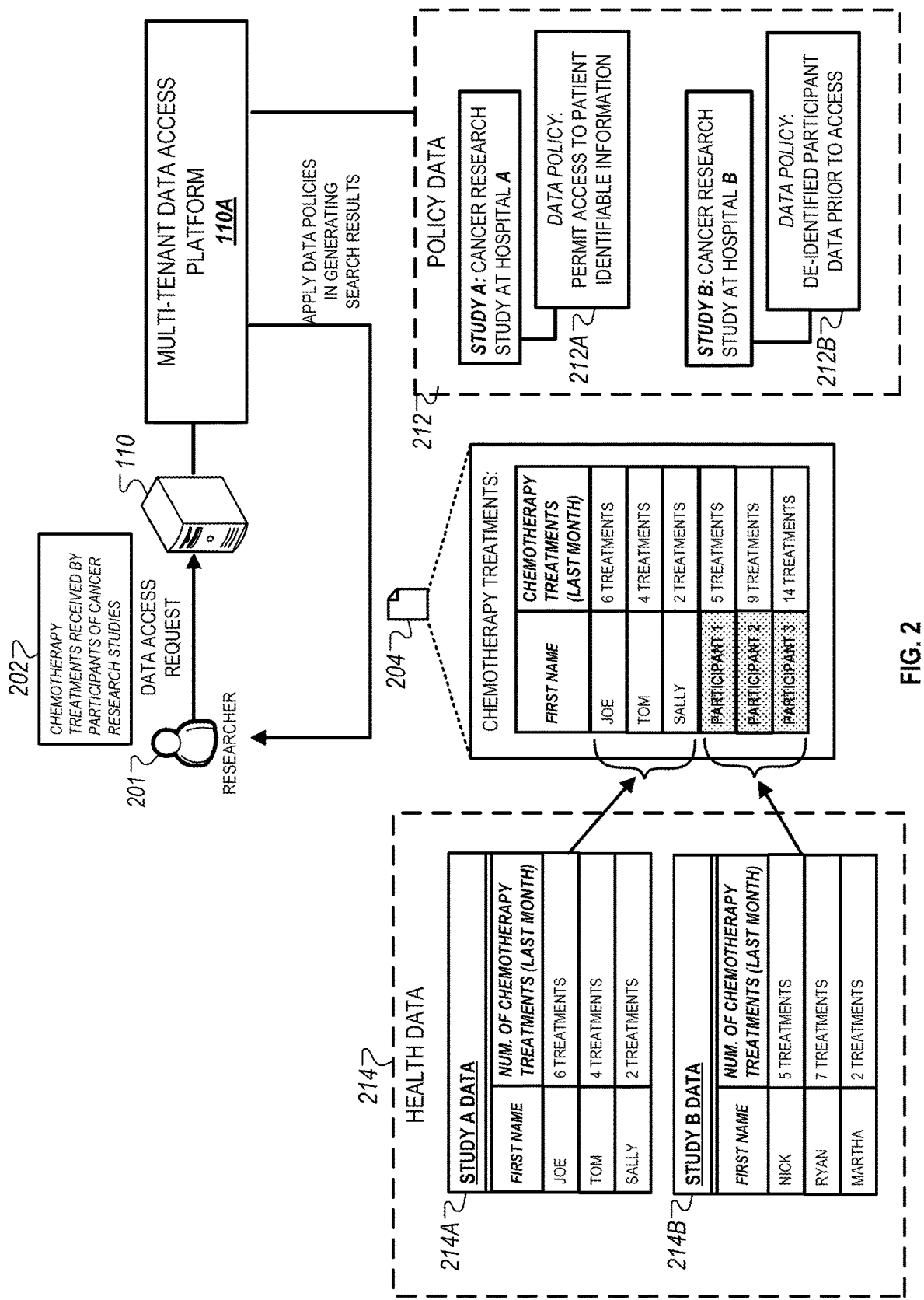
FIG. 2 illustrates an example of a technique for applying policy data to retrieve health data to be provided in response to a data access request through a hierarchical multi-tenant data access platform.

FIG. 2 illustrates an example of a technique for applying policy data 212 to retrieve health data to be provided in response to a data access request 202 through the platform 110A. In this example, the platform 110A is configured to retrieve health data 214 that includes study data of two chemotherapy studies (Study A, Study B). As shown, both studies include three participants that have each received chemotherapy treatments in the last month. For example, study data 214A identifies participants Joe, Tom, and Sally, and study data 214B identifies participants Nick, Ryan, and Martha.

The technique shown in FIG. 2 allows the server system 110 to adjust the aggregation of health data to be provided in a response to a data access request 202. The server system 110 determines how to retrieve each of the study data 214A and 214B based on applying data policies 212A and 212B, respectively. Data policy 212A requires that any PII within the study data 214A be de-identified before providing access, whereas data policy 212B has no such restriction and permits access to any PII within the study data 214B. This difference in data policies may reflect, for instance, different data regulations of organizations managing each study. For example, the research organization managing study A may have strict regulations that limit the sharing of any type of PII, while the research organization managing study B may have relaxed regulations since participants have consented to their PII being shared with third party research organizations. By applying multiple data policies in parallel, the server system 110 can retrieve data from different research studies in a compliant fashion while also providing access to retrieve data in a single response 204.

Referring to the example shown in FIG. 2, the researcher 201 initially provides a data access request 202 for health data corresponding to chemotherapy treatments received by participants of cancer research studies. The server system 110 identifies studies A and B as including health data that may be responsive to the data access request 202, and identifies data policies 212A and 212B as being associated with Studies A and B, respectively. The server system 110 retrieves study data 214A and 214B based on applying the data policies 212A and 212B. For example, the server system 110 minimally processes study data 214A since data policy 212A permits access to PII within the study data 214A. In contrast, the server system 110 processes study data 214A by removing PII (e.g., first name) so that any information specified in the study data 214B does not identify a participant. The server system 110 then generates a response 204 based on aggregating study data 214A and a de-identified version of study data 214B and provides the response 204 to the researcher 201.

Figure 3:
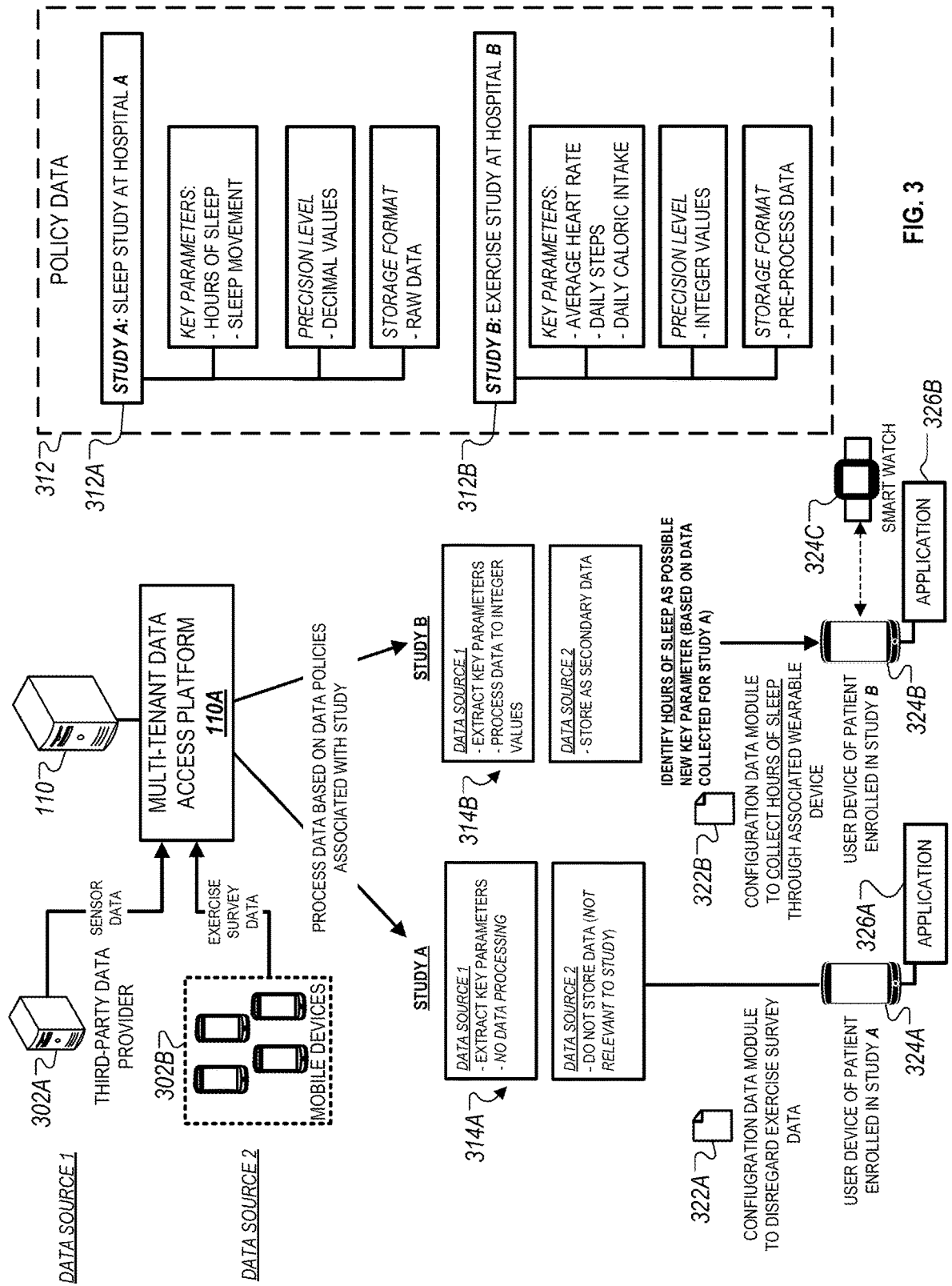
FIG. 3 illustrates an example of a technique for applying policy data to aggregate data obtained from different data sources for two research studies through a hierarchical multi-tenant data access platform.

FIG. 3 illustrates an example of a technique for applying policy data 312 to aggregate data obtained from two data sources 302A and 302B for two research studies (Study A and Study B) through the platform 110A. In this example, the platform 110A is configured to process health data based on applying data policies 312A and 312B for Studies A and B, respectively, to each data source. As shown, the data source 302A is a third-party data provider that collects sensor data through, for instance, a wearable device worn by a participant while exercising. Data source 302B includes mobile devices of the participants that collect exercise survey data.

The technique shown in FIG. 3 allows the server system 110 to uniquely process data obtained from each data source based on a data policy associated with each study. Study A is a sleep study at Hospital A, and Study B is an exercise study at Hospital B. The data policy for each study identifies data items to be extracted from data obtained from data sources, a precision level for processing extracted data, and a storage formatted for the extracted data. For example, data policy 312A specifies two data items (e.g., hours of sleep, sleep movement), that the values for the data items be decimal values, and that the extracted data is stored without minimal or no processing. Data policy 312B specifies three data items (e.g., average heart rate, daily steps, daily caloric intake), that the values for the data items be integer values, and that the extracted data be pre-processed prior to storage.

Referring to the first example shown in FIG. 3, the server system 110 generates aggregate data 314A for Study A. In this example, the server system 110 extracts data items from sensor data obtained from data source 302A with minimal or no additional processing based on the data policy 312A. However, the server system 110 does not extract any data from source 302B since the exercise survey data included in the data obtained from this source is not relevant to any of the two data items specified in the data policy 312A (e.g., hours of sleep, sleep movement). In this way, although the platform 110A provides the server system 110 with access to different types of available data, only relevant data is actually aggregated based on the application of data policy 312B.

Still referring to the first example, the server system 110 provides a configuration data module 322A to an application 326A running on a computing device 324A of a participant enrolled in Study A. The configuration data module 322A causes the application 326A to disregard exercise survey data submitted by the user. In this way, the server system 110 uses the data policy 312A to reduce the processing required to be performed on the computing device 324A to collect study data (e.g., by preventing the accumulation of survey data that is unlikely to be useful for a sleep study). The application 326A can instead focus on monitoring and collecting sensor data associated with the third-party data provider.

In the second example shown in FIG. 3, the server system 110 generates aggregate data 314B for Study B. In this example, the server system 110 extracts data items from sensor data obtained from data source 302A and further processes sensor data values so that they conform to the integer values requirement specified by the data policy 312B. The server system 110 also processes exercise survey data obtained from data source 302B as this information may be relevant given that Study B is an exercise study. However, given that exercise survey data is unlikely to include any of the three data items specified by the data policy 312B (average heart rate, daily steps, daily caloric intake), the exercise survey data is stored as secondary data.

Also in the second example, the server system 110 determines that hours of sleep, which is not currently being monitored in Study B, may be a useful data item to collect though not specified in the data policy 312B. The server system 110 is able to make this determination since platform 110A enables access to data being monitored for multiple studies and sleep study (which is being monitored in Study A) may be of interest to researchers of Study B. The server system 110 identifies hours of sleep as a possible new data item to collect for Study B and then provides a configuration data module 322B to an application 326B running on a computing device 324B of a participant enrolled in Study B. The application 326B, based on receiving the configuration data module 322B, can determine that a wearable device 324C is associated with the computing device 324B and can be used to collect hours of sleep (which presently is not being collected since it is not included in the data policy 312B). In this way, the multi-tenant architecture of the platform 110A permits data collection patterns in one study of a tenant organization to improve the collection of data for a study of another tenant organization.

Figure 4A:
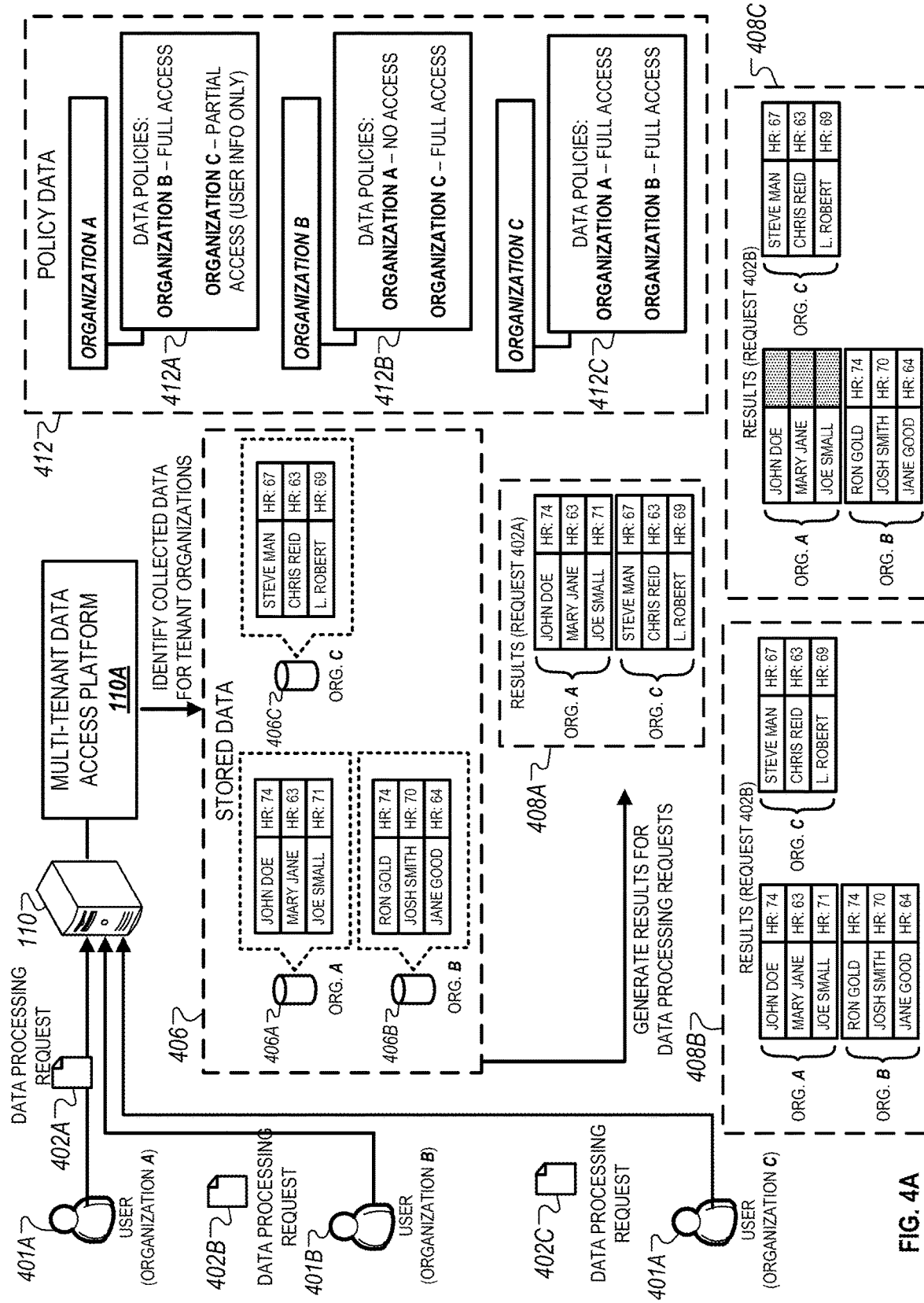
FIG. 4A illustrates an example of a technique for applying policy data to aggregate data collected for different tenant organizations through a multi-tenant data sharing platform.

FIG. 4A illustrates an example of a technique for applying policy data 412 to aggregate data collected for tenant organizations A, B, and C through the platform 100A. In this example, the platform 110A is configured as a multi-tenant data access sharing platform through which individual tenant organizations can access data collected for other tenant organizations of the platform 110A. The server system 110 accesses and applies data policies specified in the policy data 412 by the respective tenant organizations in order to grant access consistent with the data policies.

The technique shown in FIG. 4A allows the server system 110 to provide different types of access to the same data access request provided by users of different tenant organizations. In the example shown in FIG. 4A, users 401A, 401B, 401C provide data processing requests 402A, 402B, and 402C, respectively, for stored data 406 collected through the platform 110A. In this example, each of the data access requests 402A-402C represent a request for aggregate data that include data collected for tenant organizations A-C.

Upon receiving a data access request (e.g., data processing requests 402A-402C), the server system 110 identifies datasets collected for tenant organizations A-D. The stored data 406 includes dataset 406A for tenant organization A, dataset 406B for tenant organization B, and dataset 406C for tenant organization C. In this example, each dataset is shown to include three records with a single data parameter (e.g., measured heart rate) for simplicity, through datasets of different sizes and different parameters can also be included in the data 406.

The server system 110 applies the policy data 412 in generating aggregate data to provide in response to each of the data processing requests 402A-402C. The policy data 412 includes data policies specified by each tenant organization and governs access to data of a corresponding tenant organization. In the example shown in FIG. 4A, data policies also govern access based on the tenant organization requesting to access data. For example, data policy 412A governs access to dataset 406A and specifies full access to users of organization B and partial access to users of organization B. Partial access, in this example, refers to only providing access to user information (e.g., name) but restricting access to a data parameter measured for the user (e.g., measured heart rate). Data policy 412B governs access to dataset 406B and restricts access to users of organization A and full access to users of organization C. Data policy 412C governs access to dataset 406C and provides full access to users of organization A and B.

The server system 110 generates different aggregate datasets to provide in response to data processing requests 402A-402C. In this way, the server system 110 applies different conditions specified by data policies 412A-412C to provide different levels of access to the same collected data (e.g., data 406) depending on the user submitting the data access request. For example, the server system 110 generates aggregate dataset 408A to provide in response to data processing request 402A. In this example, aggregate dataset 408A includes data from datasets 406A and 406C but excludes data from dataset 406B since data policy 412B indicates that users of organization should not be provided access to dataset 404B. Aggregate dataset 408B includes data from datasets 406A, 408B, and 406C since both data policies 412A and 412C indicate that full access to these datasets should be provided to users of organization B. Aggregate dataset 408C includes partial data from dataset 406A (e.g., user name only) and full data from datasets 408B and 406C since data policy 412A indicates that partial access to user information from dataset 406A (but not measured heart rate) should be provided to users of organization B.

Figure 4B:
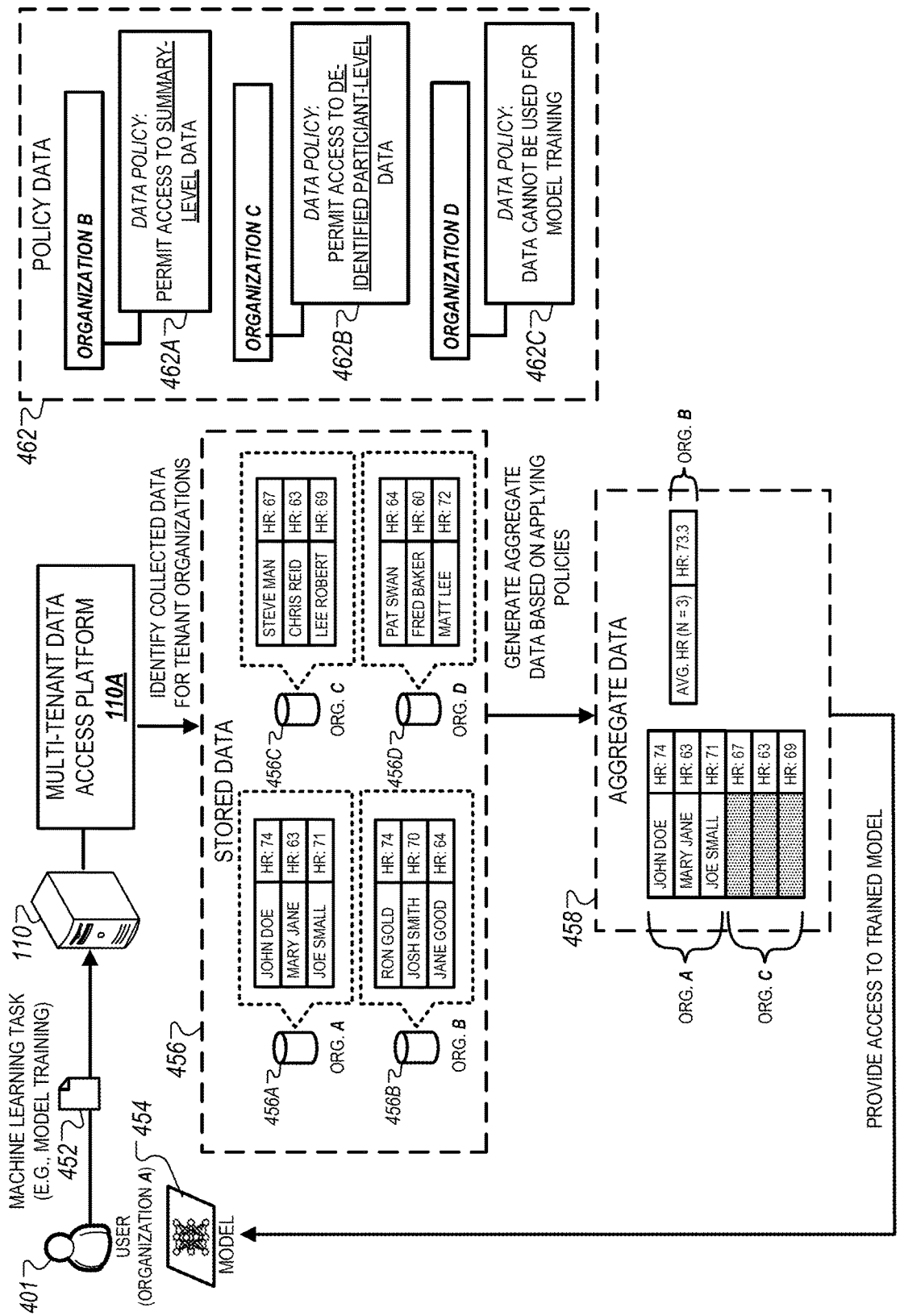
FIG. 4B illustrates an example of a technique for applying policy data to enable machine learning tasks through a multi-tenant data sharing platform.

FIG. 4B illustrates an example of a technique for applying policy data 462 to enable machine learning tasks through the platform 110A. In this example, the platform 110A is configured as a multi-tenant data sharing platform through data collected through the platform 110A can be used to perform machine learning tasks, such as model training, model generation, model refinement, among others. The server 110 can enable users to perform machine learning tasks with data collected through the platform 110A without providing access to the underlying information contained within the collected data. In this way, individual tenant organizations can perform machine learning tasks to gain data insights based on data collected by other similar tenant organizations without necessitating the sharing of sensitive information between tenant organizations.

In the example shown in FIG. 4B, the server system 110 receives a request 452 from a user 401 associated with organization 401. The request 452 includes an indication to perform a machine learning task. In this example, the machine learning task involves a request to train a model 454 using data collected through the platform 110A. The server 110 identifies stored data 456 in response to receiving the request 452. As shown, the stored data 456 includes four datasets 456A, 456B, 456C, and 456D collected by tenant organizations A, B, C, and D. Each of the datasets 456A-D is associated with data policies specified by a corresponding tenant organization within the policy data 462.

The server system 110 applies the policy data 462 to determine how to generate aggregate data 458 to be used for training the model 454 based on the machine learning task of the request 452. The policy data 462 can allow a tenant organization to limit direct access to data by other tenant organizations, while still allowing the data to be used by the server system 110A in performing data analysis or machine learning on behalf of the other tenant organizations. In some instances, data collected about individuals may invoke privacy concerns, but results of data analysis and machine learning using the records of many individuals would not. For example, records about health and behavior for individuals may need to be kept private. However, summary statistics about a population or a machine learning model trained using many individual records may not need to be kept private. As a result, when authorized by the corresponding data policies, the server system 110 can enable sharing of data among tenant organizations for the purpose of performing analysis, while still restricting access to the underlying data when appropriate.

In the example shown in FIG. 4B, the server system 110 generates aggregate data 458 to be compliant with data policies specified in the policy data 462. For example, aggregate data 458 includes dataset 456A since user 401 is an employee of organization A that has been granted access to all data collected for organization A. The aggregate data 458 includes measured heart rate data from dataset 456B but excludes user information since data policy 462A permits access only to de-identified participant-level data within dataset 456B. The aggregate data 458 also includes summary data from dataset 456C (e.g., average measured heart rate for a set of three users identified in dataset 456C) since data policy 462B permits access to summary-level data but prohibits access to patient-level data. The aggregate data 458 does not include any data from dataset 456D since data policy 462C prohibits use of dataset 456D for model learning.

In the example shown in FIG. 4B, the server system 110 trains the model 454 using aggregate data 458 so that model training is performed using data that the user 401 may not specifically have access to. The server system 110 performs model training without providing access to the aggregate data 458. For example, the user 401 can upload a model file with the machine learning task, and the server system 110 can provide a new or updated model file with a model trained using the aggregate data 458. In this example, the model file can be provided as a response to the machine learning task in be devoid of any information specified in the aggregate data 458. The aggregate date 458 can be deleted after model training so that any data used for model training is not capable of being accessed by the user 401 after training has been completed.

The execution of model learning tasks through the platform 110A provides various advantages to individual tenant organizations. For example, the server system 110 facilitates data sharing by increasing the range of data that can be used for analysis (e.g., data analysis, machine learning, etc.) by tenant organizations of the platform 110A. The server system 110A also provides capabilities for users to perform analysis of their own data as well as data collected by other tenant organizations. The server system 110A can use the analysis capabilities to perform data analysis at the server system 110A, based on the data 406, without the stored data 406 being transferred to or accessed directly by users of tenant organizations. This way, a user has access to larger data sets for analysis, but privacy requirements and other restrictions on data access are still enforced.

Additionally, when training a machine learning model, the amount of training data and variety of training data has a large impact on model accuracy. In some instances, limited data of one tenant organization may not be sufficient for the type of machine learning model desired for generated. Even if a model is generated, it can be beneficial to use outside data to test the validity and accuracy of a trained model. By allowing the data of multiple different organizations to be combined for machine learning tasks, the server system 110 can provide better results for all organizations. The server system 110 can perform machine learning tasks for users, using data sets of organizations that the users could not access otherwise. For example, a user can use its organization's own collected data to train and test a machine learning model, but this data may be limited. The server system 110 can allow the user to include data sets from one or more other organizations in the training process, even though the data sets may not be directly accessible by the user, allowing for a more robust and more accurate model.

The server system 110 also allows a tenant organization to make some or all of its collected data available to other tenant organizations for certain analysis and machine learning processes. For instance, in the example shown in FIG. 4B, policy data 456D restricts use of dataset 456D for machine learning training, but dataset 456D may be used for other purposes, such as generating a new model, or estimating prediction performance of an existing model.

Figure 5:
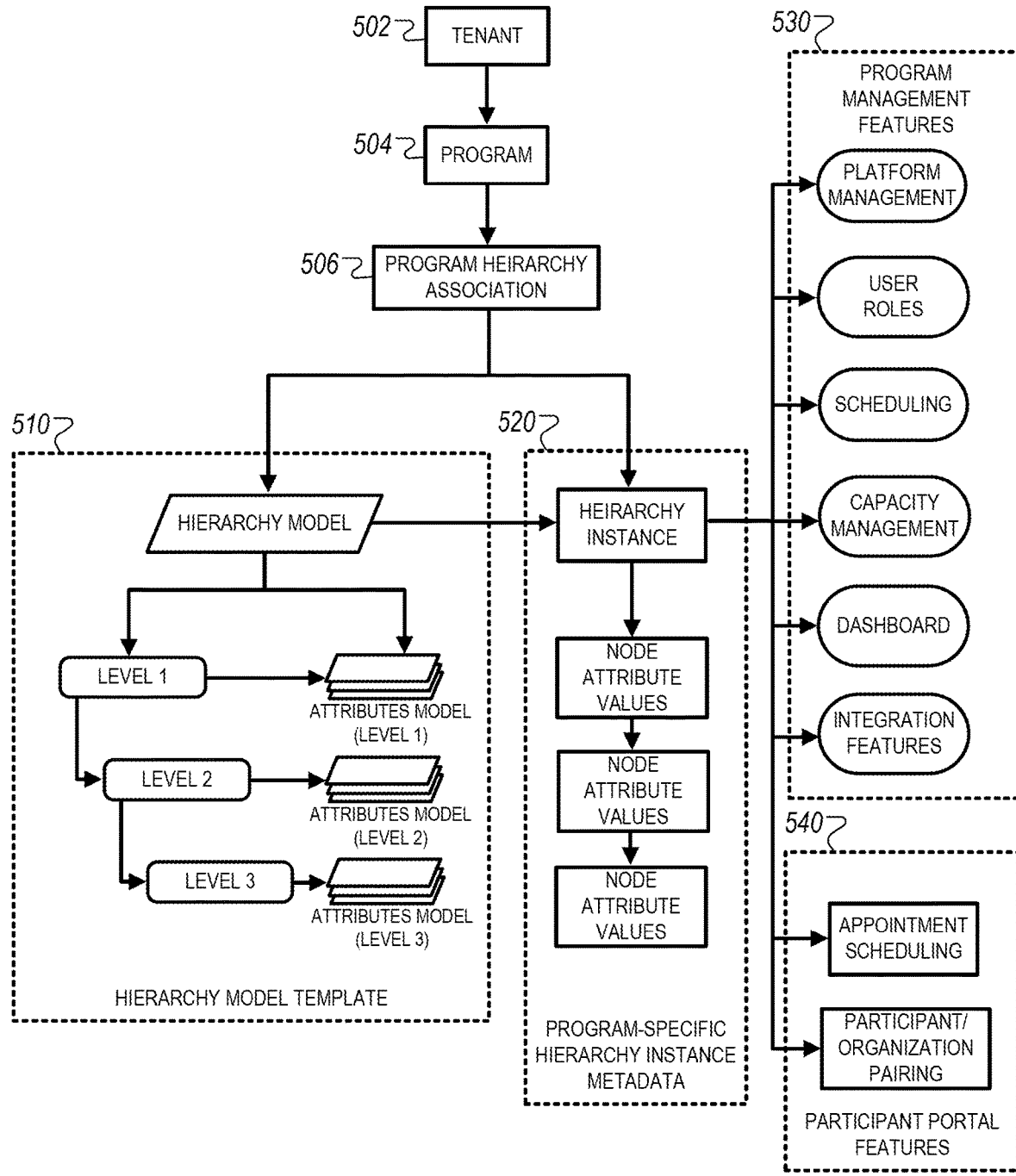
FIG. 5 illustrates an example of an organization hierarchy data for a tenant organization through a hierarchical multi-tenant data access platform.

FIG. 5 illustrates an example of an organization hierarchy data 500 for a tenant organization 502. In this example, the organization hierarchy data 500 specifies multiple levels that are hierarchically arranged relative to one another to represent organizational relationships of the tenant organization 502 in relation to a program 504. In this context, a "program" refers to a set of computer-implemented codes or instructions that define a user experience associated with a healthcare mobile application. As one example, the program 504 can represent a research study managed by the hospital and involving participants located in different geographic locations. As another example, the program 504 can represent an exercise promotion campaign run by the tenant organization 502 for employees of the tenant organization.

A program hierarchy association 506 can be configured by a system administrator during an initial configuration of a deployment of a software instance for the tenant organization 502. During this initial configuration, the system generates a hierarchical model template 510, program-specific hierarchy instance metadata 520, program management features 530, and participant portal features 540. Once initially configured, these components of program hierarchy association 506 can be adjusted to provide dynamically adjustable configurability to meet the specific needs of the tenant organization 502.

The hierarchical model template 510 includes a hierarchy model with multiple levels with parent-child relationships. For example, "level 1" is a parent of "level 2," which is a parent of "level 3," and consequently "level 3" is a child of "level 2," which is a child of "level 1." Levels within the hierarchy model are each associated with a level-specific attribute model defining attributes unique to each level. In some implementations, the hierarchy model supports up to twenty levels with a strict single parent to single child level relationships between each of its level elements.

The attribute model can include, for instance, a level identifier, level-specific attribute fields, among other types of information. Each attribute model can also specify custom attribute types, such as field data type (e.g., freeform text, number only, date, phone number, Boolean, email). The attribute model can also specify unique level-specific fields, such as HTML-compatible text editor input fields, address input fields with address verification capabilities, or single select (radio) and multi-select (checkbox) input fields. Each of these field types can support field validations such as required input, max characters, and character types.

The program-specific hierarchy instance metadata 520 includes a hierarchy instance that includes node attribute values for each level of the hierarchy model. For example, if an attribute model for level 1 of the hierarchy model includes an address input field, the hierarchy instance can store an inputted address in a node attribute value for level 1.

Once the configuration of the hierarchical model template 510 and associated program-specific hierarchy instance metadata is complete, a system administrator can publish the hierarchical model template 510 to give access to a tenant administrator (e.g., a program manager of the program 504) to populate levels of the hierarchical model template 510 based on the organizational structure of the tenant organization 502. This can be accomplished through a configuration interface that allows the tenant administrator to define program management features 530 and participant portal features 540. As shown in FIG. 5, examples of program management features 530 include platform management, defining user roles, scheduling, capacity management, dashboard capabilities, and integration features. Examples of participant portal features 540 include appointment scheduling and participant/organization pairing.

The configuration interface allows a tenant administrator to customize the deployment of the tenant organization 502 on the platform 110A according to the needs of the tenant organization 502. For example, the tenant administrate can create a new level within the hierarchy model to represent a new unit of the tenant organization 502, adjust the attributes model of an existing level, adjust relationships between levels to indicate changes in the organizational structure of the tenant organization 502. Adjustments to the hierarchy model can be tracked in audit logs to allow reversions and/or enable version tracking to identify updates progressively made to the hierarchy model. In some instances, the configuration interface displays each level of the hierarchy model as different displayed user interface tabs.

Figure 6:
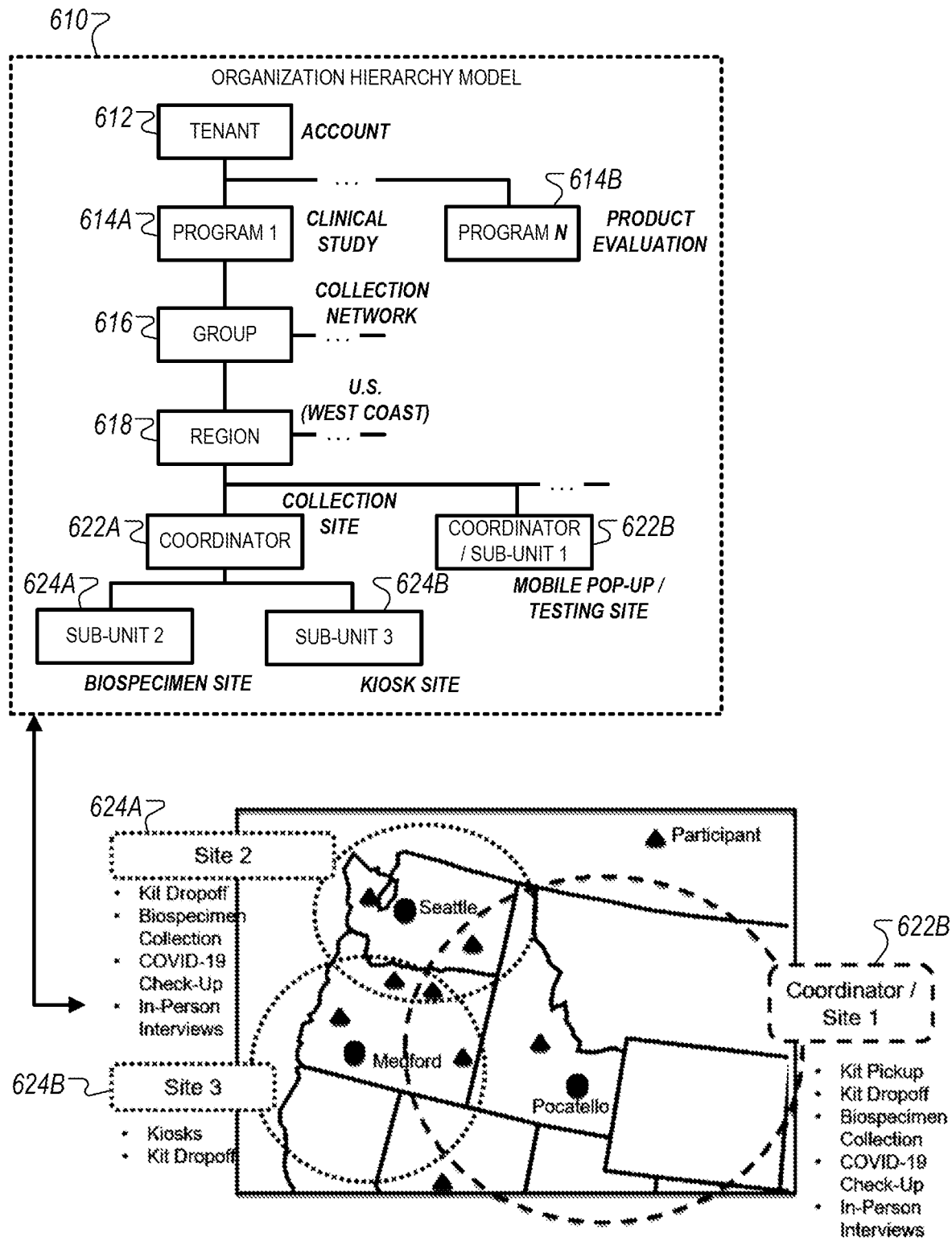
FIG. 6 illustrates an example of using an organization hierarchy data for a tenant organization to configure multiple units of the tenant organization that are situated in different locations.

FIG. 6 illustrates an example of applying an organization hierarchy model 610 for a tenant organization 612 to configure multiple units of the tenant organization 612 that are situated in different locations. In this example, the organization hierarchy model 610 includes multiple levels to represent how activities of the tenant organization 612 are coordinated through the platform 110A to achieve the objectives of the organization.

In the example shown in FIG. 6, the tenant organization 612 is a pharmaceutical company that includes a first department that conducts a clinical study on a prospective pharmaceutical product that has yet to receive clearance by the Federal Drug Administration, and a second department that is focused on product evaluation of existing pharmaceutical products that are on the market. The organization hierarchy model 610 specifies a program for each department of the tenant organization 612 (e.g., program 614A for the first department and program 614B for the second department).

The organization hierarchy model 610 also includes multiple child levels under the program 614A to represent different types of operations performed by the tenant organization 612 relating to a clinical research study. Each level may include multiple elements representing similar organizational classifications within the organization hierarchy model 610. For instance, element 616 represents a collection network for all test samples collected from participants of the clinical study within the United States. Other elements within the same level can include, for instance, parts of the tenant organization 610 that perform cohort selection and/or cohort outreach for the clinical research study.

Further down in the hierarchy, element 618 represents a subset of collection sites within the collection network that are situated in in the west coast of the United States. Elements 622A and 622B represent different types of collection sites that are both located in the same geographic region (U.S. west coast). Element 622A represents a coordinator site where different types of samples are collected and aggregated for test evaluation. Element 622B represents a mobile pop-up and/or testing site.

Elements 624A and 624B represent two types of coordinator sites that have different needs. For example, element 624A represents a site where biospecimen is collected by a trained healthcare professional that interacts with participants. In contrast, element 624B represents a site where a kiosk is located for collection of test kits, but provides no opportunity for a patient to interact with a healthcare professional.

As discussed above, each of the three types of sites shown in FIG. 6 (e.g., biospecimen site, kiosk site, mobile pop-up testing site) have different operating standards and/or needs even though they are all units of the tenant organization 612 that perform the same function to support a clinical study being conducted for the same pharmaceutical drug (e.g., collection of test samples). For example, since medical personnel are staffed at each of the biospecimen site and the mobile pop-up testing site, these sites can also function as a testing site for the Coronavirus Disease 2019 (COVID-19). The kiosk site, however, does not have any medical personnel is limited to use as a site where participants drop off testing kits. A tenant administrator can therefore use the organization hierarchy model 610 to dynamically configure the software deployment for the tenant organization 612 on the platform 110A to uniquely fit the needs of each testing site.

In some implementations the organization hierarchy data can be used to assist the participants in research studies. For example, The organization hierarchy data can provide, for each unit, information for the participants or individuals who are providing data for that unit. That information may include things such as contact information for the researchers or administrators, indications of locations for specimen collection, guidelines or instructions about the study that the participants are enrolled in, and so forth. The information for a unit may include identifiers for the participants involved in the research study for that unit.

When an individual interacts with the application on their phone or other user device, information provided to the individual may be provided or customized using the data stored in or associated with the hierarchy data for the appropriate unit. For example, if a user accesses an information page on the application at their client device, The server system 110 can look up the organization and unit associated with that individual, and then retrieve and provide the relevant information for that individual's unit and organization.

Figure 7:
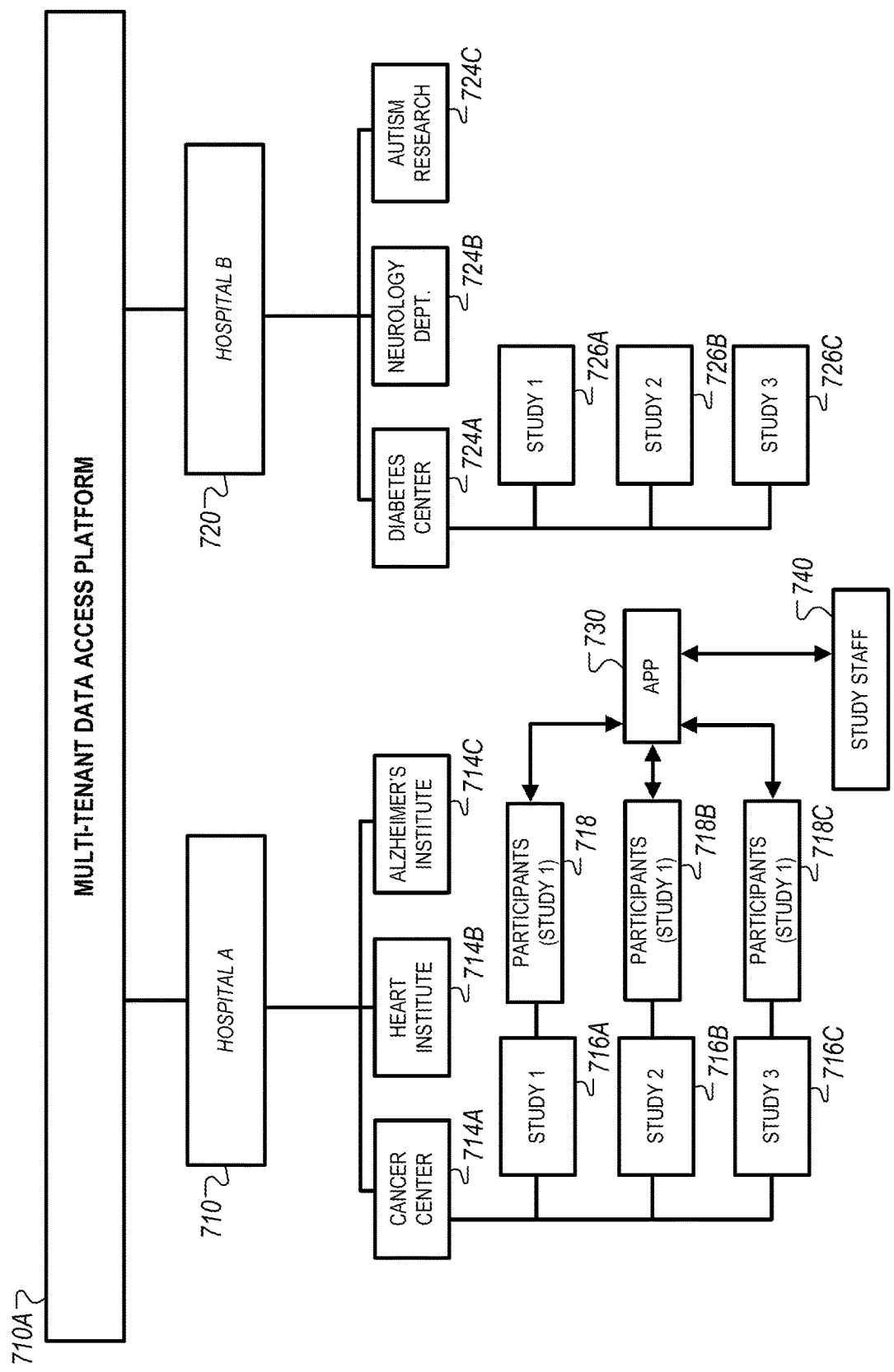
FIG. 7 illustrates an example of a platform that manages data for two tenant organizations.

FIG. 7 illustrates an example of the platform 110A for managing health data collected by two tenant organizations 710 and 720. As discussed throughout, the platform 110A is implemented on a single server system (e.g., server system 110) that serves both tenant organizations 710 and 720. In the example shown in FIG. 7, the tenant organizations 710 and 720 are hospitals with units representing different research departments that conduct clinical research studies. Tenant organization 710 includes units 714A, 714B, and 714C representing a cancer center, a heart institute, and an Alzheimer's institute, respectively. Tenant organization 720 includes units 724A, 724B, and 724C representing a diabetes center, a neurology department, and an autism center, respectively. As discussed throughout, the units of a tenant organization can be specified in an organization hierarchy model, such as the organization hierarchy model shown in FIG. 6.

In the example shown in FIG. 7, the cancer center manages three research studies 716A, 716B, and 716C that are each associated respectively with participants 718A, 7186, and 718C. Additionally, the diabetes center of the tenant organization 720 manages studies 726A, 726B, and 726C. Study participants (e.g., patients enrolled studies 716A-716C) and study staff (e.g., researchers managing studies 716A-716C) each have access to a mobile application 730 through which they can interact with health data.

For example, study participants can use the mobile application 730 to access electronic forms for providing journal entries detailing symptoms they may be experiencing, uploading and/or otherwise submitting physiological data (e.g., heart rate monitored over a time period, blood pressure measurements, activity level measured over a time period, etc.), or receiving notifications relating to a research study in which they are participating. Study staff, however, can use the mobile application 730 to access health data collected for the study participants, prepare research reports, or perform other actions related to management of the research study. In these examples, while the same mobile application 730 is used by both study participants and study staff, each user may be presented with a different user interface based on the type of user they are. For example, the mobile application 730 can present a participant user interface on a computing device of a participant and a researcher user interface on a computing device of a researcher. As described throughout, the presentation of different user interfaces may be enabled through use of an organization hierarchy that specifies different functionality and different data access depending on the units or levels in the hierarchy that each individual is associated with and has access for.

Participants in research studies are not necessarily required to use the same mobile application as study staff. Whether or not the same application is used for different types or categories of users, in some implementations the same application can be provided to participants of different tenant organizations and/or for different units and studies within an organization. The functionality of the application used by participants can be customized for each study through downloadable configuration data or program modules. These downloadable modules can adjust the user interface is shown to users, adjust the functionality of the application that is exposed to users, adjust data collection from users (e.g., which sensors are used, which prompts and surveys are provided, which data is reported to the platform 110A), and more. The platform 110A may also communicate with mobile devices to adjust the operation of the applications on an ongoing basis, for example, to deliver new surveys and interfaces that study staff select, to change data collection and reporting by the application for each study based on the inputs to the platform 110A by the study staff, and so on.

When a user downloads and installs the application 730 for study participants, the user can provide an identifier for their study or select the study from a list of studies. Each study can have a corresponding module available from the platform 110A (or another source, such as a different server system), and the modules can include a variety of elements that adjust the user's experience. For example, a module can include custom content from the tenant organization or research study to which it corresponds. The module can include or specify interactive elements, media, and features to provide on the application. After downloading the module, the application 730 may reconfigure its interface as directed by the module. In many cases, this occurs so that it appears as if the tenant organization that customized the module had provided the user a customized, stand-alone application for the study. The application 730 may also support a user having multiple modules installed, e.g., modules for different studies, so that the user interfaces, data collection, reporting of data to the platform 110A, and other features needed for each study the participant is enrolled in are provided at the participant's client device.

Customized modules can be used to provide organization-specific information on user interfaces of mobile applications from a third-party application store. For example, the base application 730 may be provided through an application store, and study-specific modules can be published by the platform 110A which supports data collection and monitoring processes for the different tenant organizations. The customized modules can be used to integrate various types of information from different entities associated with healthcare services such as insurance companies, providers, pharmacies, and patients into a common platform with limited costs of implementation for tenant organizations.

Each module can include a set of computer-implemented code or instructions that define a user experience associated with a mobile application. However, executable code is not required. In some cases, the modules include configuration data that indicates subsets of the application functionality already in the base application 730 that should be enabled or made active. As a result, the module can make active only the portions of the application 730 that are relevant and appropriate for a given study, without needing to transfer executable code. For example, an application may have 100 different functional units that each correspond to a type of sensor data collection, a type of user survey, reporting data back to the platform 110A, and so on. The modules for different studies may specify different combinations of these functional units already present in the application 730, to thus customize the behavior of the application 730 differently for different studies. Other configuration data can be provided in a module or at a later time through the platform 110A. For example, the module may specify not only that a blood pressure tracking software element of the application 730 should be enabled, but also state a frequency that the element should be activated, a format or level of precision for storing the results, parameters specifying which collected data to provide to the platform 110A and how often, and so on.

Downloaded modules or configuration data, from the platform 110A or another server, can include providing user interfaces, surveys, context-dependent interactions or interventions, manually triggered or automatic sensor data collection, communication with other devices, and so on. The module can indicate specific features of an application that a particular tenant organization selected to expose to the user. When downloaded and stored on a user device, the module configures associated mobile application to provide custom content and interactions selected by the tenant organization. When the user subsequently runs the application, the application retains the configuration, appearance, and interactivity specified by the previously downloaded module. Using a customized module, the tenant organization can provide the user the experience of a native mobile application without the need for the tenant organization to code and register an application with an app store (e.g., the Apple App Store, or Google Play for Android Apps, etc.). The module can also include or refer to various content items such as media, forms, and user interface parameters that include customized logos and branding for a tenant organization. In addition, the module enables the user and the tenant organization to perform specific types of data tracking and reporting according to a user's specific medical needs, or the priorities of the tenant organization (e.g., to encourage and reward exercise, or to promote quitting smoking, etc.). In this regard, the module can be customized to the goals of the tenant organization, the user, or both.

The platform 110A can allow researchers to monitor or observe participants on an ongoing basis. These features can facilitate real-time messaging and real-time remote care planning. Customized modules can include tracker elements (or specify tracker elements within the application 730 to enable) to obtain certain types of information from participants and provide the information to the platform 110A. The information may be provide periodically or in response to particular triggers or conditions, depending on the needs of the study. For example, a module focused on diabetes may provide periodic updates about a patient's most recent blood sugar tests. As another example, a module that tracks fitness may provide a notification when a certain level of activity has been detected by sensors of the user device on which the application 730 is installed. In some instances, study staff may send requests, to the platform 110A, for information about their patients on an on-demand basis, and the platform 110A communicates with an individual user device to obtain and provide the requested information. In this regard, customized modules may define communications permissions, e.g., to specify what information is permitted to be collected by the module, and what healthcare providers can receive the information.

In some implementations, a module specifies how existing functionality of the application 730 is to be used. Unlike application updates, the addition of a module can be done without modifying the actual executable files of the application 730. Instead of altering the application 730, the module can indicates what existing functionality of the application 730 to expose to a user, and in what manner. For example, the application 730 may include functionality for tracking and analyzing various types of sensor data of a device. A module can define, from among the capabilities of the application 730, which data should be collected and at what frequency. Additionally, the module can specify rules for how to process acquired data, as well as actions that the user's device should perform conditioned on the analysis. Thus, a module can change the ongoing or default behavior of the application 730. A module can be persistent at a user's device, for example, stored and active until a user indicates that the module should be removed. In some implementations, modules adjust the initial view or behavior of the application 730, the content and interactions with a user while the application 730 is active, and/or actions performed by the application 730 in the background while a different application is active.

A module can represent a combination of a template and customization settings for a particular study and/or tenant organization. The content of the module may include various different items, including user interface instructions (e.g., defining formatting, size, color, layout, media displayed, etc.), branding (e.g., an organization's name, logo, colors, contact info), organization-specific or study-specific information. Modules can include tracker components, such as data that defines a trigger or condition to cause a particular type of data to be collected, as well as actions to take when the trigger occurs (e.g., send to a server, store, analyze, notify user, etc.). Modules may define a set of user experiences, such as interaction flows or dialogs for a user, or forms, surveys, games, or other interactions. The module may include media content, and additionally or alternatively include links to media provided by one or more other sources, such as servers. The module can provide educational materials, information about specific medical conditions, and treatment regimens or wellness plans. The information provided through a module, and the interactions that the module instructs the application 730 to provide to the user, can be based on clinically-validated health or treatment information. As noted above, installing a module can configure the application 730 in various ways, including specifying how the application 730 accesses sensor data, provides user interface elements, interacts with an operating system or other applications (e.g., configuring the application 730 to send reminders, messages, notifications at a device), and interacts over a network.

In some implementations, modules include information that connects a user device to healthcare providers. For example, the module can configure the application 730 to provide information (e.g., sensor data of the phone, user comments, health plan compliance information) to a physician, coach, or other health care provider. This information may be sent from a user's device through the publishing server to a device of the provider. Similarly, a module may configure the application 730 so that, through the publishing platform, the healthcare provider can send real-time communications or updates to treatment plans or goals. According to the instructions in the module, communications from providers can be displayed or used to modify the interactions of the application 730 with the user.

The trackers are used to monitor user data from multiple sources and transmit signals in response to detecting patterns associated with the monitored user data. For instance, the trackers can be used to monitor specific physiological parameters (e.g., heart rate, blood pressure, oxygen levels). For example, as described previously, the modules can be customized to display pertinent healthcare-related or study-related information. The trackers can also designate conditions or contexts that trigger measurement and measuring of particular types of user information.

Figure 8:
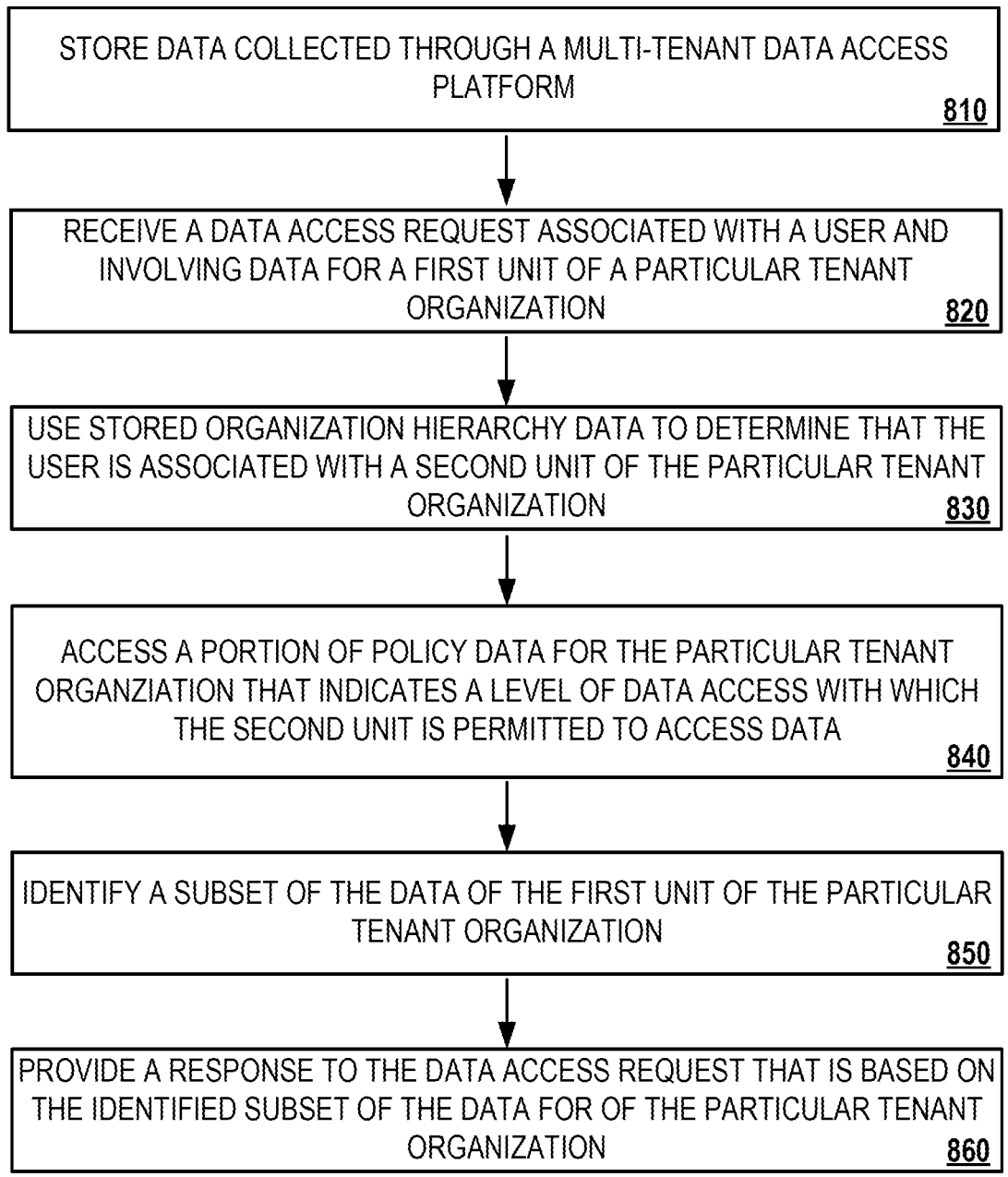
FIG. 8 illustrates an example of a process for providing a multi-tenant data access platform that applies policy data to provide different levels of data access to health data.

FIG. 8 illustrates an example of a process 800 for providing a multi-tenant data access platform that applies policy data to provide different levels of data access to health data is shown. The process 800 can be performed by one or more computers, such as by the server system 110.

Briefly, the process 800 can include the operations of storing data collected through a multi-tenant data access platform (810), receiving a data access request associated with a user and involving data for a first unit of a particular tenant organization (820), using stored organization hierarchy data to determine that the user is associated with a second unit of the particular tenant organization (830), accessing a portion of policy data for the particular tenant organization that indicates a level of data access with which the second unit is permitted to access data (840), identifying a subset of the data of the particular tenant organization (850), and providing a response to the data access request that is based on the identified subset of the data of the particular tenant organization (860).

In more detail, the process 800 can include storing data collected through a multi-tenant data access platform (810). For instance, the server system 110 can provide a multi-tenant data access platform 110A, which is centrally hosted on or provided by the server system 110. The server system is configured collect data for each of multiple tenant organizations and to selectively make the collected data available according to policies associated with the respective tenant organizations. The collected data is stored in association with organization hierarchy data and policy data for the respective tenant organizations.

The organization hierarchy data for an organization can indicate the structure of the organization, such as different units in the organization and the relationships between the units. The organization hierarchy data can also indicate which users are associated with which units (e.g., associating user identifiers to units of tenant organizations to which they belong), and the roles of the users. The policy data can specify data policies that govern how the server system 110 manages the collected data for the organization. For example, the policy data for the organization can specify rules, permissions, restrictions, and other settings that define which data be accessed, and in what manner the data can be used, by various different entities within the organization or outside of the organization. Each unit of an organization can have its own data policy, as can specific data sets or types of data in set of collected data for an organization.

A tenant organization can be a client or customer of the platform 110A, having its own data storage and access rights in the platform 110A independent of other tenant organizations. For example, each tenant organization can have the ability to store its own data in the platform, with data collected and stored for the organization under the tenant's control. As discussed above, the platform 110A can provide ongoing data collection and data processing services to receive inputs from distributed sources, such as mobile devices of individuals or other sources.

A tenant organization may be, but is not required to be, an entity such as a company, hospital, school, university, government agency, or other group. Typically the tenant organization has multiple users. A tenant organization can have multiple units, which can be divisions or groups within the overall organization, e.g., departments, offices, sites or locations, teams, classes, projects, research studies, committees, etc. Typically each unit has its own set of one or more users and its own set of data. The platform 110A can enforce the data policies to allow limited access to data among the different units of the tenant organization. For example, the policies may allow researchers to access the data collected for their own research studies and for other research studies in the same department, but not for research studies in other departments. The data policies allow extensive customization, allowing access and use to be finely tailored to the needs of each unit while limiting unnecessary access and maintaining privacy. For example, the data policies can provide or restrict access to data between units by topic or subject matter, by time, by location, by the type of data, by the source of data, by the unit that generated the data, by the unit that is requesting access, and the many other factors discussed above.

In traditional multi-tenant systems, each tenant's data is isolated from other tenants and remains invisible to other tenants. This does not allow for efficient sharing and aggregation of data across the boundaries of the different tenants' data repositories in the platform 110A. The platform 110A provides the capability for each tenant organization to define data policies to selectively share its data in a customized manner within the organization (e.g., for different units and users) as well as with other tenant organizations. For example, a tenant organization can define data policies to share data with one or more other organizations (e.g., specific organizations, categories of organizations, etc.). The data policies can specify different levels of access to provide for different organizations, e.g., no access to Tenant 2, partial access to Tenant 3, and full access to Tenant 4. The data policies allow the data sharing to be made subject to rules, conditions, usage restrictions, and other criteria that are enforced by the server system 110.

As a result, each tenant organization can potentially use and benefit from at least a portion of the data sets of other tenant organizations (e.g., the portions that those tenants choose to share, and subject to the limitations in the policies for those data sets). The server system 110 facilitates data sharing by allowing a tenant organization to pool or aggregate the portions of data sets that are shared, and then seamlessly act on the pool of data available across multiple organizations. For example, a user from an organization can search for records over the combined data collection, identify candidate participants for a cohort for a research study using the combined data collection, perform machine learning tasks using the combined data collection, perform data analysis using the combined data collection, and more. This arrangement benefits all tenants by expanding their access to large sources of data in the platform 110A, while still giving each tenant the tools to control how its own data is used in the platform 110A.

In the example shown in FIG. 1, the platform 110A is configured to collect participant data for at least two tenant organizations (e.g., Hospital A, Hospital B). The participant data includes information for participants of a research study that is conducted jointly by the two tenant organizations. In this example, the platform 110A selectively makes collected participant data available according to policy data 116 associated with the two tenant organizations. The data access policies include conditions relating to the status of a unit of each tenant organization and a corresponding level of access to the collected participant data for users of each unit. For instance, researchers of the Oncology department of Hospital A directly interact with participants of the research study so they are provided with participant-level identification information (e.g., name, date of birth, social security number and associated physiological data). In contrast, researchers of the Cardiology department of Hospital A (e.g., a different unit of Hospital A) do not directly interact with the participants so they are provided with participant-level de-identified information (e.g., redacted patient information and associated physiological data). As discussed throughout, examples of units within a tenant organization include one or more departments of the tenant organization, one or more clinics of the tenant organization, or one or more laboratories of the tenant organization.

As discussed throughout, the server system 110 stores various types of data for each tenant organization to enable differentiated levels of access between tenant organizations and different units of each individual tenant organization. In the example shown in FIG. 1, the server system 110 stores organization hierarchy data 112 specifying units within each tenant organization, relationships amongst the units, and users associated with the respective units. For instance, the organization hierarchy data 112 two units (Oncology, Cardiology) for Hospital A and two units (Neurology, Rheumatology) for Hospital B.

The server system 110 also stores policy data, such as data access policies specified within policy data 116, specifying respective levels of data access permitted for units of a tenant organization and for one or more other tenant organizations. For instance, policy data 116 includes one data access policy specifying a level of access for researchers of a unit of Hospital A that manage a research study (Oncology) and another access policy specifying different level of access for another unit of Hospital A that does not manage the research study (Cardiology). Other access policies are included for a tenant organization that has a partnership with Hospital A (Hospital B), and another tenant organization that does not have a partnership with Hospital A (Hospital C).

In some implementations, the levels of data access specified by the policy data include various types of access limitations. For example, the policy data can specify a set of time windows for obtaining access to the health data (e.g., limiting access to health data during business hours). As another example, the policy data can specify subsets of the health data that each correspond to a different data type (e.g., providing access only date of birth and location of a participant, but not name or social security number). As another example, the policy data can specify permission levels for modifying the health data. For instance, in the example shown in FIG. 1, data policy 116A may specify a permission level that allows researcher 101A to modify health data since he/she is affiliated with a source department of the tenant organization that manages the research study. In contrast, data policy 116B may specify a permission level that restricts researcher 101B from modifying the health data since he/she is only affiliated with a partner organization that collaborates on research study but does not manage it.

The server system 110 can store health data for health research studies corresponding to different units of tenant organizations. The health data can describe different types of data for participants in the health research studies, such as physiological data, monitoring data, among others. In the example shown in FIG. 1, health data 114 includes demographic information for participants (e.g., name, date of birth, social security number, location) and physiological data collected during a research study (e.g., blood pressure, activity level, sleep level, weight).

In some implementations, the health data includes monitoring data generated using sensors of mobile devices and/or wearable devices of participants in the health research studies. For example, as shown in FIG. 3, sensors of the computing device 324A generate monitoring data, such as average heart rate, daily steps, or daily caloric intake of a study participant. As another example, a wearable device 324C can be used to collect hours of sleep of a study participant.

In some implementations, the health data includes monitoring data generated using one or more applications running on user devices associated with participants of health research studies. For example, as shown in FIG. 3, computing device 324A of a study participant can run an application 326A that is configured to access services hosted on the server system 110 through the platform 110A. The application 326A can be configured to collect and report data for health research studies based on downloadable configuration data modules for the respective health research studies. In the examples depicted in FIG. 3, applications 326A and 326B obtain downloadable configuration data modules from the server system 110 to determine how to process data collected by computing devices 324A and 324B. In the first example shown in FIG. 3, the configuration data module 322A for Study A causes the application 326A to discard exercise survey data since this information is unlikely to be relevant to a sleep study. In the second example shown in FIG. 3, the configuration data module 322B for Study B causes the application 326B to monitor a new parameter that was not being monitored for an exercise study.

The process 800 can include receiving a data access request associated with a user and involving data for a first unit of a particular tenant organization (820). For instance, the server system 110 can receive a data access request associated with a user. The request, or data for a session in which the request is made, may include a user identifier for the user. The user identifier can be provided or determined when the user authenticates to the platform 110A, allowing the server system 110 to tailor access for the user based on the user's particular access rights, available data sets, user preferences, settings, user interface views, history, and so on.

The data that the request attempts to access may include data generated by or collected by the first unit of the tenant organization. For example, the data access request can involve data for a particular research study of a department of a tenant organization. In some cases, a research study itself can be considered a unit of an organization. The data may include collected data (e.g., sensor data, measurements, user inputs, health records, and so on). The data for the first unit may additionally or alternatively include other data for the first unit, such as data uploaded by members of the first unit (e.g., employees, researchers, administrators, etc.) or data generated in the platform 110A by members of the first unit (e.g., analysis results, machine learning predictions, reports, processed versions of collected data, etc.)

Many types of data access requests are possible. Examples include requests to view or download data. Other examples include requests to search the data (e.g., a query), to generate a report based on the data, to generate a visualization based on the data, to perform a machine learning task based on the data (e.g., use the data as training data for training a model, using the data to test or validate a model, applying a model to generate a prediction based on the data, etc.), to evaluate the data to identify candidate participants for a research study cohort, to perform statistical analysis on the data, and so on. Thus, a data access request in this case is not necessarily one that requires data to be retrieved or provided outside the platform 110A, but may be a request for the platform 110A to take some action on the data within the platform 110A, e.g., to use the data in analysis performed by the platform 110A.

In the example shown in FIG. 1, the server system 110 can receive data access requests from different users, such as a researcher 101A of the Oncology department of Hospital A, a researcher 101B of the Cardiology department of Hospital A, a researcher 101C of the Neurology department of Hospital B, and a researcher 101D from Hospital C. In these examples, the data access requests received by the server system 110 can include a request for information specified in the health data 114, and a unit of a tenant organization that is associated with the user. As discussed below, the unit and tenant organization identified in the data access request can then be used to determine the appropriate level of access to provide responsive to the data access request.

In some implementations, the data access request includes a search query for health data for health research studies corresponding to different units of the tenant organizations. For example, as shown in FIG. 2, the data access request 202 includes a search query for chemotherapy treatments received by participants of cancer research studies. In this example, the server system 110 determines that study data 214A of Study A and study data 214B of Study B both include participant data that is relevant to the search query. Study A and Study B can also be conducted by different departments of the same hospital (e.g., Oncology department and Cardiology department of Hospital A).

The process 800 can include using stored organization hierarchy data to determine that the user is associated with a second unit of the particular tenant organization (830). For instance, in response to receiving the data access request, the server system 110 can use a user identifier for the user to look up in the stored organization hierarchy data which tenant organization the user is associated with, and which unit in the organization the user is associated with. The stored organization hierarchy data for different organizations can specify the users that are part of the respective units of the various tenant organizations. In this example, the server system determines that user is associated with a second unit of the tenant organization (e.g., different from the first unit having the data that the data access request is attempting to access).

In one example shown in FIG. 1, the server system 110 uses the organization hierarchy data 112 to determine that researcher 101B is associated with the Cardiology department of Hospital A and that the data access request is for participant data for a research study managed by the Oncology department of Hospital A. As shown, this determination is based on the organization hierarchy data 112 specifying two units (Oncology, Cardiology) for Hospital A and that only the Oncology department manages the research study.

The process 800 can include accessing a portion of policy data for the particular tenant organization that indicates a level of data access with which the second unit is permitted to access data (840). In particular, the portion of policy data can be one that governs access and use for the data of the first unit of the tenant organization. The policy data for an organization can have portions that apply to different data sets and different units within an organization. For example, one policy may apply to data of the first unit, another policy may apply to data of the second unit, and yet another policy may apply to data of both the first and second unit. As another example, some policies may apply to different types of data, regardless of which unit in the organization has the data. The server system 110 can identify the specific data policies that apply to data of the first unit of the tenant organization, and specifically, which data policies apply to the specific data (e.g., data set, records, range of data, etc.) that the received data access request attempts to access.

As noted above, there may be multiple policies that affect how data of the first unit may be shared with the second unit. Some of those policies may apply specifically to the first unit, and some may apply to multiple units or to the organization as a whole. Also, some policies may apply to different portions of the data of the first unit. For example, one policy may apply to sensor data collected from participants of a research study, another policy may apply to health records of the participants, and so on. The server system 110 can identify all of the policies that apply to the current request, e.g., to the specific type of use requested by the data access request, to the data the request attempts to access, to the first unit to which the data belongs, and to the second unit of which the user making the request is a part. With the applicable policies identified, the server system 110 can determined the combined effect of those policies and what type of access, and/or what subset of the first unit's data, is permitted to be accessed.

For instance, the server system 110 can access a portion of the policy data for the particular tenant organization that indicates a level of data access with which the second unit of the particular tenant organization is permitted to access health data for the particular health research study of the first unit of the particular tenant organization.

In one example shown in FIG. 1, the server system 100 accesses a data policy specifying a condition that a department of the tenant organization that is not the managing department (e.g., the Cardiology department) is to be provided with participant-level de-identified data from among the health data 114. As discussed throughout, this is because only researchers in the Oncology department manage the research study (and therefore are permitted access to patient identifiable information). However, because researchers of the Cardiology department are nonetheless still associated with Hospital A, the data access policy does not prohibit access to participant-level de-identified patient data. In this way, providing access to de-identified patient data ensures that identifiable patient information is not shared with any researchers that are not, for instance, authorized to access that information.

The process 800 can include identifying a subset of the data for the particular tenant organization (850). In particular, the server system 110 can identify a subset of the data of the first unit of the tenant organization, where the subset is limited by the accessed portion of the policy data (e.g., for the data policy or data policies determined to apply). As discussed above, the limitations on access may be determined based on various factors, including the type of request made (e.g., the nature of use or access requested), the type of data to be accessed, the fact that the data is collected by or managed for the first unit, and that the request comes from a user in the second unit.

The limitations provided by data policies can also limit access or use in different ways. For example, some policies may allow only a subset of records (e.g., records for only a subset of individuals) to be used. Other policies may cause certain fields or types of data to be omitted. Still other policies may restrict personally identifying information from being used, and other anonymized identifiers may be used instead. Other policies may require data to be filtered or transformed before being used. As another example, some data policies may cause that only a summary or aggregate statistical measures be provided rather than data for individuals. As another example, some policies may adjust the level of detail or precision. Any or all of these types of limitations may cause portions of a data set to be excluded, masked, hidden, altered, or otherwise not provided in its original form, so that the resulting subset of data excludes at least some information based on the data policies. As an example, data for certain tables, records, columns, or fields of a database may be omitted. As another example, certain types of events recorded or measurements taken may be filtered out and thus excluded. As another example, records for some individuals may be excluded from the subset, or data in the subset may have reduced precision than the source data set stored for the first unit.

For instance, the server system 110 can identify a subset of the health data for the particular health research study. The subset is limited according to the accessed portion of the policy data. In one example shown in FIG. 1, the subset of the health data includes physiological data collected for participants, but not any patient identifiable information of the participants (e.g., participant-level de-identified data). For instance, as discussed above in reference to step 750, a data access policy within the policy data 116 specifies that researchers of the Cardiology department of Hospital A should only be provided to participant-level de-identified data so that any patient identifiable information is not included in the subset of the participant data that is eventually provided researcher 101B.

The process 800 can include providing a response to the data access request that is based on the identified subset of the data for the particular tenant organization (860). The type of response may vary depending on the type of request. In some cases, the response may be to provide the identified subset of data, e.g., delivering the subset over a network. For a query, the response may be data, records, other search results identified using the subset of data, where the search results are provided for download or for display at a client device. For a request to identify candidates for a cohort, the response may include a list of eligible individuals, determined using the subset of data, that meet cohort inclusion criteria. For a request for a machine learning task, the results may include a trained machine learning model for download, results of testing (e.g., accuracy measures) a machine learning model, or the predictions or inferences determined using a machine learning model. For a request to perform other analysis, the response can include measures, statistics, visualizations, and so on resulting from the analysis. The response can be provided over a communication network, such as the Internet, to a client device by a web page, web application, installed software application, or API, where the client device can display or process the response.

For example, the server system 110 can provide a response to the data access request that is based on the identified subset of the health data for the particular health research study. In one example depicted in FIG. 1, the server system 110 provides a response through interface 124B to a data access request provided by a researcher 101B. As shown in FIG. 1, the interface 124B includes redactions for patient information fields (e.g., name, date of birth) so that no patient identifiable information can be accessed by the researcher 101B. As noted above in reference to steps 750 and 760, this access limitation is enabled by an data access policy within the policy data 116 based on the researcher 101B being affiliated with a department of the Hospital A that does not directly manage a research study.

The process 800 can optionally include additional operations to those discussed above and shown in FIG. 8. For instance, in some implementations, the server system 110 can select to respond to the data access request using an option selected from among a set of options. As shown in FIG. 1, an example of one of the options is provided through the interface 124A, which includes personally identified health data for individual participants of a research study. Another example of one of the options is provided through the interface 124B, which includes de-identified health data for individual participants in the research study. Yet another example of one of the options is provided through interface 124C, which includes one or more aggregations of health data for the research study (e.g., average blood pressure, average activity level). As discussed above in reference to FIG. 1, the server system 110 makes the made based on access policies included in the policy data 116.

In some implementations, the process 800 include operations relating to configuration data modules. In such implementations, the server system 110 can provide one or more configuration data modules to mobile devices associated with the health research studies. For example, as shown in FIG. 3, the server system 110 provides a configuration data module 322A to computing device 324A to disregard exercise survey data submitted by a participant. Additionally, different configuration data modules can be provided to mobile devices associated with different research studies. As shown in FIG. 3, a configuration data module 322A for Study A is provided to computing device 324A, and another configuration data module 322B for Study B is provided to computing device 324B. The different configuration data modules respectively cause the mobile devices to perform monitoring and reporting of different types of data and/or different types of user actions. In the example shown in FIG. 3, the configuration data module 322A causes the computing device 324A to disregard exercise survey data, whereas configuration data module 322B causes the computing device 324B to instruct the wearable device 324C to monitor hours of sleep of a participant.

The example of FIG. 8 shows how data policies can control the access and use of data shared between units of the same tenant organization. The same techniques can be used to control the sharing of data between units of two different organizations or among many different tenant organizations.

Figure 9:
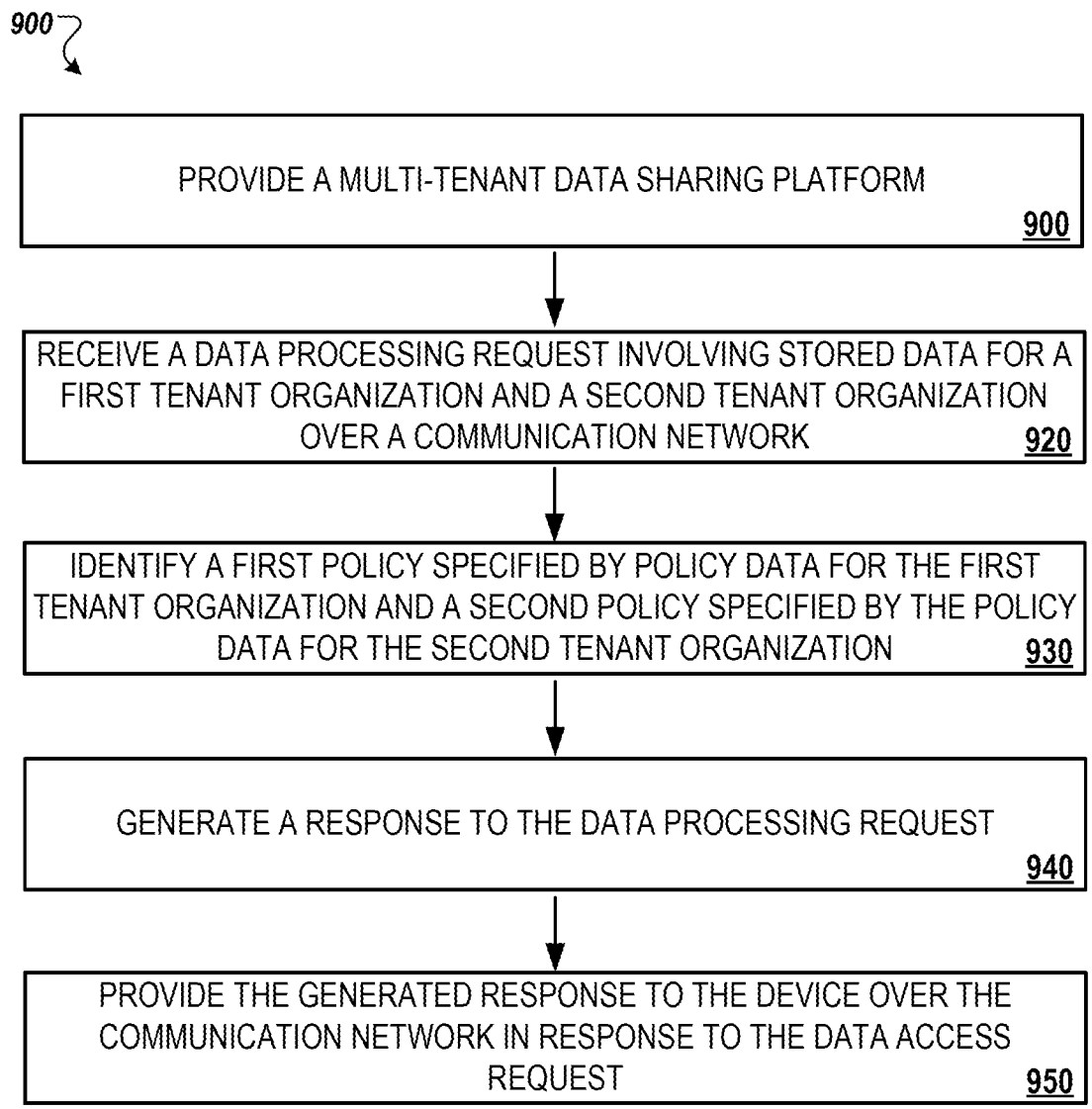
FIG. 9 illustrates an example of a process for providing a multi-tenant data sharing platform that applies policy data to aggregate data collected for different tenant organizations.

FIG. 9 illustrates an example of a process 900 for providing a multi-tenant data sharing platform that applies policy data to aggregate data collected for different tenant organizations. The process 900 can be performed by one or more computers, such as by the server system 110.

One of the advantages of the platform 110A is the ability to easily combine data from different tenant organizations, subject to the data policies that each organization places to limit the access and use to its data. The process 900 is an example how a user may perform operations on a combined set of data that includes separate data sets of two or more different tenant organizations (e.g., a first tenant organization and a second tenant organization). The server system 110 tracks which data policies apply to each data set of each organization, and enforces the limitations of each policy in performing the requested operations. As an example, analysis can be performed by the server system 110, based on the different data sets collected by and/or hosted by the server system 110, as cloud-computing-based SaaS functionality.

Briefly, the process 900 can include the operations of providing a multi-tenant data sharing platform (910), receiving a data processing request involving stored data for a first tenant organization and a second tenant organization over a communication network (920), identifying a first policy specified by policy data for the first tenant organization and a second policy specified by the policy data for the second tenant organization (930), generating a response to the data processing request (940), and providing the generated response to the device over the communication network in response to the data access request (950).

In more detail, the process 900 can include providing a multi-tenant data sharing platform (910). The platform can include the features discussed above for platform 110A and as discussed for FIG. 8 above. For instance, in the example shown in FIG. 4A, the server system 110 can provide a multi-tenant data sharing platform configured (e.g., platform 110) to selectively use stored data 406 collected for three tenant organizations A, B, and C. In this example, the server system 110 uses the stored data 406 according to policy data 412 for the respective tenant organizations. The policy data 412 includes policies indicates permitted use of collected data for a tenant organization by other tenant organizations. For example, data policy 412B indicates that organization B does not have access to dataset 406A of the tenant organization A and that organization C has full access to dataset 406A. As another example, data policy 412C indicates that both organizations A and C have full access to dataset 406C.

The process 900 can include receiving a data processing request involving stored data for a first tenant organization and a second tenant organization over a communication network (920). Many types of data processing requests can be provided, including requests to perform machine learning tasks, requests for statistical analysis, requests to manipulate a data set (e.g., to filter, summarize, visualize, etc. the data), requests to identify candidates for a research study cohort, etc. The platform 110A provided by the server system 110 can perform a large variety of data analysis processes on behalf of users. As just a few examples, the data processing request can involve query processing, retrieving data, filtering data, sorting data, computing derived values (e.g., an aggregate numeric representation of certain data cases), determining a range or distribution of data, characterizing a distribution, finding anomalies, clustering data, correlating data (e.g., to determine relationships among attributes and data cases), contextualizing data (e.g., finding contextual relevancy of the data to certain factors or data elements), generating models of the data, and so on. Further examples include requests for descriptive analysis, exploratory analysis, inferential analysis, predictive analysis, causal analysis, and mechanistic analysis.

Other examples of data processing requests include requests to determine statistical measures for a data set (e.g., mean, median, mode, maximum, minimum, variance, distribution characteristics, etc.) for various properties. In addition or as an alternative, the request may be for other types of analysis, such as a one-sample t-test, one sample median test, binomial test, chi-square goodness of fit, two independent samples t-test, Wilcoxon-Mann-Whitney test, Chi-square test, fisher's exact test, one-way analysis of variance (ANOVA), Kruskal Wallis test, paired t-test, Wilcoxon signed rank sum test, McNemar test, one-way repeated measures ANOVA, repeated measures logistic regression, factorial ANOVA, Friedman test, ordered logistic regression, factorial logistic regression, correlation analysis, simple linear regression, non-parametric correlation, simple logistic regression, multiple regression, analysis of covariance, multiple logistic regression, discriminant analysis, multivariate analysis of variance (MANOVA), multivariate multiple regression, canonical correlation, principal component analysis (PCA), or factor analysis.

In some cases, the data processing request specifies specific data sets or tenant organizations to which the request applies, for example, as selected by the user issuing the request. In other cases, the data processing request may specify more general information, such as criteria such as "all cardiology research studies in the last year," and the server system 110 will search among the data sets it hosts to determine those that meet the criteria.

For instance, in the example shown in FIG. 4A, the server system 110 receives the data processing request 402A from a device of user 401A. The request is received over a communication network, such as a network-based connection that enables communication between the device of the user 401A and the server system 110. The data processing request 402A involves stored data for the tenant organizations A, B, and C.

The process 900 can include identifying a first policy specified by policy data for the first tenant organization and a second policy specified by the policy data for the second tenant organization (930). The process 900 shows an example how the server system 110 can seamlessly combine the data from multiple organizations in this analysis, making available data that policies of the tenant organizations allow and omitting or otherwise restricting data that policies of the tenant organizations do not allow to be used. The process can be used for any number of data sets from any number of different tenant organizations. In order to combine the data for the different tenant organizations, the server system 110 identifies which policies are applicable to the different data sets to be used in responding to the data processing request. The server system 110 can make use of the organization hierarchy data and policy data for each organization to select these policies. For example, the server system 110 identifies each of the data sets that carrying out the request would involve (e.g., access or use in some way), determines the tenant organizations and units of the tenant organizations that control those data sets, and then uses the hierarchy data and policy data to identify the policies applicable to each data set that is involved in generating the response. If the request is a query, for example, the data sets to be searched may each have different sets of policies that limit how much data in the data set can be accessed by the user that submitted the request (e.g., by members of the user's organization), in what manner the data can be used, and so on.

The policies can limit types of access and types of use as discussed herein, at different levels of granularity and based on any of various factors (e.g., in addition to whose data it is and who is requesting the data, the associated time, location, data type, source of the data, etc., as well as the type of action the request attempts to perform). As discussed above, each organization has its own data policies which can specify differing policies for different units in an organization, different data sets, data types, and so on. The policy data and/or the organization hierarchy data can specify which policies apply to different data sets.

For instance, in the example shown in FIG. 4A, the server system 110 identifies a first data policy 412B. As shown, the data policy 412B is specified by the policy data 412 for the tenant organization B and indicates conditions for using the stored data (e.g., organization A does not have access and organization C has full access). In this example, server system 110A also identifies a second data policy 412C. The data policy 412C is specified by the policy data 412 for the organization C and indicates conditions for using the stored data (e.g., organizations A and B both have full access).

The process 900 can include generating a response to the data processing request using a combined set of data, which includes data the first tenant organization and second tenant organization with the data for each being limited according to the identified policies (940). The server system 110 can apply the policies identified in step 930 to obtain a combined set of data to use for carrying out the data processing request. In some cases, the server system 110 may actually create a new working data set by pooling together the data subsets available after the polices are enforces, e.g., copying the subsets or portions of the data sets that the policies allow to be used into a new data set for carrying out the request. In other cases, the server system 110 may perform the data processing request in pieces, e.g., separately for each tenant organization's data subset allowed for use in carrying out the request. For example, if the request is a query over two data sets, one for each of the first and second tenant organizations, then the server system 110 can carry out first search operations for the data set of the first organization (as limited by policies of the first organization), then carry out second search operations for the data set of the second organization (as limited by policies of the second organization), then combine the results of the two sets of search operations.

The server system 110 carries out the requested data processing action (e.g., machine learning training, machine learning inference, statistical analysis, data manipulation, generating a visualization, etc.) using the combined data set including the data from multiple tenant organizations. The server system 110 then formats or packages the results in an appropriate response format, e.g., data for a user interface, data provided through an API, etc.

For instance, in the example shown in FIG. 4A, the server system 110 generates the response 408A to the data processing request 402A. The response 408A is generated based on the dataset 406B for the organization B and the dataset 406C for the organization C. Contents and/or use of the datasets 406B and 406C in generating the response 408A is limited by the policies 412B and 412C. For example, as shown in FIG. 4A, the result 408A does not include dataset 406B since policy 412B specifies that organization A does not have access.

The process 900 can include providing the generated response to the device over the communication network in response to the data processing request (950). For instance, in the example shown in FIG. 4A, the server system 110 provides the response 408A to the device of the user 401A over the communication network in response to the data access request. The type of response may vary depending on the type of request. In some cases, the response may be to provide the identified subset of data, e.g., delivering the subset over a network. For a query, the response may be data, records, other search results identified using the subset of data, where the search results are provided for download or for display at a client device. For a request to identify candidates for a cohort, the response may include a list of eligible individuals, determined using the subset of data, that meet cohort inclusion criteria. For a request for a machine learning task, the results may include a trained machine learning model for download, results of testing (e.g., accuracy measures) a machine learning model, or the predictions or inferences determined using a machine learning model. For a request to perform other analysis, the response can include measures, statistics, visualizations, and so on resulting from the analysis. The response can be provided over a communication network, such as the Internet, to a client device by a web page, web application, installed software application, or API, where the client device can display or process the response.

In some implementations, whether explicitly requested by a user or done automatically by the system 110, the server system 110 can create a combined data set, having information taken from data sets of different organizations, that is stored and made available for use later. The data can inherit the data policies of the organizations from which the component data elements were taken, for example, through a link or reference back to the original data policies. This can result in heterogeneous data polices being applied within the combined data set. As another option, the most restrictive options across the policies applicable to any of the data in the combined set can be used for the data set as a whole, to allow a consistent policy for the entire combined data set.

Figure 10:
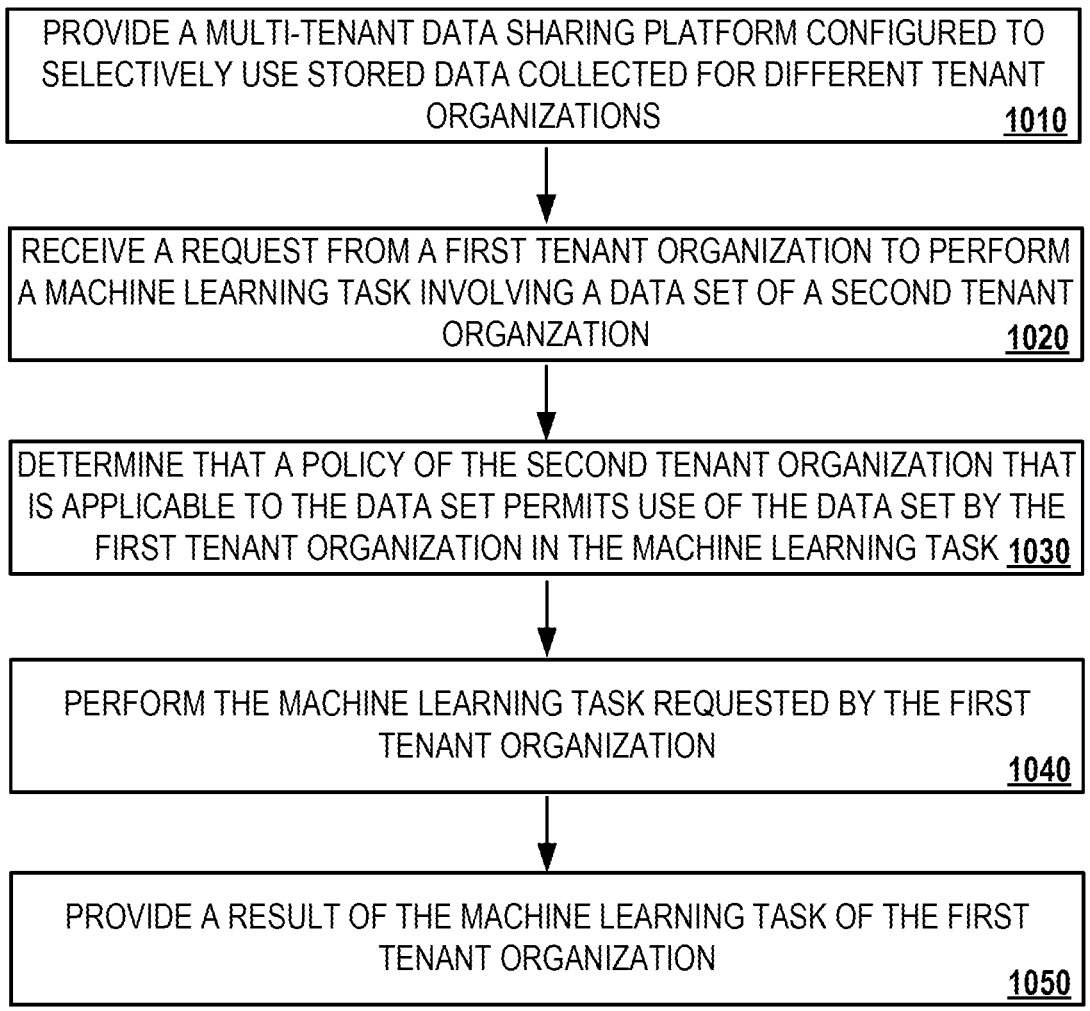
FIG. 10 illustrates an example of a process for providing a multi-tenant data sharing platform for enabling machine learning tasks.

FIG. 10 illustrates an example of a process 1000 for providing a multi-tenant data sharing platform for enabling machine learning tasks. The process 1000 can be performed by one or more computers, such as by the server system 110.

Briefly, the process 1000 can include the operations of providing a multi-tenant data sharing platform configured to selectively use stored data collected for different tenant organizations (1010), receiving a request from a first tenant organization to perform a machine learning task involving a data set of a second tenant organization (1020), determining that a policy of the second tenant organization that is applicable to the data set permits use of the data set by the first tenant organization in the machine learning task (1030), perform the machine learning task requested by the first tenant organization (1040), providing a result of the machine learning task of the first tenant organization (1050).

In more detail, the process 1000 can include providing a multi-tenant data sharing platform configured to selectively use stored data collected for different tenant organizations (1010). The platform can selectively share data for machine learning tasks across boundaries of different tenant organizations, according to the data policies that the tenants set. The platform can have some or all of the features of the platform 110A discussed above. The platform can provide access to combined data sets, across different units of a tenant organization and/or across different tenant organizations, as discussed herein and especially in FIGS. 8 and 9.

For instance, the example shown in FIG. 4C, the server system 110 provides a multi-tenant data sharing platform (e.g., platform 110A). In this example, the platform 110A is configured to selectively use stored data 456 collected for tenant organizations A, B, C, and D according to policy data 462 for the respective tenant organizations. The policy data 462 indicates permitted use of collected data for an organization by other tenant organizations. For example, the policy data 462 includes policy 462A indicating permitting use of dataset 456B by a user of organization A (e.g., user 401). The policy data 462 also includes policy 462B indicating permitted use of dataset 456C by the user 401 and policy 462C indicating permitted use of dataset 456D by the user 401.

The process 1000 can include receiving a request from a user associated with a first tenant organization to perform a machine learning task involving a data set of a second tenant organization (1020). The machine learning task can include training a model, using a model to determine a prediction or inference, testing or validating a model, and other types of machine learning tasks. These and other machine learning tasks are discussed in more detail further below. The task can be received through a data interface, such as an API, or through interactions with a user interface, e.g., receiving data indicating user interaction with a web page, web application, installed software application, etc. As an example, a user interface may indicate data sets and data elements within those data sets, and allow a user to select or otherwise specify (e.g., drag and drop to a certain location) which types of data elements (e.g., measurements, metrics, attributes, etc.) represent inputs for a model to be trained, and which types of data elements should be used as outcomes or properties to be predicted.

For example, from a list of data elements available in one or more data sets selected by the user or by the platform 110A, the user input may select age, sex, resting heart rate, exercise peak heart rate, step count, and user-reported stress level as inputs and select sleep quality and blood pressure as results to be predicted. The functionality of the user interface may allow the user to specify other information such as the time scale for the inputs (e.g., representing a day, week, month, etc.), whether the outputs should be classifications or numerical predictions, the type of modeling to use, and so on. In this manner, the user interface can enable a user to fully specify a task such as training a neural network or other machine learning model. The interface can also include functionality for a user to specify other parameters of the machine learning task, such as the type of machine learning analysis (e.g., clustering, prediction, classification, regression, etc.) the type of model (e.g., neural network, classifier, regression model, reinforcement learning model, etc.), the training technique or algorithm, the size of the model (e.g., topology, number of parameters, etc.), accuracy level needed, amount of training data to use, specific data sets to use as training data, and so on.

As another example, the server system 110 can provide data for a user interface that, when displayed at a client device (e.g., in a web page, web application, installed software application, etc.), shows data sets and machine learning models available to a user, along with descriptions. The options of models and data sets can be from the user's own unit or organization, and/or those available in the platform 110A (e.g., due to access allowed from corresponding data policies) from other organizations. The data policies may specify the ability to share or restrict use of machine learning models as well. The user interface can include controls enabling a user to select a model and select one or more data sets (and/or a subset of a data set, such as specific records or a filtered set of records) on which to apply the model. Thus, the server system 110 can enable a user to apply a model, from its own organization or another, to one or more different data sets, from its own organization or others. The users of the platform 110A can use a variety of models for outcome prediction, data clustering, probability assessment, classification, regression, etc., all of which can be processed by the platform 110A using data hosted in the platform 110A.

For instance, in the example shown in FIG. 4B, the server system 110 receives the request 452 from the user 401 of the tenant organization A. The request 452 includes an indication to perform a machine learning task involving the stored data 456.

In some implementations, the machine learning task may be one that is requested implicitly. For example, without a user requesting a new machine learning model be generated or trained, the user may use a user interface to request a prediction, such as the likely compliance rate or completion rate for a research study cohort either as a whole, for sub-groups, or for individuals Similarly, a user may request a prediction of a likelihood of certain health outcomes for people described in a data set. The server system 110, to provide the prediction requested may use an existing machine learning model or may create or train a new model to be able to carry out the prediction the user requests. Thus, a user request may implicitly call for a machine learning task.

The process 1000 can include determining that a policy of the second tenant organization that is applicable to the data set permits use of the data set by the first tenant organization in the machine learning task (1030). In some cases, the data policies may permit general use (e.g., read access or general use in analysis) which encompasses use in machine learning. In other cases, this type of broad access may be restricted, but the data policies may more specifically specify whether data can be used for machine learning tasks, and even for specific aspects of machine learning processing such as training a model, testing or validating a model, or using the data as input to generate a prediction or inference. Thus, there are situations where the data policy may prohibit general use of data (e.g., especially about individual people), such as downloading and viewing the data, but the policy may nevertheless permit the data to be used for machine learning training or other machine learning tasks. This use may be potentially conditioned on the training also using other data sets, so the data is sufficiently aggregated with data from other sources. Policies to allow machine learning training use in this manner can allow the platform 110A to perform training for users that the users could not perform themselves, since they are blocked from obtaining the data that would be needed for training. Stated another way, the platform 110A can make a large pool of data available for machine learning training and other machine learning tasks within the platform 110A, with data from among many different tenant organizations, without revealing the actual data to the organizations that make use of the data for this purpose.

For instance, the example depicted in FIG. 4B, the server system 110 determines that policy 462A of organization B is applicable to aggregate data to be used in a training operation specified by the request 452. As shown in FIG. 4B, data policy 462A indicates that summary-level data from dataset 456B is permitted to be accessed for the purpose of training a machine learning model using aggregate data.

The process 1000 can include performing the machine learning task requested by the user associated with the first tenant organization (1040). For example, the server system 110 identifies the portions of the data sets that are available to be used according to the applicable policies, and then uses those portions of the data sets to perform the machine learning task.

In the case of machine learning model training, the server system 110 can identify records or portions of that the policies allow to be used. The set of records or even individual records may be potentially redacted, filtered, or otherwise modified as specified by the applicable data policies. The server system 110 can then derive machine learning training examples from the available data, for example, with records for different individuals being processed to determine sets of feature values for the different input features for the model, and with each feature vector having a label (e.g., "ground truth" classifications or scores) indicating the training target for that example. The various examples can then be used to train a model iteratively, where each training iteration can involve providing an example as input to a model, processing the input with model to obtain an output, updating the parameter values for the model based on the output and the label for the example, and so on.

Other techniques can be used. For example, for clustering, the server system 110 can examine the data and run clustering algorithms to determine the characteristics and boundaries of different clusters in the data. As another example, if the task is to generate predictions based on a data set, the server system 110 can, one by one, generate input vectors or other input data based on each individual represented in the data set, provide the input vector to a model, obtain an output that the model provides in response (e.g., an output score, a probability distribution over various outcomes, etc.), and then assign a prediction (e.g., classification or score) based on that output. This can enable the server system 110 to provide a prediction for each person represented in the data set.

In some cases, the data policy for a data set to be used for machine learning prediction may restrict a user's direct access to one or more of the types of input data used as input to the model, but the policy may nevertheless allow the data to be used in generating the input data to the model. For example, the data set may include information about a height, weight, age, and so on that are kept confidential and not viewable or downloadable by other organizations. Nevertheless, the system may perform a machine learning task from one of the other organizations using this information. For example, an user from an outside organization may request to apply a model that predicts diabetes risk to the data set. This action may involve generating an input vector based on the height, weight, and blood pressure values that are restricted from direct access. However, the input vectors will not be provided to the user requesting the analysis and so performing the task will not disclose the restricted data. The owner of the data may also explicitly allow or deny this sort of machine learning use in the corresponding data policy. The server system 110 can generate the input vectors based on the data, generate the diabetes risk predictions, and provide the results to the user, such as an anonymized list of the risk predictions. This data along, with other data that may be available for the data set (e.g., summary aggregate measures, general demographic information such as age, sex, and location), can still provide valuable information to researchers.

For instance, in the example shown in FIG. 4A, the server system 110 performs a machine learning task requested by the user 401 in the request 452 based on determining that access to stored data is permitted. For example, the server system 110 generates aggregate data 458 to be used in training the model 454. The aggregate data 458 includes de-identified records included in dataset 456B based on the policy 462B indicating that only de-identified participant-level data can be used for model training. The aggregate data 458 also includes a summary record extracted from dataset 456C based on the policy 462C indicating that only summary-level data can be used for model training.

As shown in the process 1000, the server system 110 allow machine learning tasks based on data of an organization different from the organization to which the user requesting the task belongs. In addition, the system allows the data to be aggregated across many different organizations. For example, a user may request that the system generate a machine learning model that use, as training data, data from each of 5 different hospitals that are all different tenants in the platform 110A. As another example, a user may request that the system generate a model based on results of research studies across multiple different departments of many different independent universities. In many cases, large numbers of training data are needed to obtain accurate machine learning models, often more than one research team or organization can collect. Nevertheless, by allowing each tenant organization, and even each unit of each tenant organization, to designate their data for machine learning by others, the platform 110A can enable each organization to obtain a large pool of diverse training data that they can use for machine learning tasks performed in the platform 110A, even if the data is not permitted to be directly viewed and downloaded.

The process 1000 can include providing a result of the machine learning task of the first tenant organization (1050). The results can be provided in different ways. For example, if the task is to generate or train a model, the result can be a copy of the trained model, provided over the communication network (e.g., the Internet), such as through a download to a user's local client device. As another example, the server system 110A can host the model and process data through the model, and so the result may be an interface in which the user can specify data to be used as input for the newly trained model to generate predictions or inference from. For a request to apply a model to a data set, the result can be an indication of the output of the model, such as the predictions or inferences about certain outcomes for individuals or groups, indications of cluster assignments or a grouping of the data, and so on. For requests to validate or test a model, the results can be accuracy measures, indications of outliers or data cases where additional training is needed, and so on.

For instance, in the example depicted in FIG. 4B, the server system 110 provides a training operation to the user 401 of the tenant organization A. In this example, a trained model can be provided to the user 401 without providing any access to the aggregate data 458 that was used to perform model training. As discussed throughout, in this way, the platform 110A enables training of a machine learning model while also enforcing access restrictions associated with the respective data sets used to perform training.

The machine learning task can include various types of operations related to machine learning. In the example shown in FIG. 4B, the machine learning task includes training the model 454 based on data of multiple tenant organizations (including data of tenant organizations that a requested user is not associated with). In other examples, the machine learning task can involve generating a new model based on stored data, or refining or updating an existing model based on stored data.

In some implementations, the machine learning task can involve applying a machine learning model to one or more records within stored data. For example, the server system 110 can access records of multiple tenant organizations, generate an input vector for a neural network model, generate an output of the model, and/or possibly evaluate the output. Examples of evaluations can include assigning a classification or comparisons to a threshold. Depending on the policy data 462, the user may receive may get different levels of data for the machine learning task. For instance, in the example, shown in FIG. 4A, users of different tenant organizations are able to access different aggregate data to be used for training a model specified in a machine learning task. In other examples, users of different organizations may receive different analysis results, different model output, or different input vectors.

In some implementations, the machine learning task includes model training or inference for various types of operations. Examples of operations include classification to assign data to categories, regression to predict the value of a continuous variable, clustering groups data according to similarity, anomaly detection (e.g., using principal component analysis (PCA), ranking, generating recommendations, or generating forecasts.

In some implementations, the machine learning task includes request to predict an outcome based on data collected through the multi-tenant data platform. In such implementations, the server system 110 can implicitly generate model based on the collected data even though the request does not explicitly specify that a model be generated and applied to identify the predicted outcome. In this way, the server system 110 can be configured to dynamically generate and/or refine machine learning models based on processing information specified within requests to perform machine learning tasks. Prediction data generated by a dynamically generated model may be provided to users in response to the request without providing access to the dynamically generated model. In other implementations, the server system 110 can also implicitly train a machine learning model and provide access to the trained model. For example, the server system 110 can provide an interface to use the model while it is hosted by the platform (e.g., making the trained model accessible to run inference processing on a cloud computing system).

In some implementations, policy data does not allow a tenant organization to access a dataset for performing a machine learning task. In the example shown in FIG. 4B, the policy 462 is applying to provide the user 401 with access to a model training using aggregate data 458. However, while the user 401 is provided with a trained model, he/she is not provided with access to the aggregate data 458 itself.

In some implementations, the machine learning model includes at least one of a neural network, a support vector machine, a classifier, a regression model, a reinforcement learning model, a clustering model, a decision tree, a random forest model, a genetic algorithm, a Bayesian model, or a Gaussian mixture model.

The machine learning task can include training a model, using a model to determine a prediction or inference, testing or validating a model, and other types of machine learning tasks. The machine learning task can be performed using data of a single tenant or for data aggregated from multiple tenants. The data used can be limited according to the data policies of the organizations too which the data belongs. Nevertheless, in many cases policies allow for use in a machine learning task even though the underlying data would not be directly accessible for, e.g., viewing or downloading. As a result, the platform 110A enables users to share data with other organizations and use shared data from other organizations, with the platform 110A acting on users behalf to do the machine learning processing, without violating privacy and without requiring direct access to the underlying source data.

In further detail, the machine learning task can include training a machine learning model. This may involve generating a new model, enhancing or adapting an existing model to a new purpose or use, or updating an existing model (e.g., refining the training state of a model with additional training examples). As an example, a user from the first organization may desire to create a model that predicts the likelihood of different health outcomes given certain factors, such as physiological measurements, user behaviors, and or medical history of the user. The first organization may desire to create a model that predicts the likelihood of different health outcomes given certain factors, such as physiological measurements, user behaviors, and or medical history of the user.

Using a user interface or API to access the platform 110A, the user may select research studies or data sets that have records of the types of outcomes (e.g., items to predict) and factors (e.g., variables, input features, or items to condition predictions on) of interest to the user. In some cases, the interface may allow the user to specify those outcomes and related factors, and thus define inputs and outputs for the model to be generated. For example, the platform 110A can present a list of data items registered or known to the platform 110A. As another example, the options may be determined from one or more data sets selected by the user or accessible to the user given the data policies, the platform 110A can determine the types of data available in the records (e.g., resting heart rate, exercise step count, hours of sleep, age, weight, or whatever other data may be available), such as what fields are present or populated. The user can then specify one or more of the available types of data items as inputs for a model and one or more of the available data types as output(s) to be predicted the model. In some implementations, the platform 110A itself can search for and identify data sets that would provide the types of data needed, from across many or even all of the different tenant organizations who is data policies allow use in machine learning.

The identified data sets and/or records within the data sets can be additionally filtered according to various criteria which can be specified by the user, for example, data quality or reliability requirements, completeness of the data sets, duration of time that data is monitored, location of individuals, demographic characteristics or other characteristics of individuals, and so on. As a result, the platform 110A can identify a pool of records that meet the criteria of a user, where the records are taken from one or more of the data sets from one or more of the tenant organizations. This allows the platform 110A to compile a set of data for machine learning training that meets the requirements for training of the model the user is developing.

The type or structure of the machine learning model may be selected by a user or may be determined automatically by the platform 110A. For example, the user may specify that a neural network with a certain number of layers and parameters per layer be used. As another example, the platform 110A can include various model templates, e.g., neural networks of different topologies or sizes, and the user may select from among the options or the platform 110A can automatically select one according desired constraints on, e.g., model size, computational complexity, number of inputs, number of outputs to be predicted, and so on.

With a set of training data determined, often including records from many different research studies and/or different organizations, the platform 110A then performs machine learning training using examples of individuals to perform training iterations that progressively Improve the training state of the model. For example, the machine learning model can be a neural network, and the platform 110A can use backpropagation of error and other training techniques to adjust the values of parameters (e.g., weights of nodes or neurons) of the neural network. As another example, the machine learning model can be a classifier, and the platform 110A can use records or events indicated by the data sets to train the classifier to distinguish among different conditions. As another example, the machine learning model can be a clustering model, and the platform 110A can use the data sets to define different clusters or to determine the factors or combinations of values that define boundaries between different clusters.

Machine learning training in this manner often uses the detailed records of individuals or groups, but the resulting model generally does not risk exposing the private information of any individual or group when training is based on a sufficiently diverse set of training data. As a result, even when the platform 110A uses private data to train a model on behalf of an organization, the model itself can be provided without revealing any sensitive information. As a result, the platform 110A may provide a trained model to a tenant, for use by the tenant on its own computers, after training the model on the tenants behalf. Of course, the platform 110A may additionally or alternatively store and use the model on behalf of the tenant, for example, as a cloud computing service or machine-learning as a service (MLaaS) platform 110A for generating predictions. With the model developed and trained, and stored by the platform 110A, the tenant that generated the model can apply that model to any of the data sets that the user can access. For example, a user associated with one study may use the platform 110A to generate a machine learning model based on the data collected for ten different studies by ten different organizations.

The platform 110A may optionally further automate the process of generating a machine learning model. For example, given a set of one or more outcome data types to be predicted (e.g., as specified by a user through a user interface or API), the platform 110A can identify data sets, potentially across many units and organizations, that include data for that data type to be predicted. The platform 110A can then perform a statistical analysis to determine the correlation between the data type to be predicted and the various other types of data available. This analysis can be done using the limited group of data sets that the user is able to access or optionally using a wider range of data sets. The platform 110A can then select the data items that have the highest correlation with the outcome or characteristic to be predicted and then set these items as the inputs to the model to be generated. The platform 110A can inform the user of the identified inputs. When the correlation analysis is done using data sets that the user can access for machine learning tasks, the items selected for generating input features for the model will all be accessible through the user's available data sets. The platform 110A can then identify the data sets that have collected data for both the input features the platform 110A selected as well as the outcome or characteristic to be predicted to use as training data. For example, if the outcome to be predicted is a user's blood pressure, the actual blood pressure data collected can be used as a training target for supervised training. The platform 110A can then generate and train the machine learning model.

With a machine learning model trained or otherwise available, the user may then direct the platform 110A to use that model to generate predictions for individuals in the users on study, or for individuals in any study of any organization for which data is shared or is accessible according to the corresponding data policy. In response, the platform 110A can generate input data sets, e.g., input vectors to provide to a neural network, based on each individual for whom a prediction is needed. The platform 110A inputs the input data sets to the trained model, receives an output for each user, and then stores and provides the prediction result from the model for each individual.

In some cases, the data policies for data sets may restrict a user from directly accessing data, but nevertheless allow machine learning prediction or inference to be performed using the data. For example, a research study may include health data about individuals and may prohibit direct viewing and downloading of that data. Nevertheless, the data policy may permit the data to be used by the platform 110A, on behalf of at least some third parties, to generate the input data for a machine learning model. As a result, the platform 110A can use each individual's patient records to determine an input vector for the patient, process these input vectors using the machine learning model, and determine an output prediction for each user. The predictions themselves, which can be anonymized, can then be returned to the user that requested the analysis be performed. This can provide data about the distribution of different predictions across a group or population. Indeed, the platform 110A can also apply filters for the user, such as to filter the predictions to show predictions only for individuals in a certain age range, sex, location, or other factor or combination of factors.

The machine learning task may include testing or validating a machine learning model based on data from other organizations, even if that data is not directly available according to the data policies. For example, after training a model, the platform 110A may identify a data set that has the type of data needed to generate input for the machine learning model as well as collected data that would be indicative of the property or outcome put the model predicts. Alternatively, a user may manually select a data set to use for testing the model. The platform 110A then uses the data To generate input vectors representing specific examples, processes each input vector with the model, obtains an output prediction from the model, and compares the predicted output with the data actually collected in the data set. The comparison between the predictions and the actual records allows the platform 110A to generate measures of the accuracy of the model, for example, a percentage of how accurately the model predicts certain outcomes, a rate of false positives, a rate of false negatives, or other measures. Thus, without revealing the data for individuals for their health outcomes, the platform 110A can nevertheless use the private data for the individuals to assess the accuracy and reliability of the model. The performance measures for the model, such as accuracy scores, do not reveal the content of private data but nevertheless are very significant in determining the statistical reliability of the machine learning model. These measures can be provided to the users and organizations that develop the model using the platform 110A the platform 110A provides. The performance measures can also be used by the platform 110A in the process of training to determine when a model should be updated or when the model has achieved at least a minimum threshold level of accuracy and thus is ready to be provided or used by a tenant organization.

While the example process 1000 emphasizes machine learning tasks, the same principles and techniques can be used equally for other types of data processing and analysis. For example, the same techniques discussed for receiving and responding to a request for a machine learning task can be used to receive and respond to data analysis tasks, using data sets of one or more organizations in the manner allowed by the respective data policies. The platform 110A can be used to determine statistical measures for a data set (e.g., mean, median, mode, maximum, minimum, variance, distribution characteristics, etc.) for various properties. In addition or as an alternative, statistical analysis of other types can be applied to data sets, such as a one-sample t-test, one sample median test, binomial test, chi-square goodness of fit, two independent samples t-test, Wilcoxon-Mann-Whitney test, Chi-square test, fisher's exact test, one-way analysis of variance (ANOVA), Kruskal Wallis test, paired t-test, Wilcoxon signed rank sum test, McNemar test, one-way repeated measures ANOVA, repeated measures logistic regression, factorial ANOVA, Friedman test, ordered logistic regression, factorial logistic regression, correlation analysis, simple linear regression, non-parametric correlation, simple logistic regression, multiple regression, analysis of covariance, multiple logistic regression, discriminant analysis, multivariate analysis of variance (MANOVA), multivariate multiple regression, canonical correlation, principal component analysis (PCA), or factor analysis.

Figure 11:
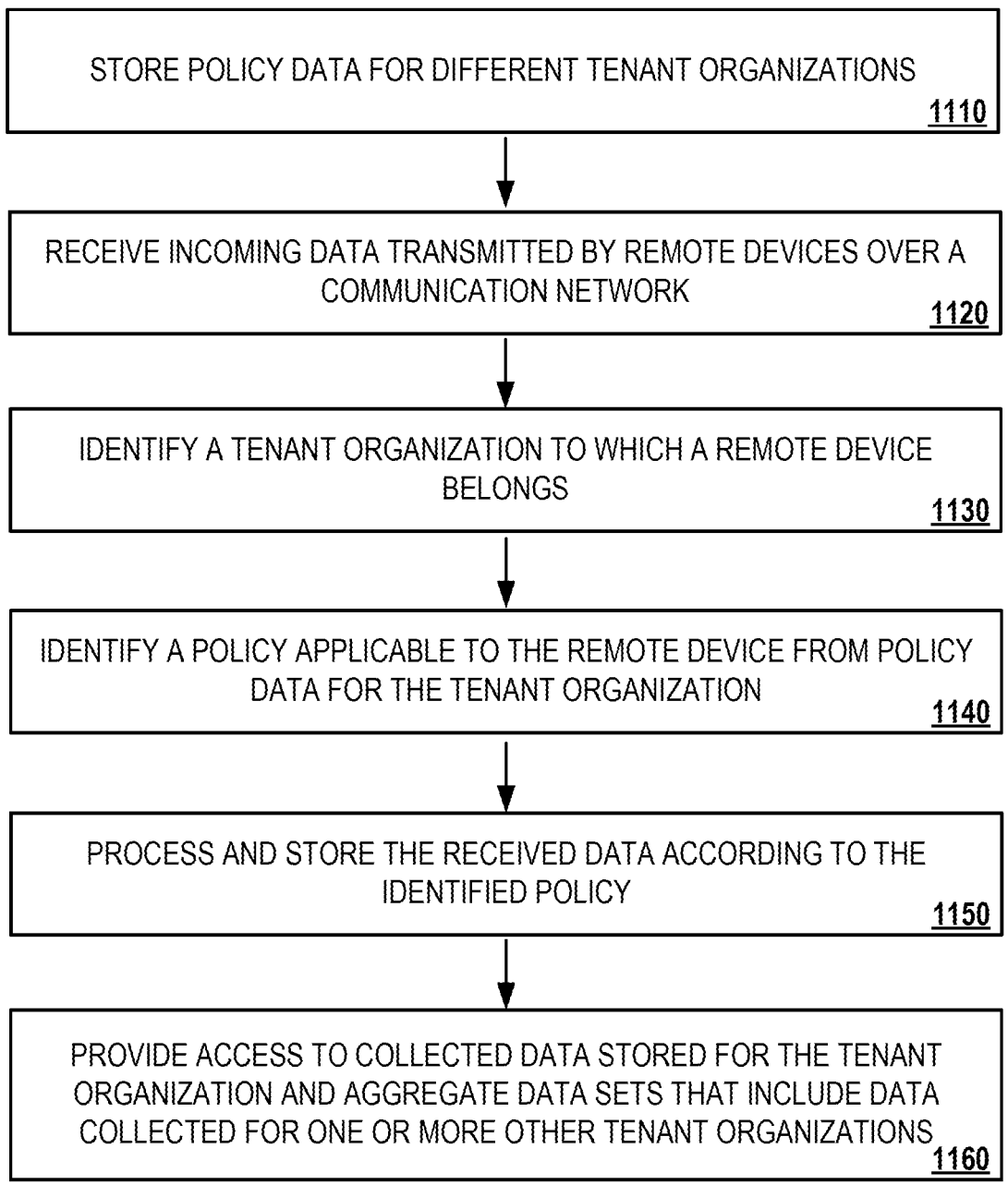
FIG. 11 illustrates an example of a process for adjusting data collection on remote devices based on data collected through a multi-tenant data platform.

FIG. 11 illustrates an example of a process 1100 for adjusting data collection on remote devices based on data collected through a multi-tenant data platform. The process 1100 can be performed by one or more computers, such as by the server system 110.

Briefly, the process 1100 can include the operations of storing policy data for different tenant organizations (1110), receiving incoming data transmitted by remote devices over a communication network (1120), identifying a tenant organization to which a remote device belongs (1130), identifying a policy applicable to the remote device from policy data for the tenant organization (1140), processing and storing the received data according to the identified policy (1150), and providing access to collected data stored for the tenant organization and aggregate data sets that include data collected for one or more other tenant organizations (1160).

In more detail, the process 1100 can include storing policy data for different tenant organizations (1110). For instance, in the example shown in FIG. 3, the server system 110 stores policy data 312 for different tenant organizations (e.g., Hospital A, Hospital B) managing different studies (study A, study B). The policy data 312 includes data policies specifying storage and processing by the server system 110 for data collected from remote devices over a communication network. For example, data policy 312A specifies data items, a precision level, and a storage format of sensor data obtained from the third-party data provider 302A and exercise survey data collected from mobile devices 302B. Remote devices can be user devices that each have a same application (e.g., application 326A), but different data configuration modules. The data configuration modules enable the application to be customized for a particular organization, a specific unit within an organization, or a specific research study being managed by the organization. The data configuration modules can also configure the application to collect data for a particular organization, a specific unit of the organization, or a specific research study being managed by the organization.

The process 1100 can include receiving incoming data transmitted by remote devices over a communication network (1120). For instance, in the example shown in FIG. 3, the server system 110 receives incoming data transmitted by remote devices over a communication network. As shown in FIG. 3, the incoming data can include sensor data transmitted by the third-party data provider 302A or exercise survey data transmitted by the mobile devices 302B of participants of research studies A and B. Incoming data can include sensor data, user interaction data, user responses to questions, among others.

The process 1100 can include identifying a tenant organization to which a remote device belongs (1130). For instance, in the example shown in FIG. 3, the server system 110 performs a set of operations for received data for each of the third-party data provider 302A and the mobile devices 302B. The operations include identifying a tenant organization to which the remote device belongs. For example, if a device included in the mobile devices 302B is for a participant that is enrolled in study A, then the server system 110 identifies that the device belongs to the Hospital A.

The process 1100 can include identifying a policy applicable to the remote device from policy data for the tenant organization (1140). For instance, in the example shown in FIG. 3, the server system 110 identifies a policy applicable to the remote device from the policy data for the identified tenant organization. As an example, if a device included in the mobile devices 302B is for a participant that is enrolled in study A, then the server system 110 identifies the policy 312A applicable to the device from the policy data 312.

The process 1100 can include processing and storing the received data according to the identified policy (1150). For instance, in the example shown in FIG. 3, the server system 110 processes and stores the received data according to the identified policy. As shown in FIG. 3, the server system 110 generates aggregate data 314A for Study A using policy 312A. In this example, the server system 110 extracts data items from sensor data obtained from data source 302A with minimal or no additional processing based on the data policy 312A. However, the server system 110 does not extract any data from source 302B since the exercise survey data included in the data obtained from this source is not relevant to any of the two data items specified in the data policy 312A (hours of sleep, sleep movement). In this way, although the platform 110A provides the server system 110 with access to different types of available data, only relevant data is actually aggregated based on the application of data policy 312B.

In some implementations, the server system 110 processes the received data by performing validity testing on the received data. For instance, the server system 110 can determine whether the received data is reasonable given the expected range, prior values, rate of fluctuation. In the example shown in FIG. 3, the system 110 can determine that an hours of sleep measurement is invalid if, for instance, the number of hours exceeds the average number of hours for a collection of users, the historical average number of hours for a given user, or is a high-enough number to represent a collection error (e.g., 17 hours of sleep in a day).

In some implementations, the server system 110 stores the received data by classifying the received data and storing a classified data type. As examples, the server system 110 can store the format, precision, duration, privacy level, security level, or frequency of measurements of the received data. In storing the received data, the server system 110 may also determine whether to store raw data or a summary.

The process 1100 can include providing access to collected data stored for the tenant organization and aggregate data sets that include data collected for one or more other tenant organizations (1160). For instance, in the example shown in FIG. 3, the server system 110 provides access over the communication network to collected data stored for a tenant organization. For example, data collected for research study A from mobile device 302B can be provided to researchers managing study A through, for example, a management interface. The server system 110 can also provide access to aggregate datasets that include data collected for one or more other tenant organizations, as shown in FIG. 4A. The server system 110 limits the content or use of the aggregate data sets according to policy data for the one or more other tenant organizations.

In some implementations, the server system 110 can provide recommendations and/or implement additional data collection procedures. For example, the server system 110 can identify a set of data requirements, find research studies that meet those requirements and/or find research studies that meet the most of those requirements and which have the least burden or amount of change needed to complete the set of requirements.

The server system 110 can be used to monitor and adjust the manner in which applications interact with individuals. For example, administrators or researchers can access user interfaces for the platform 110A to specify changes to the type of data to gather, the process for gathering data, or the frequency, precision, or other characteristics of data to be gathered. The server system 110 can then transmit instructions to the client devices associated with that research study or unit of the tenant organization. The instructions cause the applications on the client devices to change the data collection procedures they perform, such as changing the frequency of measurements with the sensor of the device, providing a new survey, discontinuing presentation of a survey previously provided, enabling or disabling collection of data with a sensor, and other aspects of data collection.

The server system 110 can store, for each tenant organization and potentially each unit of each tenant organization, data that specifies how to handle, process, and store the data that is received for that unit or organization. For example, different research studies may each collect heart rate data in an ongoing manner, but one study may only need average resting heart rate for the day while another may need measurements every 15 minutes. Also, the amount of raw data that may be generated from many participants may be very high and not all of the received data may be needed.

In addition, some studies may have conditions or events that the researchers or others may want to be notified about. For example, physiological data or user input data that indicates a health risk, such as an adverse reaction to a medication, may be a condition that should trigger an alert to the researchers. As part of handling input data streams in a customized way for each study, the organization hierarchy data or policy data can include, or can reference, customized rules that the server system 110 applies for the processing of input data received from various sources. These rules can specify conditions to detect in incoming data streams, e.g., for individual participants or for the study as a whole, as well as corresponding actions for the system to perform once those conditions or events are detected. For example, if the aggregated response rate of participants falls below a threshold, e.g., indicating low engagement or low compliance with requirements with a study, then the server system 110 can automatically send a notice to the researchers associated with the study.

The data collected by the server system 110 through the platform 110A and used in any of the examples and implementations discussed above can include a variety of information from a variety of sources. Data can be collected for categories representing a variety of individual, community, or public health conditions and behaviors. This data can include attributes that are biological, physical or physiological, mental, emotional, environmental, or social. The collected data can include biological attributes, such as genetic makeup, genomics, family history, sensory abilities (e.g., ability to see, perception of light and dark, perception of color, extent of ability to smell, ability to touch and sensitivity, ability to hear and sensitivity, etc.). These may reflect biological factors that a person cannot control. The collected data can include physical or physiological attributes, e.g., weight, muscle mass, heart rate, sleep, nutrition, exercise, lung capacity, brain activity, etc. Some physical attributes may result from the impact of lifestyle choices or things that a person can control. The collected data can include mental attributes, such as interpretation of brain related signals, indications of chemical imbalances, education levels, results of mental tests, etc. The collected data can include emotional attributes, such as interpretation of self-reported data, or classified audio or video related data that suggests individual responses to stimuli. The collected data can include environmental data, such as location data, air quality, audible noise, visual noise, temperature, humidity, movement (and potentially effects of movement such as motion sickness, etc. The collected data can include social attributes, such as whether a subject is socially engaged, exhibits social avoidance, experiences the impact of acceptance or responsiveness emotionally, and so on.

The data collected and used by the server system 110 (e.g., in hosted data sets, received from mobile devices and other servers, to train machine learning models, in data analysis, etc.) can include various other types of data including:

Lab and diagnostic data (e.g., assay data, blood test results, tissue sample results, endocrine panel results);

Omics data (e.g., data relating to genomics, proteomics, pharmacogenomics, epigenomics, metabolomics, biointeractomics, interactomics, lifeomics, calciomics, chemogenomics, foodomics, lipidomics, metabolomics, bionomics, econogenomics, connectomics, culturomics, cytogenomics, fermentanomics, fluxomics, metagenomics, metabonomics, metallomics, O-glcNAcomics, glycomics, glycoproteomics, glycosaminoglycanomics, immunoproteomics, ionomics, materiomics, metalloproteomics, metaproteogenomics, metaproteomics, metatranscriptomics, metronomics, microbiomics, microeconomics, microgenomics, microproteomics, miRomics, mitogenomics, mitoproteomics, mobilomics, morphomics, nanoproteomics, neuroeconomics, neurogenomics, neuromics, neuropeptidomics, neuroproteomics, nitroproteomics, nutrigenomics, nutrimetabonomics, oncogenomics, orthoproteomics, pangenomics, peptidomics, pharmacoeconomics, pharmacometabolomics, pharmacoproteomics, pharmaeconomics, phenomics, phospholipidomics, phosphoproteom ics, phylogenomics, phylotranscriptom ics, phytom ics, postgenom ics, proteogenomics, proteomics, radiogenomics, rehabilomics, retrophylogenomics, secretomics, surfaceomics, surfomics, toxicogenomics, toxicometabolomics, toxicoproteomics, transcriptomics, vaccinomics, variomics, venomics, antivenomics, agrigenomics, aquaphotomics);

Biologically sampled data (e.g., data describing blood, urine, saliva, breath sample, skin scrape, hormone levels, ketones, glucose levels, breathalyzer, DNA, perspiration, and other biological samples and derived data);

Cardiac-related biodata (e.g., data from ECG/EKG monitors, heart rate monitors, blood pressure monitors);

Respiratory-related biodata (e.g. data from spirometers, pulse oximeters);

Neurological-related biodata (e.g. data from EEG monitors);

Behavior data (e.g. movement patterns, gait, social avoidance);

Drug data (e.g., prescription information, pharmacological data);

Substance use data (e.g., alcohol, medication, insulin, recreational drugs, tobacco);

Sleep data (e.g., motion data, heart rate data, body temperature, perspiration, breathing data, ambient light, ambient sound, ambient temperature);

Exercise data (e.g. performance data, distance covered, activity, VO2 Max),

Physical activity data (e.g., step counts, heart rate, flights climbed, altitude, other data from fitness trackers);

Mood data (e.g., happiness, depression, PHQ9, BMIS data and other scales/reporting mechanism);

Positioning and location data (e.g., GPS data, gyroscope, altimeter, accelerometer, linear acceleration, received signal strength indicator from nearby emitters such as Wi-Fi access points, Bluetooth sensors and sensor networks and Cellular towers);

Environmental data (e.g., air quality data, ozone data, weather data, water-quality data, audible decibel levels, interpreting measured audio data, measuring luminance lux, interpreting measured light wavelengths, measuring temperature and gases or particles—such as formaldehyde (Molecular Formula: $H_2CO$ or $CH_2O$); alcohol vapor (Molecular Formula: hydroxyl group-OH, e.g., Isopropyl$C_3H_8O$ or $C_3H_7OH$, as well as Ethanol: $C_2H_6O$ or $C_2H_5OH$); benzene ($C_6H_6$); Hexane ($C_6H_{14}$); Liquefied Petroleum Gas (LPG) which could include a mixture of butane (Molecular Formula: $CH_3CH_2CH_2CH_3$ or $C_4H_{10}$) and isobutene (Molecular Formula: $(CH_3)_2CHCH_3$ or $C_4H_{10}$ or ($CHC_4H_{10})_2CHCH_3$); propane (Molecular Formula: $CH_3CH_2CH_3$ or $C_3H_8$); natural coal or town gas which could include of methane or natural gas (Molecular Formula: $CH_4$); carbon dioxide (Molecular Formula: $CO_2$); hydrogen (Molecular Formula: $H_2$); carbon monoxide or possibly smoke (Molecular Formula: CO); and oxygen (Molecular Formula: $O_2$) in the environment surrounding an individual inside and outside the contextual location of the potential subjects such as home, office, and including vehicle data—such as speed, location, amount of time driving, mood while driving, environmental data in the car).

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers of a server system, the method comprising:
   providing, by the server system, a multi-tenant data sharing platform configured to facilitate sharing of stored research data for clinical research studies conducted by different research groups, the different research groups comprising a first research group and a second research group that is separate from the first research group, the server system storing, for each of the research groups, policy data indicating multiple policies that respectively specify different levels of access for the platform to provide to different research groups;
   receiving, by the server system, a data processing request, wherein the data processing request involves stored research data of a first clinical trial conducted by the first research group and stored research data of a second clinical trial conducted by the second research group, wherein the stored research data of the first clinical trial comprises health data and personally identifiable information for participants in a cohort of the first clinical trial, and wherein the stored research data of the second clinical trial comprises health data and personally identifiable information for participants in a cohort of the second clinical trial;
   identifying, by the server system, (i) a first policy, from among the multiple policies in the policy data of the first research group, that indicates permissions or restrictions for accessing the stored research data collected for the participants in the cohort of the first clinical trial of the first research group and (ii) a second policy, from among the multiple policies in the policy data of the second research group, that indicates permissions or restrictions for accessing the stored research data collected for the participants in the cohort of the second clinical trial of the second research group;
   generating, by the server system, a combined research dataset that includes (i) a first subset of the stored research data collected for the participants in the cohort of the first clinical trial for which access is permitted by the first policy and (ii) a second subset of the research data collected for the participants in the cohort of the second clinical trial for which access is permitted by the second policy, wherein the combined research dataset excludes (i) portions of the stored research data of the first clinical trial for which the first policy does not permit access and (ii) portions of the stored research data of the second clinical trial for which the second policy does not permit access, and wherein the combined research dataset includes de-identified data such that the combined research dataset excludes personally identifiable information from the stored research data of the first clinical trial and the second clinical trial; and
   providing, by the server system, a response determined based on the combined research dataset in response to the data processing request.

2. The method of claim 1, wherein the stored research data for the first clinical trial comprises monitoring data generated using sensors of mobile devices or wearable devices of participants included in the cohort of the first clinical trial; and
   wherein the stored research data for the second clinical trial collected through the multi-tenant data sharing platform comprises monitoring data generated using sensors of mobile devices and/or wearable devices of participants included in the cohort of the second clinical trial.

3. The method of claim 1, wherein the policy data for the first research group comprises policies set by the first research group or by an organization to which the first research group belongs, wherein the policies specify different levels of access to the stored research data of the first clinical trial for different research groups or organizations such that different third-party research groups are permitted to receive different limited subsets of the stored research data for the first clinical trial.

4. The method of claim 1, wherein:
   the data processing request comprises a request to perform statistical analysis;
   the method further comprises performing the statistical analysis of the combined research dataset; and
   providing the response determined based on the combined research dataset comprises providing results of the statistical analysis performed on the combined research dataset.

5. The method of claim 1, wherein:
   the data processing request comprises a request to generate or train a machine learning model;
   the method further comprises generating or training the machine learning model using the first subset of the stored research data and the second subset of the stored research data as training data; and
   providing the response determined based on the combined research dataset comprises providing at least one of (i) a copy of the machine learning model over a computer network or (ii) access to the machine learning model over the computer network.

6. The method of claim 1, wherein:
   the data processing request comprises a request to apply a trained machine learning model to data from the first clinical trial and data from the second clinical trial;
   the method further comprises:
     generating input for the trained machine learning model based on the combined research dataset, and
     receiving output that the trained machine learning model provided in response to the generated input; and
   providing the response determined based on the combined research dataset comprises providing the output of the trained machine learning model.

7. The method of claim 1, wherein the policy data of the first research group limits:
   a time range of collected data in the stored research data of the first clinical trial that can be accessed by one or more other research groups; and types of data in the stored research data of the first clinical trial that can be accessed by the one or more other research groups.

8. The method of claim 1, further comprising:

storing, by the server system, configuration data modules corresponding to different clinical trials, wherein each of the configuration data module is configured to cause mobile devices receiving the configuration data module to initiate monitoring and user interactions of the clinical trial to which the configuration data module corresponds;

providing, by the server system, a first configuration data module for the first clinical trial to first mobile devices over a communication network, wherein each of the first mobile devices is associated with a different participant in the first clinical trial and the first configuration data module causes the first mobile device to perform monitoring of predetermined types of data and reporting of monitoring results to the server system; and generating the stored research data based on reported monitoring results provided by the first mobile devices in response to receiving the first configuration data module.

9. The method of claim 1, wherein:

the health data comprises data generated using one or more applications running on user devices associated with at least one of the first clinical trial or the second clinical trial; and the one or more applications are configured to collect and report data based on downloadable configuration data modules for the respective clinical trials, wherein the downloadable configuration data modules for different clinical trials configure the one or more applications to collect and report different types of data for the different clinical trials.

10. The method of claim 1, wherein the first policy limits content of the stored research data collected for the participants in cohort of the first clinical trial of the first research group by at least one of:

excluding, from the stored research data collected for the participants in the cohort of the first clinical trial, personally identifying information;

excluding, from the stored research data collected for the participants in the cohort of the first clinical trial, one or more types of data;

excluding, from the stored research data collected for the participants in the cohort of the first clinical trial, data that does not satisfy one or more time or location criteria; or including, in the stored research data collected for the participants in the cohort of the first clinical trial, a summary or aggregation of data from records about participants in the cohort of the first clinical trial without providing the records about the participants in the cohort of the first clinical trial.

11. A server system comprising:

one or more computing devices; and one or more storage devices storing instructions that, when executed by the one or more computing devices, cause the server system to perform operations comprising:

providing, by the server system, a multi-tenant data sharing platform configured to facilitate sharing of stored research data for clinical research studies conducted by different research groups, the different research groups comprising a first research group and a second research group that is separate from the first research group, the server storing, for each of the research groups, policy data indicating multiple policies that respectively specify different levels of access for the platform to provide to different research groups;

receiving, by the server system, a data processing request, wherein the data processing request involves stored research data of a first clinical trial conducted by the first research group and stored research data of a second clinical trial conducted by the second research group, wherein the stored research data of the first clinical trial comprises health data and personally identifiable information for participants in a cohort of the first clinical trial, and wherein the stored research data of the second clinical trial comprises health data and personally identifiable information for participants in a cohort of the second clinical trial;

identifying, by the server system, (i) a first policy, from among the multiple policies in the policy data of the first research group, that indicates permissions or restrictions for accessing the stored research data collected for the participants in the cohort of the first clinical trial of the first research group and (ii) a second policy, from among the multiple policies in the policy data of the second research group, that indicates permissions or restrictions for accessing the stored research data collected for the participants in the cohort of the second clinical trial of the second research group;

generating, by the server system, a combined research dataset that includes (i) a first subset of the stored research data collected for the participants in the cohort of the first clinical trial for which access is permitted by the first policy and (ii) a second subset of the research data collected for the participants in the cohort of the second clinical trial for which access is permitted by the second policy, wherein the combined research dataset excludes (i) portions of the stored research data of the first clinical trial for which the first policy does not permit access and (ii) portions of the stored research data of the second clinical trial for which the second policy does not permit access, and wherein the combined research dataset includes de-identified data such that the combined research dataset excludes personally identifiable information from the stored research data of the first clinical trial and the second clinical trial; and providing, by the server system, a response determined based on the combined research dataset in response to the data processing request.

12. The server system of claim 11, wherein the stored research data for the first clinical trial comprises monitoring data generated using sensors of mobile devices or wearable devices of participants included in the cohort of the first clinical trial; and wherein the stored research data for the second clinical trial collected through the multi-tenant data sharing platform comprises monitoring data generated using sensors of mobile devices and/or wearable devices of participants included in the cohort of the second clinical trial.

13. The server system of claim 11, wherein the policy data for the first research group comprises policies set by the first research group or by an organization to which the first research group belongs, wherein the policies specify different levels of access to the stored research data of the first clinical trial for different research groups or organizations such that different third-party research groups are permitted to receive different limited subsets of the stored research data for the first clinical trial.

14. The server system of claim 11, wherein:
the data processing request comprises a request to perform statistical analysis;
the operations further comprise performing the statistical analysis of the combined research dataset; and
providing the response determined based on the combined research dataset comprises providing results of the statistical analysis performed on the combined research dataset.

15. The server system of claim 11, wherein:
the data processing request comprises a request to generate or train a machine learning model;
the operations further comprise generating or training the machine learning model using the first subset of the stored research data and the second subset of the stored research data as training data; and
providing the response determined based on the combined research dataset comprises providing at least one of (i) a copy of the machine learning model over a computer network or (ii) access to the machine learning model over the computer network.

16. At least one non-transitory computer-readable storage medium storing instructions executable by one or more processors of a server system that, when executed by the one or more processors, cause the server system to perform operations comprising:
providing, by the server system, a multi-tenant data sharing platform configured to facilitate sharing of stored research data for clinical research studies conducted by different research groups, the different research groups comprising a first research group and a second research group that is separate from the first research group, the server system storing, for each of the research groups, policy data indicating multiple policies that respectively specify different levels of access for the platform to provide to different research groups;
receiving, by the server system, a data processing request, wherein the data processing request involves stored research data of a first clinical trial conducted by the first research group and stored research data of a second clinical trial conducted by the second research group, wherein the stored research data of the first clinical trial comprises health data and personally identifiable information for participants in a cohort of the first clinical trial, and wherein the stored research data of the second clinical trial comprises health data and personally identifiable information for participants in a cohort of the second clinical trial;
identifying, by the server system, (i) a first policy, from among the multiple policies in the policy data of the first research group, that indicates permissions or restrictions for accessing the stored research data collected for the participants in the cohort of the first clinical trial of the first research group and (ii) a second policy, from among the multiple policies in the policy data of the second research group, that indicates permissions or restrictions for accessing the stored research data collected for the participants in the cohort of the second clinical trial of the second research group;
generating, by the server system, a combined research dataset that includes (i) a first subset of the stored research data collected for the participants in the cohort of the first clinical trial for which access is permitted by the first policy and (ii) a second subset of the research data collected for the participants in the cohort of the second clinical trial for which access is permitted by the second policy, wherein the combined research dataset excludes (i) portions of the stored research data of the first clinical trial for which the first policy does not permit access and (ii) portions of the stored research data of the second clinical trial for which the second policy does not permit access, and wherein the combined research dataset includes de-identified data such that the combined research dataset excludes personally identifiable information from the stored research data of the first clinical trial and the second clinical trial; and
providing, by the server system, a response determined based on the combined research dataset in response to the data processing request.

17. The at least one non-transitory computer-readable storage medium of claim 16, wherein the stored research data for the first clinical trial comprises monitoring data generated using sensors of mobile devices or wearable devices of participants included in the cohort of the first clinical trial; and
wherein the stored research data for the second clinical trial collected through the multi-tenant data sharing platform comprises monitoring data generated using sensors of mobile devices and/or wearable devices of participants included in the cohort of the second clinical trial.

18. The at least one non-transitory computer-readable storage medium of claim 16, wherein the policy data for the first research group comprises policies set by the first research group or by an organization to which the first research group belongs, wherein the policies specify different levels of access to the stored research data of the first clinical trial for different research groups or organizations such that different third-party research groups are permitted to receive different limited subsets of the stored research data for the first clinical trial.

19. The at least one non-transitory computer-readable storage medium of claim 16, wherein:
the data processing request comprises a request to perform statistical analysis; and
the operations further comprise:
performing the statistical analysis of the combined research dataset, and
providing results of the statistical analysis performed on the combined research dataset.

20. The at least one non-transitory computer-readable storage medium of claim 16, wherein:
the data processing request comprises a request to generate or train a machine learning model;
the operations further comprise generating or training the machine learning model using the first subset of the stored research data and the second subset of the stored research data as training data; and
providing the response determined based on the combined research dataset comprises providing at least one of (i) a copy of the machine learning model over a computer network or (ii) access to the machine learning model over a computer network.

21. The method of claim 1, wherein generating the combined research dataset comprises generating, by the server system, a combined research dataset that includes (i) a first subset of the stored research data of the first clinical trial that the first policy for access by the second research group and (ii) a second subset of the research data of the second clinical trial that is permitted by the second policy for access by the first research group.

22. The method of claim 1, wherein the data processing request is received over a computer network;
wherein the first policy and second policy are identified based on the data processing request or a source of the data processing request;
wherein the combined research dataset is generated in response to receiving the data processing request over the computer network; and
wherein providing the response determined based on the combined research dataset comprises at least one of (i) providing the combined research dataset over a computer network or (ii) providing access to the combined research dataset over the computer network.

23. The method of claim 1, wherein the data processing request is received from a requester over a computer network, and wherein identifying the first policy and the second policy comprises identifying the first policy and the second policy as being applicable to the requester;
wherein the combined research dataset is generated based on (i) determining, by the server system, that the first policy permits the requester to access the first subset of the stored research data collected for the participants in the cohort of the first clinical trial and (ii) determining, by the server system, that the second policy permits the requester to access the second subset of the stored research data collected for the participants in the cohort of the second clinical trial;
wherein the combined research dataset is limited to including, from among the stored research data of the first clinical trial, only the first subset that the server system determined that the first policy permits the requester to access;
wherein the combined research dataset is limited to including, from among the stored research data of the second clinical trial, only the second subset that the server system determined that the second policy permits the requester to access; and
wherein providing the response comprises providing the response over the computer network to a device associated with the requester.

24. The method of claim 1, wherein the data processing request is received from a requester over a computer network, and wherein identifying the first policy and the second policy comprises identifying the first policy and the second policy as being applicable to the requester;
wherein the first subset includes a limited portion of the health data of the first clinical trial, and wherein the combined research dataset excludes portions of the health data of the first clinical trial that the first policy does not permit the requester to access;
wherein the first subset includes a limited portion of the health data of the second clinical trial, and wherein the combined research dataset excludes portions of the health data of the second clinical trial that the second policy does not permit the requester to access; and
wherein providing the response comprises providing the response over the computer network to a device associated with the requester.

25. The method of claim 1, wherein the data processing request is received from a requester over a computer network, and wherein identifying the first policy and the second policy comprises identifying the first policy and the second policy as being applicable to the requester;
wherein identifying the first policy comprises identifying a first policy, from among the multiple policies in the policy data of the first research group, that is applicable to the requester and permits the requester access to a limited portion of the stored research data of the first clinical trial;
wherein identifying the second policy comprises identifying a second policy, from among the multiple policies in the policy data of the second research group, that is applicable to the requester and permits the requester access to a limited portion to stored research data of the second clinical trial; and
wherein providing the response comprises providing the response to a device associated with the requester.

26. The method of claim 25, wherein the first policy and the second policy respectively place different restrictions on access to or use of health data by the requester; and
wherein, for requests from the requester, the server system (i) limits access to or use of portions of the combined research data set derived from the stored research data of the first clinical trial according to the first policy and (ii) limits access to or use of portions of the combined research data set derived from the stored research data of the second clinical trial according to the second policy.

27. The method of claim 25, wherein the first policy and the second policy respectively place different restrictions on access to or use of health data by the requester; and
wherein, for requests from the requester, the server system limits access to or use of the combined research data set with a set of restrictions that are applied consistently over the combined research data set and are a combination of restrictions from the first policy and the second policy.

* * * * *

UNITED STATES PATENT AND TRADEMARK OFFICE
CERTIFICATE OF CORRECTION

PATENT NO. : 11,736,564 B1
APPLICATION NO. : 17/355222
DATED : August 22, 2023
INVENTOR(S) : Praduman Jain et al.

It is certified that error appears in the above-identified patent and that said Letters Patent is hereby corrected as shown below:

In the Claims

Column 60, Line 2, In Claim 11, after "server" insert -- system --.

Signed and Sealed this
Third Day of October, 2023

Katherine Kelly Vidal
*Director of the United States Patent and Trademark Office*